(12) United States Patent
Kawamura et al.

(10) Patent No.: US 9,926,450 B2
(45) Date of Patent: Mar. 27, 2018

(54) COMPOUND HAVING AZO SKELETON STRUCTURE, PIGMENT-DISPERSING AGENT, PIGMENT COMPOSITION, PIGMENT DISPERSION, AND TONER

(71) Applicant: CANON KABUSHIKI KAISHA, Tokyo (JP)

(72) Inventors: Masashi Kawamura, Yokohama (JP); Yasuaki Murai, Kawasaki (JP); Kosuke Mukumoto, Yokohama (JP); Yuki Tsujii, Tokyo (JP); Ayano Mashida, Kawasaki (JP); Waka Hasegawa, Tokyo (JP); Masanori Seki, Yokohama (JP); Takayuki Toyoda, Yokohama (JP); Chiaki Nishiura, Pittsburgh, PA (US); Masashi Hirose, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/914,961

(22) PCT Filed: Aug. 27, 2014

(86) PCT No.: PCT/JP2014/073116
§ 371 (c)(1),
(2) Date: Feb. 26, 2016

(87) PCT Pub. No.: WO2015/030261
PCT Pub. Date: Mar. 5, 2015

(65) Prior Publication Data
US 2016/0280925 A1  Sep. 29, 2016

(30) Foreign Application Priority Data

Aug. 29, 2013  (JP) .................. 2013-178553

(51) Int. Cl.
*G03G 9/087* (2006.01)
*C09B 67/46* (2006.01)
(Continued)

(52) U.S. Cl.
CPC .......... *C09B 67/009* (2013.01); *C08F 212/08* (2013.01); *C09B 67/0041* (2013.01);
(Continued)

(58) Field of Classification Search
CPC .................................................. G03G 9/08791
See application file for complete search history.

(56) References Cited

U.S. PATENT DOCUMENTS

2008/0177016 A1*  7/2008  Deroover .......... C07D 207/452
526/259
2012/0231388 A1*  9/2012  Kawamura .......... C09B 31/043
430/108.23

FOREIGN PATENT DOCUMENTS

JP      03-113462 A    5/1991
JP      6-148927 A     5/1994
(Continued)

*Primary Examiner* — Hoa V Le
(74) *Attorney, Agent, or Firm* — Canon U.S.A., Inc. IP Division

(57) ABSTRACT

The present invention provides a compound capable of improving the dispersibility of color pigments in a water-insoluble solvent; and a pigment-dispersing agent. The present invention also provides a pigment composition, a pigment dispersion, and a toner, which have satisfactory tinting strength. The present invention provides the compound containing a polymer having a monomer unit having a specific chemical structure, the compound having a moiety also having a specific structure.

16 Claims, 4 Drawing Sheets

(51) Int. Cl.
*C09B 69/10* (2006.01)
*G03G 9/09* (2006.01)
*C09B 67/22* (2006.01)
*C08F 212/08* (2006.01)

(52) U.S. Cl.
CPC ........ *C09B 67/0046* (2013.01); *C09B 69/106* (2013.01); *G03G 9/091* (2013.01); *G03G 9/0906* (2013.01); *G03G 9/0924* (2013.01)

(56) References Cited

FOREIGN PATENT DOCUMENTS

| | | |
|---|---|---|
| JP | 2006-30760 A | 2/2006 |
| JP | 2007-131793 A | 5/2007 |
| JP | 2009-501250 A | 1/2009 |
| JP | 2009-501254 A | 1/2009 |
| JP | 2012-067285 A | 4/2012 |
| JP | 2012-077279 A | 4/2012 |
| JP | 2013-001743 A | 1/2013 |

* cited by examiner

COMPOUND HAVING AZO SKELETON STRUCTURE, PIGMENT-DISPERSING AGENT, PIGMENT COMPOSITION, PIGMENT DISPERSION, AND TONER

TECHNICAL FIELD

The present invention relates to a compound having an azo skeleton structure, a pigment-dispersing agent containing the compound, a pigment composition containing the pigment-dispersing agent, a pigment dispersion containing the pigment composition, and a toner containing the pigment composition.

BACKGROUND ART

Typically, pigments having fine particle diameters tend to have a strong cohesive force between pigment particles and thus are liable to disperse insufficiently in media, such as organic solvent and molten resins. The insufficient dispersibility of pigments results in low tinting strength of pigments.

Thus, it is reported that a dispersant to disperse a pigment is used together with the pigment in order to improve the dispersibility of the pigment. In particular, a variety of dispersants for color toners of yellow, magenta, cyan, black, and so forth are reported in order to improve the dispersibility of a pigment in toner particles.

Specifically, PTL 1 discloses that in order to improve the dispersibility of an azo-based pigment in a yellow toner, a compound having an azo skeleton structure is used as a dispersant.

PTL 2 discloses that in order to improve the dispersibility of a magenta pigment in a magenta toner, a specific polyester-based dispersant is used as a dispersant.

PTL 3 discloses that in order to improve the dispersibility of a phthalocyanine pigment in a cyan toner, a polymer containing sodium styrenesulfonate serving as a monomer unit is used as a dispersant.

PTL 4 discloses that in order to improve the dispersibility of carbon black in a black toner, a copolymer composed of a styrene-based monomer and an acrylate-based (or methacrylate-based) monomer is used as a dispersant.

CITATION LIST

Patent Literature

PTL 1 Japanese Patent Laid-Open No. 2012-067285
PTL 2 Japanese Patent Laid-Open No. 2006-30760
PTL 3 Japanese Patent Laid-Open No. 3-113462
PTL 4 Japanese Patent Laid-Open No. 6-148927

SUMMARY OF INVENTION

In the techniques described in PTLs 2 to 4, in order to obtain a certain level of pigment dispersibility, it is necessary to increase the amount of the dispersant added. An excess amount of the dispersant added can affect the properties required, depending on use. In the technique in which the compound having an azo skeleton structure is used as a pigment-dispersing agent disclosed in PTL 1, satisfactory pigment dispersibility is provided for various pigments to some extent. However, in order to enhance the image quality of an output image, a pigment-dispersing agent is required to have a higher dispersion effect.

The present invention provides a compound capable of improving the dispersibility of, for example, yellow, magenta, cyan, and black pigments and a pigment-dispersing agent. The present invention also provides a pigment composition, a pigment dispersion, and a toner, which have satisfactory tinting strength.

A first aspect of the present invention relates to a compound containing a polymer having a monomer unit represented by the following formula (4), the compound having a moiety represented by the following formula (1),

[Chem. 1]

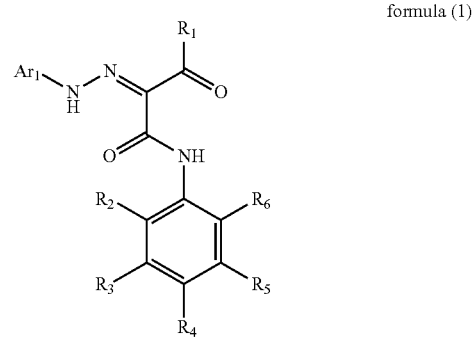

formula (1)

wherein in the formula (1),
$R_1$ represents an alkyl group or a phenyl group,
$Ar_1$ represents an aryl group,
$Ar_1$ and $R_2$ to $R_6$ satisfy at least one of requirements (i) and (ii) described below,
  (i) $Ar_1$ has a linking group attached to a carbon atom in the aryl group, the linking group constituting a bonding moiety with the polymer,
  (ii) at least one of $R_2$ to $R_6$ has a linking group constituting a bonding moiety with the polymer,
when none of $R_2$ to $R_6$ has a linking group, $R_2$ to $R_6$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group,
$R_7$ to $R_{11}$ each independently represent a group represented by the following formula (2) or (3), and
wherein $Ar_1$ and $R_2$ to $R_6$ satisfy at least one of requirements (iii) and (iv) described below,
  (iii) $Ar_1$ has a substituent selected from a $CONHR_7$ group, a $COOR_8$ group, a $NHCOR_9$ group, an $OCOR_{10}$ group, and an $NHR_{11}$ group,
  (iv) at least one of $R_2$ to $R_6$ represents a $CONHR_7$ group, a $COOR_8$ group, an $NHCOR_9$ group, an $OCOR_{10}$ group, and an $NHR_{11}$ group,

[Chem. 2]

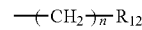

formula (2)

wherein in the formula (2),
$R_{12}$ represents a $COR_{14}$ group or an $SO_2R_{15}$ group,
$R_{14}$ and $R_{15}$ each independently represent an $OR_{16}$ group or an $NR_{17}R_{18}$ group,
$R_{16}$ represents a hydrogen atom, an alkyl group, a phenyl group, an aralkyl group, or a cation that forms a salt with a carboxylate anion or a sulfonate anion, $R_{17}$ and $R_{18}$ each independently represent a hydrogen atom, an alkyl group, a phenyl group, or an aralkyl group, and n represents an integer of 1 to 11,

[Chem. 3]

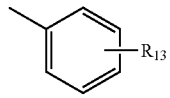

formula (3)

wherein in the formula (3), $R_{13}$ represents a $COR_{14}$ group or an $SO_2R_{15}$ group, $R_{14}$ and $R_{15}$ each independently represent an $OR_{16}$ group or an $NR_{17}R_{18}$ group, $R_{16}$ represents a hydrogen atom, an alkyl group, a phenyl group, an aralkyl group, or a cation that forms a salt with a carboxylate anion or a sulfonate anion, and $R_{17}$ and $R_{18}$ each independently represent a hydrogen atom, an alkyl group, a phenyl group, or an aralkyl group,

[Chem. 4]

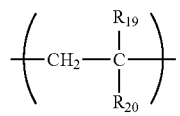

formula (4)

wherein in the formula (4), $R_{19}$ represents a hydrogen atom or an alkyl group, and $R_{20}$ represents a phenyl group, a carboxy group, a carboxylate group, or a carboxamide group.

A second aspect of the present invention relates to a pigment-dispersing agent containing the compound.

A third aspect of the present invention relates to a pigment composition containing the pigment-dispersing agent and a pigment.

A fourth aspect of the present invention relates to a pigment dispersion containing the pigment composition and a water-insoluble solvent.

A fifth aspect of the present invention relates to a toner that includes toner particles each containing a binder resin and a colorant, in which the colorant is the pigment composition.

The compound and the pigment-dispersing agent according to embodiments of the present invention are capable of improving the dispersibility of color pigments of yellow, magenta, cyan, black, and so forth. The pigment composition, the pigment dispersion, and the toner according to embodiments of the present invention have satisfactory tinting strength.

DESCRIPTION OF EMBODIMENTS

Figure 1:
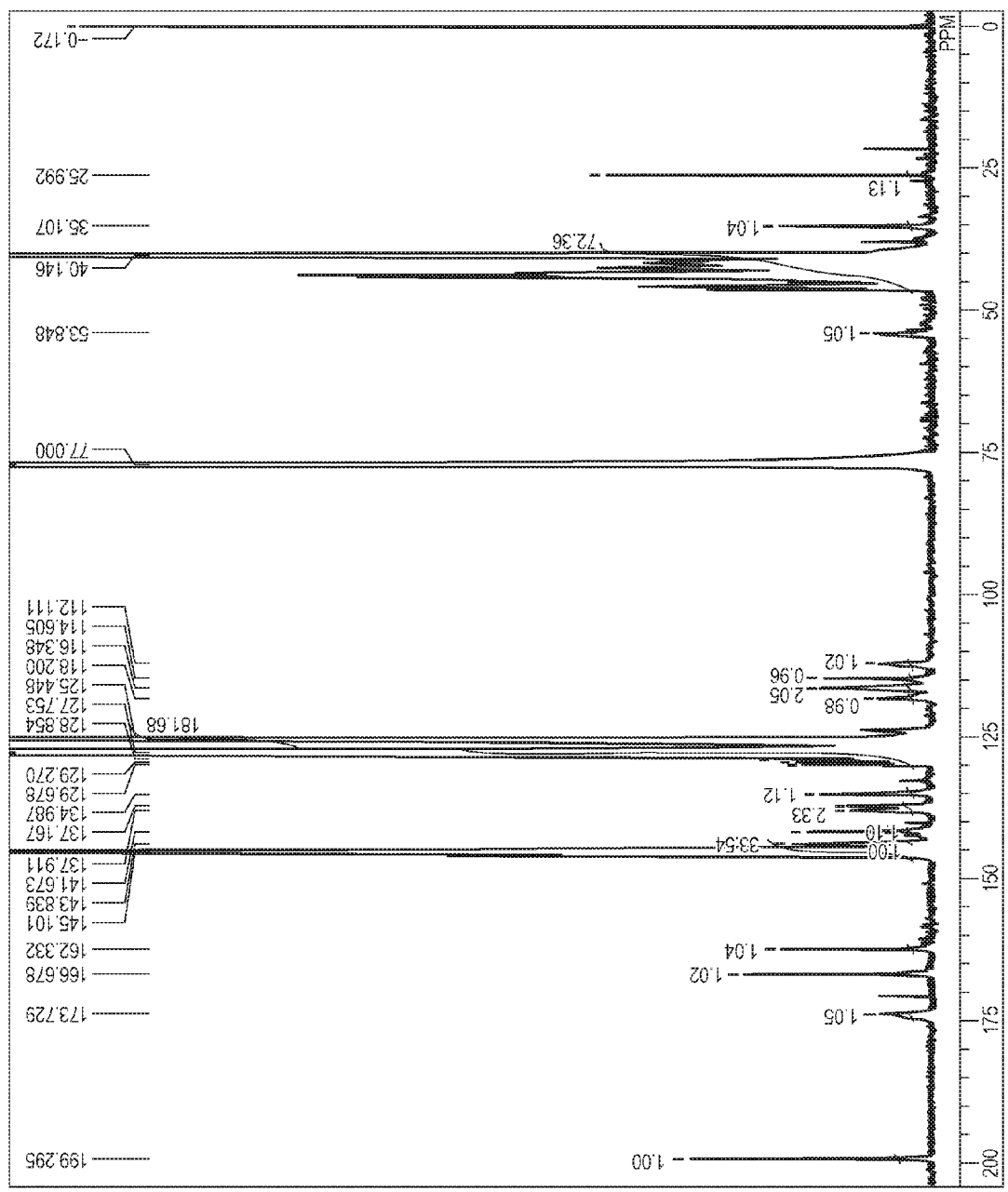
FIG. 1 is a $^{13}C$ NMR spectrum of compound (C-1) in $CDCl_3$ at 150 MHz and room temperature.

The present invention will be described in detail below by preferred embodiments.

A compound according to an embodiment of the present invention is a compound containing a polymer having a monomer unit represented by the following formula (4), the compound having a moiety represented by the following formula (1),

[Chem. 5]

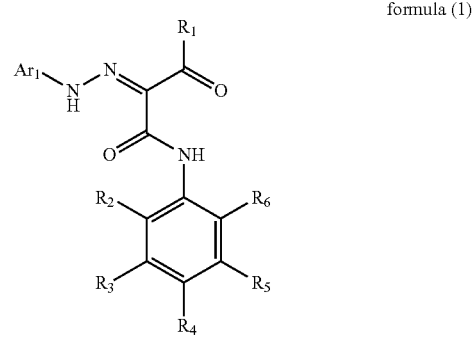

formula (1)

wherein in the formula (1), $R_1$ represents an alkyl group or a phenyl group, $Ar_1$ represents an aryl group, $Ar_1$ and $R_2$ to $R_6$ satisfy at least one of requirements (i) and (ii) described below, (i) $Ar_1$ has a linking group attached to a carbon atom in the aryl group, the linking group constituting a bonding moiety with the polymer, (ii) at least one of $R_2$ to $R_6$ has a linking group constituting a bonding moiety with the polymer, when none of $R_2$ to $R_6$ has a linking group, $R_2$ to $R_6$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group, and $R_7$ to $R_{11}$ each independently represent a group represented by the following formula (2) or (3), wherein $Ar_1$ and $R_2$ to $R_6$ satisfy at least one of requirements (iii) and (iv) described below, (iii) $Ar_1$ has a substituent selected from a $CONHR_7$ group, a $COOR_8$ group, a $NHCOR_9$ group, an $OCOR_{10}$ group, and an $NHR_{11}$ group, (iv) at least one of $R_2$ to $R_6$ represents a $CONHR_7$ group, a $COOR_8$ group, an $NHCOR_9$ group, an $OCOR_{10}$ group, and an $NHR_{11}$ group,

[Chem. 6]

formula (2)

wherein in the formula (2), $R_{12}$ represents a $COR_{14}$ group or an $SO_2R_{15}$ group, $R_{14}$ and $R_{15}$ each independently represent an $OR_{16}$ group or an $NR_{17}R_{18}$ group, $R_{16}$ represents a hydrogen atom, an alkyl group, a phenyl group, an aralkyl group, or a cation that forms a salt with a carboxylate anion or a sulfonate anion, $R_{17}$ and $R_{18}$ each independently represent a hydrogen atom, an alkyl group, a phenyl group, or an aralkyl group, and n represents an integer of 1 to 11,

[Chem. 7]

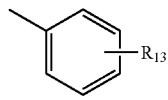

formula (3)

wherein in the formula (3), $R_{13}$ represents a $COR_{14}$ group or an $SO_2R_{15}$ group, $R_{14}$ and $R_{15}$ each independently represent an $OR_{16}$ group or an $NR_{17}R_{18}$ group, $R_{16}$ represents a hydrogen atom, an alkyl group, a phenyl group, an aralkyl group, or a cation that forms a salt with a carboxylate anion or a sulfonate anion, and $R_{17}$ and $R_{18}$ each independently represent a hydrogen atom, an alkyl group, a phenyl group, or an aralkyl group,

[Chem. 8]

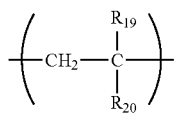

formula (4)

wherein in the formula (4), $R_{19}$ represents a hydrogen atom or an alkyl group, and $R_{20}$ represents a phenyl group, a carboxy group, a carboxylate group, or a carboxamide group.

Hereinafter, the moiety represented by the formula (1) is also referred to as an "azo skeleton structure". When only the polymer having the monomer unit represented by the formula (4) is indicated, the polymer is also referred to as a "polymer portion". The compound having the structure in which the moiety represented by the formula (1) is bound to the polymer having the monomer unit represented by the formula (4) is also referred to as a "compound having an azo skeleton structure". The linking group which is in the moiety represented by the formula (1) and serves as a bonding moiety with the polymer is also referred to simply as a "linking group".

Compound Having Azo Skeleton Structure

The compound having an azo skeleton structure will be described below.

The compound having an azo skeleton structure has the azo skeleton structure represented by the formula (1) and the polymer represented by the formula (4), the azo skeleton structure having a high affinity for various pigments, and the monomer unit having a high affinity for a water-insoluble solvent.

Azo Skeleton Structure of Compound Having Azo Skeleton Structure

The azo skeleton structure will be described in detail below.

Examples of an alkyl group represented by $R_1$ in the formula (1) include straight, branched, and cyclic alkyl groups, such as a methyl group, an ethyl group, a n-propyl group, a n-butyl group, a n-pentyl group, a n-hexyl group, an isopropyl group, an isobutyl group, a sec-butyl group, tert-butyl group, and a cyclohexyl group.

The alkyl group or the phenyl group represented by $R_1$ in the formula (1) may be substituted with a substituent as long as the affinity for a pigment is not significantly inhibited. In this case, examples of a substituent that may be used include a halogen atom, a nitro group, an amino group, a hydroxy group, a cyano group, and trifluoromethyl group.

$R_1$ in the formula (1) may represent a methyl group among those groups described above, from the viewpoint of achieving a good affinity for a pigment.

Regarding $R_2$ to $R_6$ in the formula (1), at least one of $R_2$ to $R_6$ may represent a $CONHR_7$ group, a $COOR_8$ group, an $NHCOR_9$ group, an $OCOR_{10}$ group, an $NHR_{11}$ group, or the linking group among those groups described above from the viewpoint of achieving a good affinity for a pigment. At least one of $R_2$ to $R_6$ may represent a $CONHR_7$ group, a $COOR_8$ group, or the linking group, and even the linking group from the viewpoint of achieving ease of production. In particular, at least one of $R_2$ to $R_6$ may represent the linking group, and $R_2$ to $R_6$ other than the linking group each represent a hydrogen atom.

Examples of the aryl group represented by $Ar_1$ in the formula (1) include a phenyl group and a naphthyl group.

$Ar_1$ in the formula (1) may have a substituent other than the linking group as long as the affinity for a pigment is not significantly inhibited. Examples of the substituent include a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, and an $NHR_{11}$ group.

$Ar_1$ in the formula (1) may have, as a substituent, one of a $CONHR_7$ group, a $COOR_8$ group, an $NHCOR_9$ group, an $OCOR_{10}$ group, and an $NHR_{11}$ group from the viewpoint of achieving a good affinity for a pigment. Moreover, $Ar_1$ may have, as a substituent, one of a $CONHR_7$ group and a $COOR_8$ group from the viewpoint of ease of production.

The moiety represented by the formula (1) satisfies at least one of requirements (i) and (ii). In particular, the moiety represented by the formula (1) may satisfy requirement (ii) from the viewpoints of achieving a good affinity for a pigment and ease of production. Moreover, the moiety represented by the formula (1) satisfies at least one of requirements (iii) and (iv). In particular, the moiety represented by the formula (1) may satisfy requirement (iii) from the viewpoints of achieving a good affinity for a pigment and ease of production.

$Ar_1$ and $R_2$ to $R_6$ may satisfy at least one of requirements (ix) and (x) described below from the viewpoints of achieving a good affinity for a pigment and ease of production.

(ix) $Ar_1$ has, as a substituent, one of a $CONHR_7$ group and a $COOR_8$ group.

(x) At least one of $R_2$ to $R_6$ represents one of a $CONHR_7$ group and a $COOR_8$ group.

Among those groups, $Ar_1$ in the formula (1) may represent a phenyl group or a divalent group in which a hydrogen atom in a phenyl group is replaced with the linking group from the viewpoint of achieving a good affinity for a pigment and ease of production. That is, the moiety represented by the formula (1) may have a structure represented by the following formula (5):

[Chem. 9]

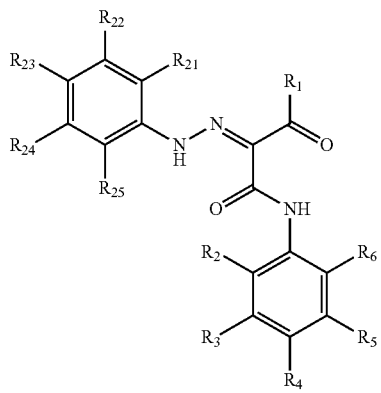

formula (5)

wherein in the formula (5), $R_1$ represents an alkyl group or a phenyl group, $R_{21}$ to $R_{25}$ and $R_2$ to $R_6$ satisfy at least one of requirements (v) and (vi) described below, (v) at least one of $R_{21}$ to $R_{25}$ has a linking group constituting a bonding moiety with the polymer, (vi) at least one of $R_2$ to $R_6$ has a linking group constituting a bonding moiety with the polymer, when none of $R_{21}$ to $R_{25}$ and $R_2$ to $R_6$ has a linking group, $R_{21}$ to $R_{25}$ and $R_2$ to $R_6$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group, and $R_7$ to $R_{11}$ each represent a group represented by the formula (2) or (3), and wherein $R_{21}$ to $R_{25}$ and $R_2$ to $R_6$ satisfy at least one of requirements (vii) and (viii) described below, (vii) at least one of $R_{21}$ to $R_{25}$ represents one of a $CONHR_7$ group, a $COOR_8$ group, an $NHCOR_9$ group, an $OCOR_{10}$ group, and an $NHR_{11}$ group, and (viii) at least one of $R_2$ to $R_6$ represents one of a $CONHR_7$ group, a $COOR_8$ group, an $NHCOR_9$ group, an $OCOR_{10}$ group, and an $NHR_{11}$ group.

Among those groups, at least one of $R_{21}$ to $R_{25}$ in the formula (5) may represent a $CONHR_7$ group, a $COOR_8$ group, an $NHCOR_9$ group, an $OCOR_{10}$ group, and an $NHR_{11}$ group from the viewpoint of achieving a good affinity for a pigment. Moreover, at least one of $R_{21}$ to $R_{25}$ may represent one of a $CONHR_7$ group and a $COOR_8$ group from the viewpoint of achieving ease of production.

Examples of the alkyl group represented by $R_{16}$ in the formula (2) or (3) include straight, branched, and cyclic alkyl groups, such as a methyl group, an ethyl group, a n-propyl group, a n-butyl group, a n-pentyl group, a n-hexyl group, an isopropyl group, an isobutyl group, a sec-butyl group, a tert-butyl group, and a cyclohexyl group.

Examples of the aralkyl group represented by $R_{16}$ in the formula (2) or (3) include a benzyl group and a phenethyl group.

Examples of the cation which is represented by $R_{16}$ in the formula (2) or (3) and which forms a salt with a carboxylate anion or a sulfonate anion are described below.

Examples thereof include a lithium ion, a sodium ion, a potassium ion, an ammonium ion, a methylammonium ion, a dimethylammonium ion, a trimethylammonium ion, a tetramethylammonium ion, an ethylammonium ion, a diethylammonium ion, a triethylammonium ion, a tetraethylammonium ion, a n-propylammonium ion, an isopropylammonium ion, a diisopropylammonium ion, a n-butylammonium ion, a tetra-n-butylammonium ion, an isobutylammonium ion, a monoethanolammonium ion, a diethanolammonium ion, and a triethanolammonium ion.

The alkyl group, the phenyl group, and the aralkyl group represented by $R_{16}$ in the formula (2) or (3) may be substituted with a substituent as long as the affinity for a pigment is not significantly inhibited. Examples of the substituent include a halogen atom, a nitro group, an amino group, a hydroxy group, a cyano group, and a trifluoromethyl group.

$R_{16}$ represented by the formula (2) or (3) may represent a hydrogen atom, a methyl group, or an ethyl group among those groups from the viewpoint of achieving a good affinity for a pigment.

Examples of the alkyl group represented by $R_{17}$ and $R_{18}$ in the formula (2) or (3) include straight, branched, and cyclic alkyl groups, such as a methyl group, an ethyl group, a n-propyl group, a n-butyl group, a n-pentyl group, a n-hexyl group, an isopropyl group, an isobutyl group, a sec-butyl group, a tert-butyl group, and a cyclohexyl group.

Examples of the aralkyl group represented by $R_{17}$ and $R_{18}$ in the formula (2) or (3) include a benzyl group and a phenethyl group.

Each of the alkyl group, the phenyl group, and the aralkyl group represented by $R_{17}$ and $R_{18}$ in the formula (2) or (3) may be substituted with a substituent as long as the affinity for a pigment is not significantly inhibited. Examples of the substituent include a halogen atom, a nitro group, an amino group, a hydroxy group, a cyano group, and a trifluoromethyl group.

One of $R_{17}$ and $R_{18}$ in the formula (2) or (3) may represent a hydrogen atom, and the other may represent a hydrogen atom, a methyl group, or an ethyl group among those groups from the viewpoint of achieving a good affinity for a pigment.

$R_{14}$ and $R_{15}$ in the formula (2) or (3) may each represent an $NH_2$ group among those groups from the viewpoint of achieving a good affinity for a pigment.

$R_{12}$ and $R_{13}$ in the formula (2) or (3) may each represent an $SO_2R_{15}$ group among those groups from the viewpoint of achieving a good affinity for a pigment.

The number of the polymers attached to the moiety represented by the formula (1) or (5) is not particularly limited. The moiety may be substituted with the polymer at one or two positions from the viewpoint of achieving ease of production.

The linking group is not particularly limited as long as it is a divalent linking group. Examples of the linking group include a linking group having a carboxylate linkage, a linking group having a sulfonate linkage, and a linking group having a carboxamide linkage. The linking group may have a carboxylate linkage or a carboxamide linkage from the viewpoint of achieving ease of production.

A substituent used to form a linking group in the moiety represented by the formula (1) or (5) is not particularly limited. Examples of the substituent include hydroxy group-containing substituents, sulfo group-containing substituents, amino group-containing substituents, and carboxy group-containing substituents.

Examples of the hydroxy group-containing substituents include a hydroxy group; hydroxyalkyl groups, such as a hydroxymethyl group, a hydroxyethyl group, and a hydroxypropyl group; and groups represented by —$R_{61}$—

O—$R_{62}$—OH ($R_{61}$ and $R_{62}$ each independently represent an alkylene group having 1 to 4 carbon atoms).

Examples of the sulfo group-containing substituents include a sulfo group; and sulfoalkyl groups, such as a sulfomethyl group, a sulfoethyl group, and a sulfopropyl group.

Examples of the amino group-containing substituents include an amino group; and aminoalkyl groups, such as an aminomethyl group, an aminoethyl group, and an aminopropyl group.

Examples of the carboxy group-containing substituents include a carboxy group; and carboxyalkyl groups, such as a carboxymethyl group, a carboxyethyl group, and a carboxypropyl group.

The linking group may have a carboxylate linkage or a carboxamide linkage from the viewpoint of achieving a good affinity for a pigment and ease of production. In the case where the polymer is bound to the azo skeleton structure represented by the formula (1) or (5) via a functional group, such as a carboxylate linkage (—COO—) derived from the polymer, a bonding moiety including the functional group is referred to as a linking group.

Specifically, examples of the linking group include groups represented by $L_1$ to $L_9$ described below.

[Chem. 10]

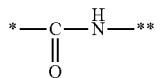

$L_1$

[Chem. 11]

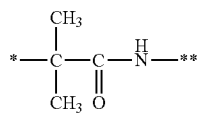

$L_2$

[Chem. 12]

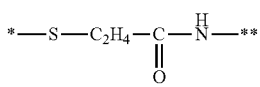

$L_3$

[Chem. 13]

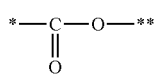

$L_4$

[Chem. 14]

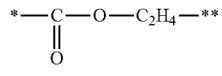

$L_5$

[Chem. 15]

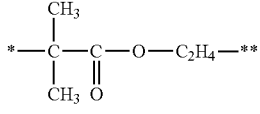

$L_6$

[Chem. 16]

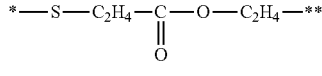

$L_7$

[Chem. 17]

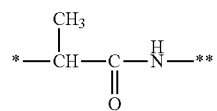

$L_8$

[Chem. 18]

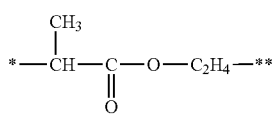

$L_9$

In each of the formulae $L_1$ to $L_9$, "*" indicates a binding site to a carbon atom in a polymer portion having the monomer unit represented by the formula (4). In each of the formulae $L_1$ to $L_9$, "**" indicates a binding site to a carbon atom in an aromatic ring of $Ar_1$ in the moiety represented by the formula (1) or a binding site to a carbon atom in an aromatic ring having $R_2$ to $R_6$.

Polymer Portion in Compound Having Azo Skeleton Structure

The polymer portion will be described below.

Examples of the alkyl group represented by $R_{19}$ in the formula (4) include, but are not particularly limited to, straight, branched, and cyclic alkyl groups, such as a methyl group, an ethyl group, a n-propyl group, a n-butyl group, a n-pentyl group, a n-hexyl group, an isopropyl group, an isobutyl group, a sec-butyl group, a tert-butyl group, and a cyclohexyl group.

Of these groups, $R_{19}$ in the formula (4) may represent a hydrogen atom or a methyl group from the viewpoint of achieving the high polymerizability of a polymerizable monomer that forms the monomer unit.

Examples of the carboxylate group represented by $R_{20}$ in the formula (4) include, but are not particularly limited to, straight and branched ester groups, such as a methyl ester group, an ethyl ester group, a n-propyl ester group, an isopropyl ester group, a n-butyl ester group, an isobutyl ester group, a sec-butyl ester group, a tert-butyl ester group, an octyl ester group, a nonyl ester group, a decyl ester group, an undecyl ester group, a dodecyl ester group, a hexadecyl ester group, an octadecyl ester group, an eicosyl ester group, a docosyl ester group, a 2-ethylhexyl ester group, a phenyl ester group, a benzyl ester group, and a 2-hydroxyethyl ester group.

Examples of the carboxamide group represented by $R_{20}$ in the formula (4) include straight and branched amide groups, such as an N-methylamide group, an N,N-dimethylamide group, an N-ethylamide group, an N,N-diethylamide group, an N-isopropylamide group, an N,N-diisopropylamide group, an N-n-butylamide group, an N,N-di-n-butylamide group, an N-isobutylamide group, an N,N-diisobutylamide group, an N-sec-butylamide group, an N,N-di-sec-butylamide group, an N-tert-butylamide group, an N-octylamide group, an N,N-dioctylamide group, an N-nonylamide group, an N,N-dinonylamide group, an N-decylamide group, an N,N-didecylamide group, an N-undecylamide group, an N,N-diundecylamide group, an N-dodecylamide group, an N,N-didodecylamide group, an N-hexadecylamide group, an N-octadecylamide group, an N-phenylamide group, an N-(2-ethylhexyl)amide group, and an N,N-di(2-ethylhexyl)amide group.

$R_{20}$ in the formula (4) may be substituted with a substituent as long as the polymerizability of a polymerizable monomer that forms the monomer unit is not inhibited and the solubility of the compound having the azo skeleton structure is not significantly reduced. Examples of the substituent include alkoxy groups, such as a methoxy group and an ethoxy group; amino groups, such as an N-methylamino group and an N,N-dimethylamino group; acyl groups, such as an acetyl group; and halogen atoms, such as a fluorine atom and chlorine atom.

Of these groups, $R_{20}$ in the formula (4) may represent a phenyl group or a carboxylate group from the viewpoint of achieving good dispersibility and compatibility of the compound having an azo skeleton structure in a medium.

The affinity of the polymer portion for a dispersion medium may be controlled by changing the proportion of the monomer unit represented by the formula (4). In the case where the dispersion medium is a nonpolar solvent, such as styrene, the proportion of the monomer unit in which $R_{20}$ in the formula (4) represents a phenyl group may be increased from the viewpoint of achieving a good affinity for the dispersion medium. In the case where the dispersion medium is a moderately polar solvent, such as an acrylate, the proportion of the monomer unit in which $R_{20}$ in the formula (4) represents a carboxy group, a carboxylate group, or a carboxamide group may be increased from the viewpoint of achieving a good affinity for the dispersion medium.

From the viewpoint of achieving ease of production, the polymer may contain the monomer unit in which $R_{20}$ represents a carboxy group, and at least one of $R_2$ to $R_6$ and $Ar_1$ forms a carboxylate linkage or a carboxamide linkage with the carboxyl group in the polymer.

The polymer may contain a carboxy group at a terminus. The polymer may be bound to the azo skeleton structure with the carboxy group. In this case, the carboxy group may be bound to at least one of $R_2$ to $R_6$, $Ar_1$, and $R_{21}$ to $R_{25}$ with a carboxylate linkage or a carboxamide linkage.

As a method for introducing a carboxy group into a terminus of the polymer, for example, an atom transfer radical polymerization (ATRP) method described below, a method in which a carboxy group-containing polymerization initiator is used, and a method in which a carboxy group-containing mercaptan-based chain transfer agent is used may be employed.

The polymer portion may have a number-average molecular weight of 500 or more from the viewpoint of improving the dispersibility of a pigment. The polymer portion may have a number-average molecular weight of 200,000 or less from the viewpoint of improving the affinity for a water-insoluble solvent. The polymer portion may have a number-average molecular weight of 2,000 to 50,000 from the viewpoint of achieving ease of production.

As disclosed in PCT Japanese Translation Patent Publication No. 2003-531001, a method is known in which the dispersibility of a polyoxyalkylenecarbonyl-based dispersant is improved by introducing a branched aliphatic chain into a terminus. Regarding the polymer portion according to an embodiment of the present invention, when a telechelic polymer portion is synthesized by a method, such as ATRP described below, a branched aliphatic chain may be introduced into a terminus.

In the compound having an azo skeleton structure, azo skeleton structures may be located at random or may be unevenly located in such a manner that one or more blocks may be formed at a terminus.

The number of the azo skeleton structures in the compound having an azo skeleton structure is preferably 0.5 to 10 and more preferably 0.5 to 5 with respect to 100 monomer units that form the polymer portion in view of a balance between the affinity for a pigment and the affinity for a dispersion medium.

With respect to the azo skeleton structure represented by the formula (1), tautomers represented by the following formulae (6) and (7) illustrated in the following scheme are present. These tautomers are included in the scope of the invention.

[Chem. 18]

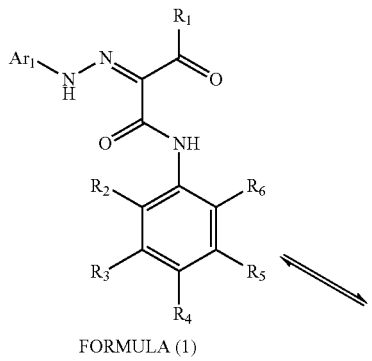

FORMULA (1)

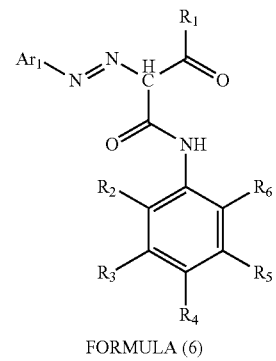

FORMULA (6)

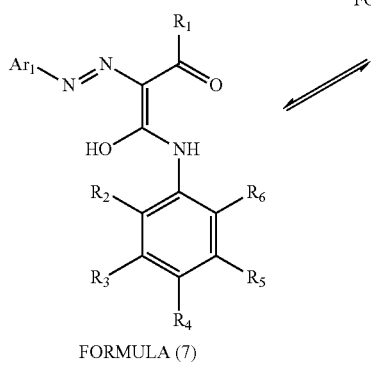

FORMULA (7)

wherein $R_1$ to $R_6$ and $Ar_1$ in the formulae (6) and (7) are defined the same as $R_1$ to $R_6$ and $Ar_1$, respectively, in the formula (1).

Method for Producing Compound Having Azo Skeleton Structure

The compound having an azo skeleton structure may be synthesized by a known method.

Specific examples of the method for synthesizing the compound having an azo skeleton structure include methods described in items (i) to (iv).

An example of a scheme of method (i) will be illustrated below and described in detail.

In method (i), an azo skeleton structure and a polymer portion are each synthesized in advance. The azo skeleton structure and the polymer portion are bonded together by a condensation reaction, thereby synthesizing a compound having an azo skeleton structure.

[Chem. 19]

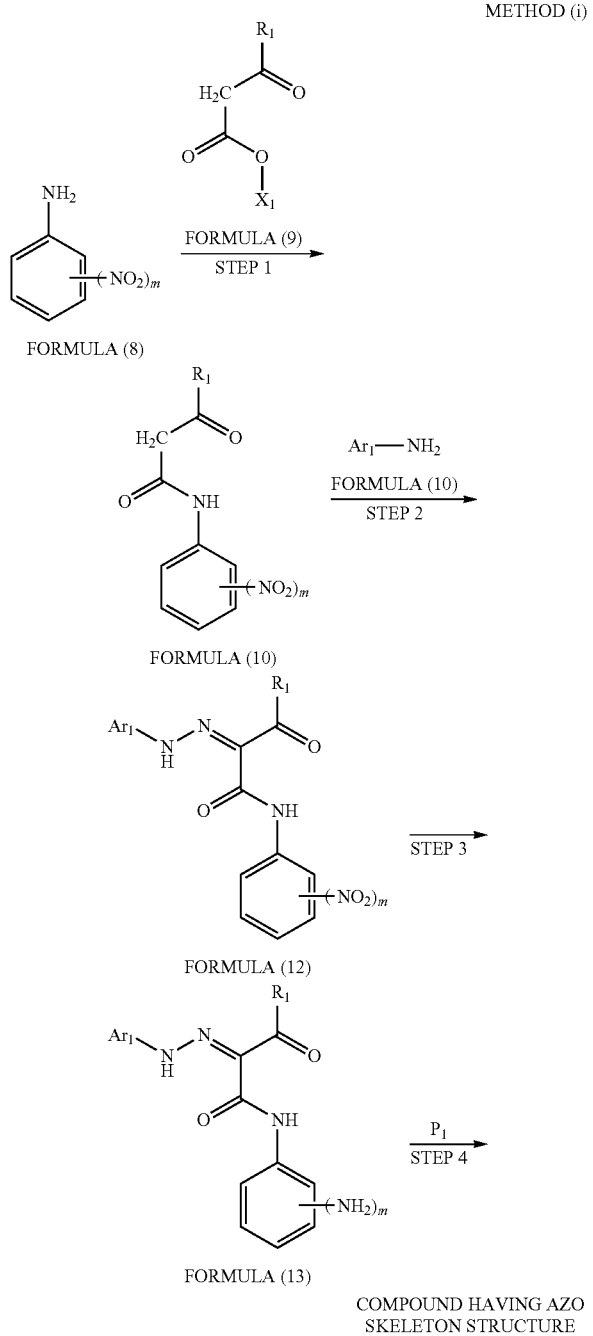

COMPOUND HAVING AZO
SKELETON STRUCTURE wherein $R_1$ and $Ar_1$ in the formulae (9) to (13) are defined the same as $R_1$ and $Ar_1$, respectively, in the formula (1); $X_1$ in the formula (9) represents a leaving group; $P_1$ represents a polymer portion obtained by the polymerization of a polymerizable monomer that forms the monomer unit represented by the formula (4); and m in each of the formulae (10), (12), and (13) represents an integer of 1 or 2.

In the scheme of method (i) illustrated above, the compound having an azo skeleton structure represented by the formula (1) may be synthesized through steps 1 to 4. In step 1, a nitroaniline derivative represented by the formula (8) and an acetoacetic acid analogue represented by the formula (9) are amidated to synthesize intermediate (10), which is an acylacetanilide analogue. In step 2, azo compound (12) is synthesized by diazo coupling of intermediate (10) with an aniline derivative (11). In step 3, a nitro group in azo compound (12) is reduced to synthesize azo compound (13). In step 4, azo compound (13) is bonded to polymer portion $P_1$ by a condensation reaction or the like.

First, step 1 will be described below.

In step 1, a known method may be employed. For example, see Datta E. Ponde and four other authors, The Journal of Organic Chemistry (United States), American Chemical Society, 1998, Vol. 63, No. 4, pp. 1058-1063. In the case where $R_1$ in the formula (10) represents a methyl group, the compound represented by the formula (10) may also be synthesized by a method in which a diketene is used in place of raw material (9). For example, see Kiran Kumar Solingapuram Sai and two other authors, The Journal of Organic Chemistry (United States), American Chemical Society, 2007, Vol. 72, No. 25, pp. 9761-9764.

Regarding nitroaniline derivative (8) and acetoacetic acid analogue (9), various types thereof are readily commercially available. Furthermore, they may be easily synthesized by known methods.

Although step 1 may be performed without using a solvent, step 1 may be performed in the presence of a solvent in order to prevent the rapid progress of the reaction. The solvent is not particularly limited as long as the solvent does not inhibit the reaction. Examples of the solvent include alcohols, such as methanol, ethanol, and propanol; esters, such as methyl acetate, ethyl acetate, and propyl acetate; ethers, such as diethyl ether, tetrahydrofuran, and dioxane; hydrocarbons, such as benzene, toluene, xylene, hexane, and heptane; halogenated hydrocarbons, such as dichloromethane, dichloroethane, and chloroform; amides, such as N,N-dimethylformamide, N-methylpyrrolidone, and N,N-dimethylimidazolidinone; nitriles, such as acetonitrile and propionitrile; acids, such as formic acid, acetic acid, and propionic acid; and water. These solvents may be optionally used in combination as a mixture of two or more. When these solvents are used in combination as a mixture, the mixing ratio may be appropriately determined, depending on solubilities of substrates. The amount of the solvent used may be freely determined. However, the amount of the solvent used may be in the range of 1.0 to 20 times the mass of the compound represented by the formula (8) in view of the reaction rate.

Step 1 is usually performed in the temperature range of 0° C. to 250° C. and usually completed within 24 hours.

Step 2 will be described below.

In step 2, a known method may be employed. Specifically, the following method is exemplified. Aniline derivative (11) is allowed to react with a diazotizing agent, for example, sodium nitrite or nitrosyl hydrogensulfate, in a methanol solvent in the presence of an inorganic acid, for example, hydrochloric acid or sulfuric acid, to synthesize a corresponding diazonium salt. The resulting diazonium salt is coupled with intermediate (10) to synthesize azo compound (12).

Regarding aniline derivative (11) described above, various types thereof are readily commercially available. Furthermore, it may be easily synthesized by a known method.

Although step 2 may be performed without using a solvent, step 2 may be performed in the presence of a solvent in order to prevent the rapid progress of the reaction. The solvent is not particularly limited as long as the solvent does not inhibit the reaction. Example of the solvent include alcohols, such as methanol, ethanol, and propanol; esters, such as methyl acetate, ethyl acetate, and propyl acetate; ethers, such as diethyl ether, tetrahydrofuran, and dioxane; hydrocarbons, such as benzene, toluene, xylene, hexane, and heptane; halogenated hydrocarbons, such as dichloromethane, dichloroethane, and chloroform; amides, such as N,N-dimethylformamide, N-methylpyrrolidone, and N,N-dimethylimidazolidinone; nitriles, such as acetonitrile and propionitrile; acids, such as formic acid, acetic acid, and propionic acid; and water. These solvents may be optionally used in combination as a mixture of two or more. When these solvents are used in combination as a mixture, the mixing ratio may be appropriately determined, depending on solubilities of substrates. The amount of the solvent used may be freely determined. However, the amount of the solvent used may be in the range of 1.0 to 20 times the mass of the compound represented by the formula (10) in view of the reaction rate.

Step 2 is usually performed in the temperature range of −50° C. to 100° C. and usually completed within 24 hours.

Step 3 will be described below.

In step 3, a known method may be employed. Specifically, as a method of using a metal compound, for example, a method described in "Jikken Kagaku Kouza (Experimental Chemistry Course)", published by Maruzen Co., Ltd., second edition, Vol. 17-2, pp. 162-179, may be employed. In addition, as a method of catalytic hydrogenation, for example, a method described in "Shin Jikken Kagaku Kouza (Experimental Chemistry Course)", published by Maruzen Co., Ltd., first edition, Vol. 15, pp. 390-448, or International Publication No. 2009/060886, may be employed.

Although step 3 may be performed without using a solvent, step 3 may be performed in the presence of a solvent in order to prevent the rapid progress of the reaction. The solvent is not particularly limited as long as the solvent does not inhibit the reaction. Examples thereof include alcohols, such as methanol, ethanol, and propanol; esters, such as methyl acetate, ethyl acetate, and propyl acetate; ethers, such as diethyl ether, tetrahydrofuran, and dioxane; hydrocarbons, such as benzene, toluene, xylene, hexane, and heptane; and amides, such as N,N-dimethylformamide, N-methylpyrrolidone, and N,N-dimethylimidazolidinone. These solvents may be optionally used in combination as a mixture of two or more. When these solvents are used in combination as a mixture, the mixing ratio may be appropriately determined. The amount of the solvent used may be appropriately determined, depending on solubilities of substrates. However, the amount of the solvent used may be in the range of 1.0 to 20 times the mass of the compound represented by the formula (12) in view of the reaction rate.

This step is usually performed in the temperature range of 0° C. to 250° C. and usually completed within 24 hours.

A method for synthesizing polymer portion $P_1$ used in step 4 will be described below.

In the synthesis of polymer portion $P_1$, a known polymerization method may be employed (for example, Krzysztof Matyjaszewski and one other author, Chemical Reviews (United States), American Chemical Society, 2001, Vol. 101, pp. 2921-2990).

Specific examples of the polymerization method for the synthesis of the polymer portion include radical polymerization, cationic polymerization, and anionic polymerization. Among these, radical polymerization may be employed in view of ease of production.

Radical polymerization may be performed by the use of a radical polymerization initiator; irradiation with radiation, a laser beam, or the like; the use of a photopolymerization initiator in combination with irradiation with light; or heating.

Any radical polymerization initiator may be used as long as it is capable of generating a radical and initiating a polymerization reaction, and is selected from compounds that generate a radical by heat, light, radiation, or a redox reaction. Examples of the radical polymerization initiator include azo compounds, organic peroxides, inorganic peroxides, organometallic compounds, and photopolymerization initiators. Specific examples thereof include azo-based polymerization initiators, such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and 4,4'-azobis(4-cyanovaleric acid); organic peroxide-based polymerization initiators, such as benzoyl peroxide, di-tert-butyl peroxide, tert-butylperoxyisopropyl carbonate, tert-hexyl peroxybenzoate, and tert-butyl peroxybenzoate; inorganic peroxide-based polymerization initiators, such as potassium persulfate and ammonium persulfate; and redox initiators, such as hydrogen peroxide-ferrous-based compounds, benzoyl peroxide-dimethylaniline-based compounds, and cerium(IV) salt-alcohol-based compounds. Examples of the photopolymerization initiators include benzophenones, benzoin ethers, acetophenones, and thioxanthones. These radical polymerization initiators may be optionally used in combination of two or more.

The amount of polymerization initiator used here may be adjusted in the range of 0.1 to 20 parts by mass with respect to 100 parts by mass of a polymerizable monomer in such a manner that the resulting copolymer has a target molecular weight distribution.

The polymer portion represented by $P_1$ may be produced by a freely-selected polymerization method: solution polymerization, suspension polymerization, emulsion polymerization, dispersion polymerization, precipitation polymerization, or bulk polymerization. The polymerization method is not particularly limited. Among these methods, solution polymerization in a solvent capable of dissolving components used for production may be employed. Specific examples of the solvent include polar organic solvents, such as alcohols, e.g., methanol, ethanol, and 2-propanol; ketones, e.g., acetone and methyl ethyl ketone; ethers, e.g., tetrahydrofuran and diethyl ether; ethylene glycol monoalkyl ethers and acetates thereof; propylene glycol monoalkyl ethers and acetates thereof; and diethylene glycol monoalkyl ethers; and nonpolar solvents, such as toluene and xylene. These solvents may be used separately or in combination as a mixture. Among these, solvents each having a boiling point of 100° C. to 180° C. may be used separately or in combination as a mixture.

A polymerization temperature varies depending on the type of polymerization initiator used. Specifically, the polymerization temperature is, but not particularly limited to, usually preferably in the range of −30° C. to 200° C. and more preferably 40° C. to 180° C.

The molecular-weight distribution and the molecular structure of the polymer portion represented by $P_1$ may be controlled by known methods. Specifically, polymer portion $P_1$ having a controlled molecular-weight distribution and a controlled molecular structure may be produced by, for example, a method in which an addition-cleavage-type chain transfer agent is used (see Japanese Patent Nos. 4254292 and 3721617); an NMP method in which dissociation and bonding of an amine-oxide radical is used (for example, Craig J. Hawker and two other authors, Chemical Reviews (United States), American Chemical Society, 2001, Vol. 101, pp. 3661-3688; an ATRP method in which polymerization is performed with a halogen compound serving as a polymerization initiator in the presence of a metal catalyst and a ligand (for example, Masami Kamigaito and two other authors, Chemical Reviews (United States), American Chemical Society, 2001, Vol. 101, pp. 3689-3746); an RAFT method in which dithiocarboxylate, a xanthate compound, or the like is used as a polymerization initiator (for example, PCT Japanese Translation Patent Publication No. 2000-515181); an MADIX method (for example, International Publication No. 99/05099), or a DT method (for example, Atsushi Goto and six other authors, Journal of The American Chemical Society (United States), American Chemical Society, 2003, Vol. 125, pp. 8720-8721).

Step 4 will be described below.

In step 4, polymer portion $P_1$ having a carboxy group is allowed to react with an amino group in azo compound (13) by a known method, thereby synthesizing a compound having an azo skeleton structure that contains a linking group having a carboxamide bond. Specific examples of the method include a method in which a dehydration-condensation agent, such as 1-ethyl-3-(3-dimethylaminopropyl) carbodiimide hydrochloride, is used (for example, Melvin S. Newman and one other author, The Journal of Organic Chemistry (United States), American Chemical Society, 1961, Vol. 26, No. 7, pp. 2525-2528); and the Schotten-Baumann method (for example, Norman O. V. Sonntag, Chemical Reviews (United States), American Chemical Society, 1953, Vol. 52, No. 2, pp. 237-416).

Although step 4 may be performed without using a solvent, step 4 may be performed in the presence of a solvent in order to prevent the rapid progress of the reaction. The solvent is not particularly limited as long as the solvent does not inhibit the reaction. Examples thereof include ethers, such as diethyl ether, tetrahydrofuran, and dioxane; hydrocarbons, such as benzene, toluene, xylene, hexane, and heptane; halogenated hydrocarbons, such as dichloromethane, dichloroethane, and chloroform; amides, such as N,N-dimethylformamide, N-methylpyrrolidone, and N,N-dimethylimidazolidinone; and nitriles, such as acetonitrile and propionitrile. These solvents may be used in combination as a mixture of two or more, depending on solubilities of substrates. When these solvents are used in combination as a mixture, the mixing ratio may be appropriately determined. The amount of the solvent used may be freely determined. However, the amount of the solvent used may be in the range of 1.0 to 20 times the mass of the polymer portion represented by $P_1$ in view of the reaction rate.

Step 4 is usually performed in the temperature range of 0° C. to 250° C. and usually completed within 24 hours.

An example of a scheme of method (ii) will be illustrated below and described in detail.

In method (ii), an azo compound having a linking group which forms a bonding moiety with the polymer and which is located at a position ($Ar_2$ in the formula (18)) different from that in method (i). The azo compound is bonded to the polymer portion by a condensation reaction, thereby synthesizing a compound having an azo skeleton structure.

[Chem. 20]

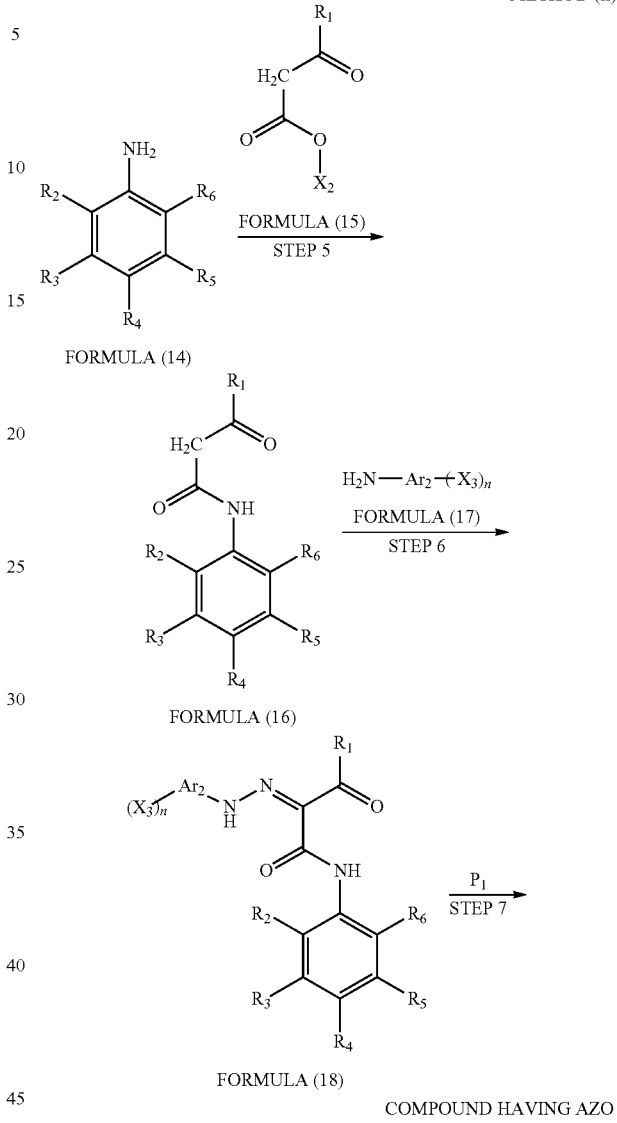

wherein $R_1$ to $R_6$ in the formulae (14) to (18) are defined the same as $R_1$ to $R_6$ in the formula (1); $P_1$ is defined the same as $P_1$ in the scheme of method (i); $Ar_2$ in each of the formulae (17) and (18) represents an arylene group; $X_2$ in the formula (15) represents a leaving group; $X_3$ in each of the formulae (17) and (18) represents a substituent that reacts with $P_1$ to form the divalent linking group; and n represents an integer of 1 or 2.

In the scheme illustrated above, the compound having an azo skeleton structure may be synthesized through steps 5 to 7. In step 5, an aniline derivative represented by the formula (14) and an acetoacetic acid analogue represented by the formula (15) are amidated to synthesize intermediate (16), which is an acylacetanilide analogue. In step 6, azo compound (18) is synthesized by diazo coupling of intermediate (16) with an aniline derivative (17). In step 7, the azo skeleton structure is bonded to polymer portion $P_1$ by a condensation reaction or the like.

Step 5 will be described below.

In step 5, intermediate (14), which is an acylacetanilide analogue, is synthesized by the same method as in step 1 of method (i).

Step 6 will be described below.

In step 6, azo compound (16) may be synthesized by the same method as in step 2 in method (i).

Regarding aniline derivative (17), various types thereof are readily commercially available. Furthermore, it may be easily synthesized by a known method.

Step 7 will be described below.

In step 7, azo skeleton structure (18) and the polymer portion $P_1$ are subjected to a condensation reaction or the like by the same way as the synthesis of polymer portion $P_1$ in method (i), thereby synthesizing a compound having an azo skeleton structure. Specifically, for example, a compound having an azo skeleton structure in which the linking group has a carboxylate linkage may be synthesized with polymer portion $P_1$ having a carboxy group and azo compound (18) in which $X_3$ represents a hydroxy group-containing substituent. Furthermore, a compound having an azo skeleton structure in which the linking group has a carboxamide linkage may be synthesized with polymer portion $P_1$ having a carboxy group and azo compound (18) in which $X_3$ represents an amino group-containing substituent.

An example of a scheme of method (iii) will be illustrated below and described in detail.

In method (iii), an azo compound having a polymerizable functional group is synthesized in advance and copolymerized with a polymerizable monomer to be formed into the monomer unit represented by the formula (4), thereby synthesizing the compound having the azo skeleton structure.

wherein $R_1$ to $R_6$, $Ar_2$, $X_3$ and n in each of the formulae (18) and (20) are defined the same as $R_1$ to $R_6$, $Ar_2$, $X_3$ and n, respectively, in the formula (18) in the scheme of method (ii); $R_{26}$ in the formula (19) represents a hydrogen atom or an alkyl group; $X_4$ represents a substituent to be allowed to react with $X_3$ in the formula (18); and $X_5$ represents a divalent linking group formed by the reaction of $X_3$ in the formula (18) and $X_4$ in the formula (19).

As illustrated in the scheme of method (iii) exemplified above, the compound having an azo skeleton structure is synthesized through steps 8 and 9. In step 8, azo compound (18) is allowed to react with vinyl group-containing compound represented by formula (19) to synthesize azo compound (20) having a polymerizable functional group. In step 9, azo compound (20) having a polymerizable functional group is copolymerized with a polymerizable monomer to be formed into the monomer unit represented by the formula (4).

Step 8 will be described below.

In step 8, azo compound (20) having a polymerizable functional group may be synthesized by the same method as in step 4 of method (i).

In step 9, azo skeleton structure (20) is copolymerized with a polymerizable monomer to be formed into the monomer unit represented by the formula (4) by the same method as the synthesis of $P_1$ in method (i), thereby synthesizing a compound having an azo skeleton structure.

An example of a scheme of method (iv) will be illustrated below and described in detail.

In method (iv), a halogen atom-containing azo compound serving as a polymerization initiator is synthesized in advance and copolymerized with a polymerizable monomer to be formed into the monomer unit represented by the formula (4), thereby synthesizing the compound having an azo skeleton structure.

[Chem. 21]

METHOD (iii)

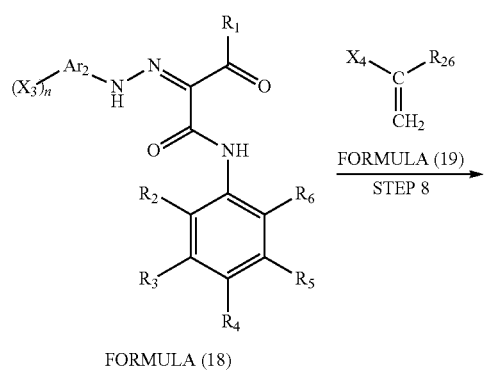

FORMULA (18)

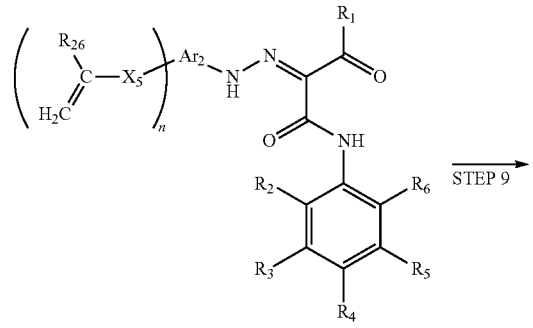

FORMULA (20)

COMPOUND HAVING AZO SKELETON STRUCTURE

[Chem. 22]

METHOD (iv)

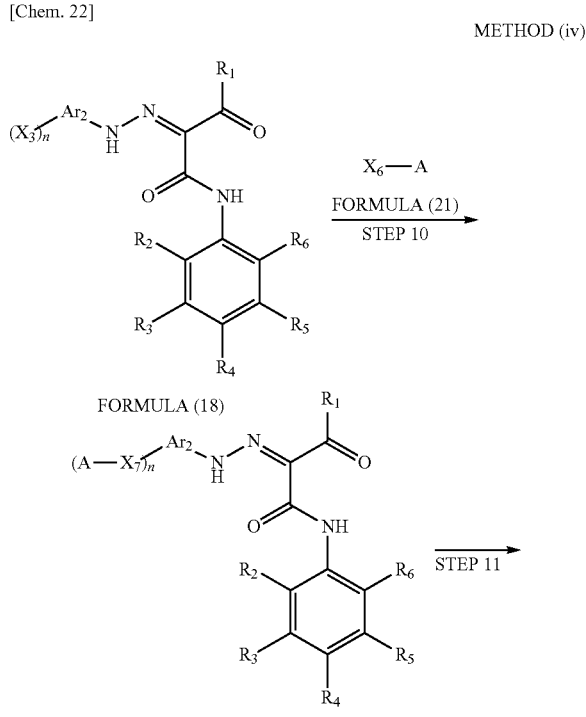

COMPOUND HAVING AZO SKELETON STRUCTURE wherein $R_1$ to $R_6$, $Ar_2$, $X_3$, and n in each of the formulae (18) and (22) are defined the same as $R_1$ to $R_6$, $Ar_2$, $X_3$ and n, respectively, in the formula (18) in the scheme of method (ii); $X_6$ in the formula (21) represents a substituent to be allowed to react with $X_3$ in the formula (18); A represents a chlorine atom, a bromine atom, or an iodine atom; and $X_7$ represents a divalent linking group formed by the reaction of $X_3$ in the formula (18) and $X_6$ in the formula (21).

As illustrated in the scheme exemplified above, a compound having an azo skeleton structure may be synthesized through steps 10 and 11. In step 10, azo compound (18) is allowed to react with a halogen atom-containing compound represented by the formula (21) to synthesize halogen atom-containing azo compound (22). In step 11, halogen atom-containing azo compound (22) serving as a polymerization initiator is copolymerized with a polymerizable monomer to be formed into the monomer unit represented by the formula (4).

Step 10 will be described below.

In step 10, halogen atom-containing azo compound (22) may be synthesized by the same method as in step 4 in method (i). Specifically, for example, halogen atom-containing azo compound (22) may be synthesized with halogen atom-containing compound (21) having a carboxy group and azo compound (18) in which $X_3$ represents a hydroxy group-containing substituent. Furthermore, halogen atom-containing azo compound (22) may be synthesized with halogen atom-containing compound (21) having a carboxy group and azo compound (18) in which $X_3$ represents an amino group-containing substituent.

Examples of halogen atom-containing compound (21) having a carboxy group include chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethylmethylbenzoic acid, and 1-chloroethylbenzoic acid. Halides and anhydrides of these acids may also be used in an embodiment of the present invention.

Examples of halogen atom-containing compound (21) having a hydroxy group include 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, and 2-phenyl-2-iodoethanol.

Step 11 will be described below.

In step 11, the compound having an azo skeleton structure may be synthesized by the ATRP method in method (ii). Specifically, halogen atom-containing azo compound (22) serving as a polymerization initiator is copolymerized with a polymerizable monomer to be formed into the monomer unit represented by the formula (4) in the presence of a metal catalyst and a ligand.

The metal catalyst used in the ATRP method is not particularly limited and may be at least one transition metal selected from groups 7 to 11 of the periodic table. In redox catalysts (redox conjugate complexes) in which a low-valent complex and a high-valent complex are reversibly changed, specific examples of a low-valent metal include metals selected from the group consisting of $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$ and $Mn^{3+}$. Of these metals, $Cu^+$, $Ru^{2+}$, $Fe^{2+}$ or $Ni^{2+}$ may be used. Particularly, $Cu^+$ may be used. Specific examples of a monovalent copper compound include cuprous chloride, cuprous bromide, cuprous iodide, and cuprous cyanide.

As the ligand used in the ATRP method, an organic ligand is commonly used. Examples thereof include 2,2'-bipyridyl and derivatives thereof; 1,10-phenanthroline and derivatives thereof; tetramethylethylenediamine, N,N,N',N'',N''-pentamethyldiethylenetriamine, tris(dimethylaminoethyl)amine, triphenylphosphine, and tributylphosphine. Among these compounds, in particular, aliphatic polyamines, such as N,N,N',N'',N''-pentamethyldiethylenetriamine may be used.

The compounds each having an azo skeleton structure, the compounds being obtained by the synthesis methods, and the compounds represented by the formulae (10), (12), (13), (16), (18), (20), and (22) may be purified by common methods for isolation and purification of organic compounds. Examples of the isolation and purification methods include a recrystallization method and a reprecipitation method with organic solvents; and column chromatography with silica gel. One or a combination of two or more of these methods may be used to purify the compounds, thereby providing high-purity compounds.

Identification of Compound and Measurement of Purity

The compounds represented by the formulae (10), (12), (13), (16), (18), (20), and (22) were identified and analyzed to determine the purity by nuclear magnetic resonance spectroscopy [ECA-400, manufactured by JEOL Ltd.), ESI-TOF MS (LC/MSD TOF, manufactured by Agilent Technologies), and HPLC analysis (LC-20A, manufactured by Shimadzu Corporation).

The compounds each having an azo skeleton structure were identified and analyzed to determine the molecular weight by size exclusion chromatography (SEC) (HLC8220GPC, manufactured by Tosoh Corporation), $^1H$ nuclear magnetic resonance spectroscopy (ECA-400, manufactured by JEOL Ltd.), $^{13}C$ nuclear magnetic resonance spectroscopy (FT-NMR AVANCE-600, manufactured by Bruker BioSpin K.K.), and acid value measurement according to Japanese Industrial Standard (JIS) K-0070 (automatic titrator COM-2500, manufactured by Hiranuma Sangyo Corporation).

Pigment-Dispersing Agent and Pigment Composition

A pigment-dispersing agent and a pigment composition according to embodiments of the present invention will be described below.

The pigment-dispersing agent according to an embodiment of the present invention may contain a compound having an azo skeleton structure because the compound having an azo skeleton structure has high affinities for various pigments and water-insoluble solvents. In this case, one or a combination of two or more of the compounds each having an azo skeleton structure may be used in the pigment-dispersing agent.

The pigment-dispersing agent according to an embodiment of the present invention may contain the compound having an azo skeleton structure according to an embodiment of the present invention.

The pigment composition according to an embodiment of the present invention contains the compound having an azo skeleton structure and a pigment. The pigment composition may be used for coatings, inks, toners, and resin molded products.

A yellow pigment contained in a pigment composition according to an embodiment of the present invention may be appropriately selected from, for example, yellow pigments described in Organic Pigments Handbook published in 2006 (written and published by Isao Hashimoto). Specific examples thereof include monoazo-based pigments, bisazo-based pigments, polyazo-based pigments, isoindoline-based pigments, condensed azo-based pigments, azomethine-based pigments, anthraquinone-based pigments, and quinoxaline-based pigments. Of these pigments, monoazo-based pigments, bisazo-based pigments, polyazo-based pigments, and isoindoline-based pigments may be used. Specifically, acetoacetanilide-based pigments, such as C.I. Pigment Yellow 74, C.I. Pigment Yellow 83, C.I. Pigment Yellow 93, C.I. Pigment Yellow 128, C.I. Pigment Yellow 155, C.I. Pigment Yellow 175, and C.I. Pigment Yellow 180, and isoindoline-based pigments, such as C.I. Pigment Yellow 139 and C.I. Pigment Yellow 185, may be used because they have high affinities for a compound having an azo skeleton structure according to an embodiment of the present invention. In particular, C.I. Pigment Yellow 155, C.I. Pigment Yellow 180, and C.I. Pigment Yellow 185 may be used because the compound having an azo skeleton structure according to an embodiment of the present invention has the effect of highly dispersing them.

The yellow pigments may be used separately or in combination as a mixture of two or more.

As a yellow colorant contained in the pigment composition according to an embodiment of the present invention, the yellow pigment described above may be used in combination with a known yellow colorant as long as the dispersibility of the pigment is not inhibited.

Examples of the colorant that may be used in combination include condensed azo compounds, isoindolinone compounds, anthraquinone compounds, azo metal complexes, methine compounds, quinophthalone compounds, and arylamide compounds.

Specific examples of the colorant that may be used include C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 129, C.I. Pigment Yellow 139, C.I. Pigment Yellow 147, C.I. Pigment Yellow 151, C.I. Pigment Yellow 154, C.I. Pigment Yellow 168, C.I. Pigment Yellow 174, C.I. Pigment Yellow 176, C.I. Pigment Yellow 181, C.I. Pigment Yellow 191, C.I. Pigment Yellow 194, C.I. Pigment Yellow 213, C.I. Pigment Yellow 214, C.I. Vat Yellow 1, C.I. Vat Yellow 3, C.I. Vat Yellow 20, Mineral Fast Yellow, Navel Yellow, Naphthol Yellow S, Hansa Yellow G, Permanent Yellow NCG, C.I. Solvent Yellow 9, C.I. Solvent Yellow 17, C.I. Solvent Yellow 24, C.I. Solvent Yellow 31, C.I. Solvent Yellow 35, C.I. Solvent Yellow 58, C.I. Solvent Yellow 93, C.I. Solvent Yellow 100, C.I. Solvent Yellow 102, C.I. Solvent Yellow 103, C.I. Solvent Yellow 105, C.I. Solvent Yellow 112, C.I. Solvent Yellow 162, and C.I. Solvent Yellow 163.

A magenta pigment contained in a pigment composition according to an embodiment of the present invention may be appropriately selected from magenta pigments, such as quinacridone-based pigments, monoazonaphthol-based pigments, disazonaphthol-based pigments, perylene-based pigments, thioindigo-based pigments, diketopyrrolopyrrole-based pigments, naphthol AS-based pigments, and BONA lake-based pigments, described in Organic Pigments Handbook published in 2006 (written and published by Isao Hashimoto). Among these pigments, quinacridone-based pigments, diketopyrrolopyrrole-based pigments, naphthol AS-based pigments, and BONA lake-based pigments may be used.

In particular, quinacridone-based pigments represented by the formula (23), diketopyrrolopyrrole-based pigments represented by the formula (24), naphthol AS-based pigments represented by the formula (25), and BONA lake-based pigments may be used. The reason for this is that these pigments have high affinities for a compound having an azo skeleton structure according to an embodiment of the present invention.

[Chem. 23]

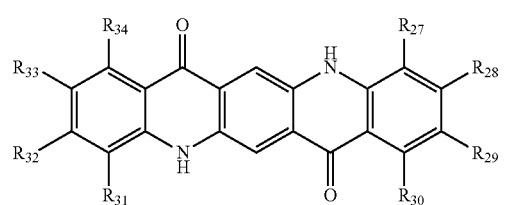

formula (23)

In the formula (23), $R_{27}$ to $R_{34}$ each independently represent a hydrogen atom, a chlorine atom, or a methyl group.

[Chem. 24]

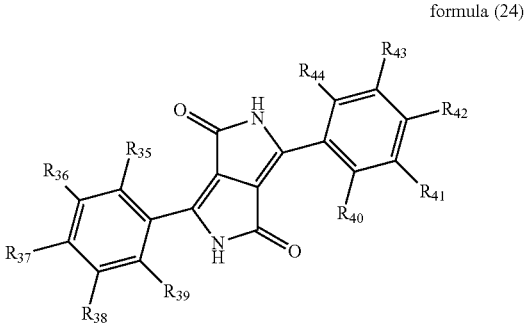

formula (24)

In the formula (24), $R_{35}$ to $R_{44}$ each independently represent a hydrogen atom, a chlorine atom, a tert-butyl group, a cyano group, or a phenyl group.

[Chem. 25]

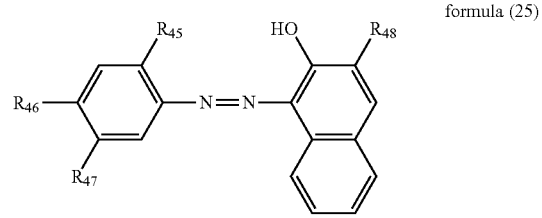

formula (25)

In the formula (25), $R_{45}$ to $R_{47}$ each independently represent a hydrogen atom, a methoxy group, a methyl group, a nitro group, a chlorine atom, N,N-diethylaminosulfonyl group, a sulfo group, a sulfonate group, or a $CONHR_{49}$ group, $R_{48}$ represents an amino group, a carboxy group, a carboxylate group, or a $CONHR_{50}$ group, and $R_{49}$ and $R_{50}$ each independently represent a hydrogen atom or a phenyl group.

Examples of quinacridone-based pigments represented by the formula (23) include C.I. Pigment Red 202, C.I. Pigment Red 122, C.I. Pigment Red 192, and C.I. Pigment Red 209.

In the formula (23), $R_{27}$, $R_{28}$, $R_{30}$ to $R_{32}$, and $R_{34}$ may each represent a hydrogen atom, and $R_{29}$ and $R_{33}$ may each represent a hydrogen atom, a chlorine atom, or a methyl group, from the viewpoint of achieving a good affinity for a compound having an azo skeleton structure according to an embodiment of the present invention.

Examples of diketopyrrolopyrrole-based pigments represented by the formula (24) include C.I. Pigment Red 255, C.I. Pigment Red 254, and C.I. Pigment Red 264.

In the formula (24), $R_{35}$, $R_{36}$, $R_{38}$ to $R_{41}$, $R_{43}$, and $R_{44}$ may each represent a hydrogen atom, and $R_{37}$ and $R_{42}$ may each represent a hydrogen atom or a phenyl group, from the viewpoint of achieving a good affinity for a compound having an azo skeleton structure according to an embodiment of the present invention.

Examples of naphthol AS-based pigments represented by the formula (25) include C.I. Pigment Red 2, C.I. Pigment Red 3, C.I. Pigment Red 5, C.I. Pigment Red 6, C.I. Pigment Red 7, C.I. Pigment Red 23, C.I. Pigment Red 150, C.I. Pigment Red 146, C.I. Pigment Red 184, and C.I. Pigment Red 269.

Examples of BONA lake-based pigments represented by the formula (25) include C.I. Pigment Red 48:2, C.I. Pigment Red 48:3, C.I. Pigment Red 48:4, and C.I. Pigment Red 57:1.

Regarding $R_{45}$ to $R_{50}$ in the formula (25), among these substituents, at least one of $R_{45}$ to $R_{47}$ may represent a $CONHR_{49}$ group, and $R_{48}$ may represent a $CONHR_{50}$ group, from the viewpoint of achieving a good affinity for a compound having an azo skeleton structure according to an embodiment of the present invention. Furthermore, $R_{50}$ may represent a hydrogen atom from the viewpoint of achieving a good affinity for a compound having an azo skeleton structure according to an embodiment of the present invention.

In an embodiment of the present invention, in particular, quinacridone-based pigments, such as C.I. Pigment Red 122 and C.I. Pigment Red 202, C.I. Pigment Red 255, C.I. Pigment Red 264, and naphthol AS-based pigments, such as C.I. Pigment Red 150, may be used from the viewpoint of achieving a good affinity for a compound having an azo skeleton structure according to an embodiment of the present invention.

The magenta pigments may be used separately or in combination of two or more.

As a magenta colorant contained in the pigment composition according to an embodiment of the present invention, the magenta pigment described above may be used in combination with a known magenta colorant as long as the dispersibility of the pigment is not inhibited.

Examples of the magenta colorant that may be used in combination include condensed azo compounds, anthraquinone, basic dye lake compounds, benzimidazolone compounds, thioindigo compounds, and perylene compounds. Specific examples thereof include C.I. Pigment Red 81:1, C.I. Pigment Red 144, C.I. Pigment Red 166, C.I. Pigment Red 169, C.I. Pigment Red 177, C.I. Pigment Red 185, C.I. Pigment Red 220, C.I. Pigment Red 221, and C.I. Pigment Red 238.

As a cyan pigment contained in a pigment composition according to an embodiment of the present invention, a phthalocyanine pigment represented by the following formula (26) may be used:

[Chem. 26]

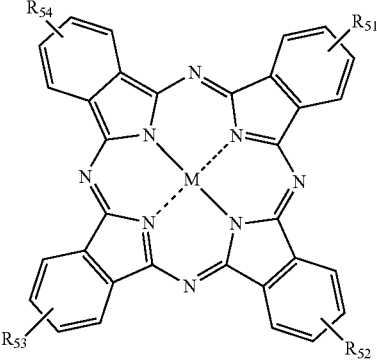

formula (26)

wherein in the formula (26), $R_{51}$ to $R_{54}$ each independently represent a hydrogen atom, a chlorine atom, an alkyl group, a sulfo group, or a sulfonate group; and M represents a metal atom or a hydrogen atom.

Examples of the phthalocyanine pigment represented by the formula (26) include C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Blue 16, C.I. Pigment Blue 17, C.I. Pigment Blue 17:1, C.I. Pigment Blue 68, C.I. Pigment Blue 70, C.I. Pigment Blue 75, C.I. Pigment Blue 76, and C.I. Pigment Blue 79.

Of these pigments, in particular, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, or C.I. Pigment Blue 15:6 may be used from the viewpoint of achieving a good affinity for a compound having an azo skeleton structure according to an embodiment of the present invention.

The cyan pigments described above may be used separately or in combination as a mixture of two or more.

As a cyan colorant contained in the pigment composition according to an embodiment of the present invention, the cyan pigment described above may be used in combination with a known cyan colorant as long as the dispersibility of the pigment is not inhibited.

Examples of the cyan colorant that may be used in combination include C.I. Pigment Blue 1, C.I. Pigment Blue 1:2, C.I. Pigment Blue 1:3, C.I. Pigment Blue 2, C.I. Pigment Blue 2:1, C.I. Pigment Blue 2:2, C.I. Pigment Blue 3, C.I. Pigment Blue 4, C.I. Pigment Blue 5, C.I. Pigment Blue 6, C.I. Pigment Blue 7, C.I. Pigment Blue 8, C.I. Pigment Blue 9, C.I. Pigment Blue 9:1, C.I. Pigment Blue 10, C.I. Pigment Blue 10:1, C.I. Pigment Blue 11, C.I. Pigment Blue 12, C.I. Pigment Blue 13, C.I. Pigment Blue 14, C.I. Pigment Blue 18, C.I. Pigment Blue 19, C.I. Pigment Blue 20, C.I. Pigment Blue 21, C.I. Pigment Blue 22, C.I. Pigment Blue 23, C.I. Pigment Blue 24, C.I. Pigment Blue 24:1, C.I. Pigment Blue 25, C.I. Pigment Blue 26, C.I. Pigment Blue 27, C.I. Pigment Blue 28, C.I.

Pigment Blue 29, C.I. Pigment Blue 30, C.I. Pigment Blue 31, C.I. Pigment Blue 32, C.I. Pigment Blue 33, C.I. Pigment Blue 34, C.I. Pigment Blue 35, C.I. Pigment Blue 36, C.I. Pigment Blue 36:1, C.I. Pigment Blue 52, C.I. Pigment Blue 53, C.I. Pigment Blue 56, C.I. Pigment Blue 56:1, C.I. Pigment Blue 57, C.I. Pigment Blue 58, C.I. Pigment Blue 59, C.I. Pigment Blue 60, C.I. Pigment Blue 61, C.I. Pigment Blue 61:1, C.I. Pigment Blue 62, C.I. Pigment Blue 63, C.I. Pigment Blue 64, C.I. Pigment Blue 65, C.I. Pigment Blue 66, C.I. Pigment Blue 67, C.I. Pigment Blue 69, C.I. Pigment Blue 71, C.I. Pigment Blue 72, C.I. Pigment Blue 73, C.I. Pigment Blue 74, C.I. Pigment Blue 77, C.I. Pigment Blue 78, C.I. Pigment Blue 80, C.I. Pigment Blue 81, C.I. Pigment Blue 82, C.I. Pigment Blue 83, and C.I. Pigment Blue 84.

To adjust a color tone, a colorant other than the cyan colorant may be used. For example, the use of a mixture of C.I. Pigment Blue 15:3 and C.I. Pigment Green 7 improves the color purity of cyan.

As a black colorant contained in a pigment composition according to an embodiment of the present invention, carbon black may be used.

Carbon black used in an embodiment of the present invention is not particularly limited. Carbon blacks produced by methods, such as a thermal method, an acetylene method, a channel method, a furnace method, and a lamp-black method may be used.

The average particle size of primary particles of the carbon black used in an embodiment of the present invention is, but not particularly limited to, preferably 14 to 80 nm and more preferably 25 to 50 nm from the viewpoint of achieving a good color tone.

The average particle diameter of the primary particles of the carbon black may be measured by photographing an enlarged image of the particles with a scanning electron microscope.

The dibutyl phthalate (DBP) absorption number of the carbon black used in an embodiment of the present invention is, but not particularly limited to, 30 to 200 mL/100 g and more preferably 40 to 150 mL/100 g. In the case where the DBP absorption number of the carbon black is within the range described above, the carbon black used for printing an image has further improved tinting strength.

The DBP absorption number of carbon black refers to the amount of dibutyl phthalate (DBP) absorbed by 100 g of carbon black and may be measured according to JIS K6217.

The pH of the carbon black is not particularly limited as long as the dispersibility of the compound having an azo skeleton structure is not significantly inhibited by the carbon black. The pH of the carbon black may be measured by measuring a liquid mixture of the carbon black and distilled water with a pH electrode.

The specific surface area of the carbon black is, but not particularly limited to, preferably 300 m$^2$/g or less and more preferably 100 m$^2$/g or less. In the case where the specific surface area of the carbon black is within the range described above, the amount of the compound having an azo skeleton structure added may be further reduced.

The specific surface area of the carbon black refers to a BET specific surface area and may be measured according to JIS K4652.

The carbon blacks described above may be used separately or in combination as a mixture of two or more.

As a black colorant used in an embodiment of the present invention, the carbon black described above may be used in combination with a known black colorant as long as the dispersibility of the carbon black is not inhibited.

Examples of the black colorant that may be used in combination include C.I. Pigment Black 1, C.I. Pigment Black 10, C.I. Pigment Black 31, C.I. Natural Black 1, C.I. Natural Black 2, C.I. Natural Black 3, C.I. Natural Black 4, C.I. Natural Black 5, C.I. Natural Black 6, and activated carbon.

To perform toning, the black colorant contained in a pigment composition according to an embodiment of the present invention may be used in combination with a known magenta, cyan, or yellow colorant.

Pigments that may be used in an embodiment of the present invention are not limited to the foregoing pigments because pigments other than the yellow pigments, the magenta pigments, the cyan pigments, and the carbon black as described above may also be used as long as they have affinities for a pigment-dispersing agent according to an embodiment of the present invention.

These pigments may be crude pigments (pigments which are produced from raw materials corresponding to the foregoing pigments and which are not adjusted by performing purification, the control of the crystal forms and the particle size, or surface treatment). Furthermore, adjusted pigment compositions may be used as long as the effect of the compound having an azo skeleton structure is not significantly inhibited.

The composition ratio, on a mass basis, of a pigment to a compound having an azo skeleton structure in a pigment composition according to an embodiment of the present invention (the mass of the pigment:the mass of the compound having an azo skeleton structure) is preferably in the range of 100:0.1 to 100:100 and more preferably 100:0.5 to 100:20 from the viewpoint of achieving good pigment dispersibility.

The pigment composition may be produced by a wet or dry process. The compound having an azo skeleton structure according to an embodiment of the present invention has a high affinity for water-insoluble solvents. Thus, the pigment composition may be produced by a wet process, in which a uniform pigment composition may be easily produced. Specifically, a pigment composition may be produced as described below.

A pigment-dispersing agent and, optionally, a resin are dissolved in a dispersion medium. A pigment powder is slowly added thereto under stirring and sufficiently mixed with the dispersion medium. The application of a mechanical shear force to the mixture with a disperser allows the pigment-dispersing agent to adsorb on surfaces of the pigment particles, thereby resulting in a fine dispersion in which the pigment is stably and uniformly dispersed in the form of fine particles. Examples of the disperser include kneaders, roll mills, ball mills, paint shakers, dissolvers, attritors, sand mills, and high-speed mills.

An auxiliary agent may be added to a pigment composition according to an embodiment of the present invention during the production. Examples of the auxiliary agent include surfactants, dispersants, fillers, standardizers, resins, waxes, antifoaming agents, antistatic agents, antidust agents, extending agents, shading colorants, preservatives, drying inhibitors, rheology controlling agents, humectants, antioxidants, UV absorbers, and photostabilizers. These auxiliary agents may be used in combination. The pigment-dispersing agent according to an embodiment of the present invention may be added in advance at the time of the production of the crude pigment.

Pigment Dispersion

A pigment dispersion according to an embodiment of the present invention will be described below.

A pigment dispersion according to an embodiment of the present invention contains the pigment composition and a water-insoluble solvent serving as a dispersion medium. The pigment dispersion may be a dispersion in which the pigment composition is dispersed in the water-insoluble solvent or a dispersion in which components constituting the pigment composition are dispersed in the water-insoluble solvent. For example, the pigment dispersion may be produced as described below.

A pigment-dispersing agent and a resin are dissolved in a dispersion medium, as needed. A pigment or a pigment composition powder is slowly added thereto under stirring and sufficiently mixed with the dispersion medium. The application of a mechanical shear force to the mixture with a disperser, for example, a ball mill, a paint shaker, a dissolver, an attritor, a sand mill, or a high-speed mill, allows the pigment to be stably and uniformly dispersed in the form of fine particles.

The water-insoluble solvent serving as a dispersion medium for a pigment dispersion according to an embodiment of the present invention is determined, depending on the intended use of the pigment dispersion, and is not particularly limited. Examples of the water-insoluble solvent include esters, such as methyl acetate, ethyl acetate, and propyl acetate; hydrocarbons, such as hexane, octane, petroleum ethers, cyclohexane, benzene, toluene, and xylene; halogenated hydrocarbons, such as carbon tetrachloride, trichloroethylene, and tetrabromoethane.

The water-insoluble solvent serving as a dispersion medium for a pigment dispersion according to an embodiment of the present invention may be a polymerizable monomer. Examples of the polymerizable monomer are described below.

Examples thereof include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, isopropyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile, and acrylamide. Among these compounds, the water-insoluble solvent may be styrene from the viewpoint of achieving a good affinity for a compound having an azo skeleton structure according to an embodiment of the present invention.

A resin that may be dissolved in the water-insoluble solvent is determined, depending on the intended use of the pigment composition and is not particularly limited. Examples of the resin include polystyrene resins, styrene copolymers, polyacrylic resins, polymethacrylic resins, polyacrylate resins, polymethacrylate resins, acrylate copolymers, methacrylate copolymers, polyester resins, polyvinyl ether resins, polyvinyl alcohol resins, polyvinyl butyral resins, polyurethane resins, and polypeptide resins. These resins may be used in combination as a mixture of two or more.

Toner

A toner according to an embodiment of the present invention will be described below.

The toner according to an embodiment of the present invention includes toner particles containing a binder resin and a colorant. Here, the foregoing pigment composition is used as the colorant. Thus, satisfactory dispersibility of the pigment in the toner particles is maintained, so that the toner has high tinting strength.

As the binder resin, a known, commonly used resin may be used.

Specific examples thereof include styrene-methacrylic acid copolymers, styrene-acrylic acid copolymers, polyester resins, epoxy resins, and styrene-butadiene copolymers.

The toner particles may be directly produced by the polymerization of a polymerizable monomer using a polymerization method. Examples of the polymerizable monomer used here are described below.

Examples thereof include styrene-based monomers, such as styrene, α-methylstyrene, α-ethylstyrene, o-methylstyrene, m-methylstyrene, p-methylstyrene, o-ethylstyrene, m-ethylstyrene, and p-ethylstyrene; methacrylate-based monomers, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylamide; acrylate-based monomers, such as methyl acrylate, ethyl acrylate, isopropyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylamide; and olefin-based monomers, such as butadiene, isoprene, and cyclohexene.

These monomers are used alone. Alternatively, these monomers are appropriately mixed together in such a manner that the mixture has a theoretical glass transition temperature (Tg) of 40° C. to 75° C. (see edited by J. Brandrup, E. H. Immergut, Polymer Handbook (United States), third edition, John Wiley & Sons, 1989, pp. 209-277. In the case where the theoretical glass transition temperature is within the range described above, it is possible to further improve the storage stability and durability of the toner and the clarity of a full-color image.

In the case where a combination of a nonpolar resin, for example, polystyrene and a polar resin, for example, a polyester resin or a polycarbonate resin, is used as the binder resin, it is possible to control the distribution of additives, such as a colorant, a charge control agent, and a wax, in a toner particle. For example, in the case where toner particles are directly produced by a suspension polymerization method, the polar resin is added during the polymerization reaction from a dispersion step to a polymerization step. The polar resin is added in view of the balance between the polarity of the polymerizable monomer composition to be formed into toner particles and the polarity of an aqueous medium. The concentration of the polar resin may be controlled so as to vary continuously from a surface of a toner particle to the center thereof, for example, to form a thin layer of the polar resin on the surface of the toner particle. In this case, the use of a polar resin that interacts with the compound having an azo skeleton structure, the colorant, and the charge control agent may enable the colorant to be present in the toner particles in a predetermined state.

In an embodiment of the present invention, a cross-linking agent may be used in the synthesis of the binder resin in order to increase the mechanical strength of toner particles and to control the molecular weight of the binder resin.

As the cross-linking agent, a bifunctional cross-linking agent and tri- or higher functional cross-linking agent may be used.

Examples of the bifunctional cross-linking agent include divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, polyester-type diacrylate, and compounds in which these diacrylates are replaced with corresponding dimethacrylates.

Examples of the tri- or higher functional cross-linking agent include pentaerythritol triacrylate, trimethylolethane triacrylate, trimethylolpropane triacrylate, tetramethylolmethane tetraacrylate, oligoester acrylates, and methacrylates thereof, 2,2-bis(4-methacryloxyphenyl)propane, diallyl phthalate, triallyl cyanurate, triallyl isocyanurate, and triallyl trimellitate.

The amount of the cross-linking agent added is preferably 0.05 to 10 parts by mass and more preferably 0.1 to 5 parts by mass with respect to 100 parts by mass of the polymerizable monomer from the viewpoint of achieving good fixability and offset resistance of the toner.

In an embodiment of the present invention, a wax may be used in order to prevent the adhesion of toner particles to a fixing member.

Examples of the wax include petroleum-based waxes, such as paraffin waxes, microcrystalline waxes, and petrolatum and derivatives thereof; montan waxes and derivatives thereof; hydrocarbon waxes produced by a Fischer-Tropsch process and derivatives thereof; polyolefin waxes, such as polyethylene, and derivatives thereof; and natural waxes, such as carnauba waxes and candelilla waxes, and derivatives thereof. These derivatives include oxides, block copolymers with vinyl monomers, and graft-modified products. Examples of the wax further include alcohols, such as higher aliphatic alcohols; fatty acids, such as stearic acid and palmitic acid; fatty acid amides, fatty acid esters, hardened castor oil, and derivatives thereof; vegetable waxes; and animal waxes. These waxes may be used separately or in combination.

The amount of the wax added is preferably 2.5 to 15.0 parts by mass and more preferably 3.0 to 10.0 parts by mass with respect to 100 parts by mass of the binder resin. In the case where the amount of the wax added is within the range described above, it is possible to further improve the fixability and chargeability. To optimally control the amount of charge due to rubbing, depending on a system for developing a toner, toner particles may optionally contain a charge control agent.

As the charge control agent, known charge control agents may be used. In particular, a charge control agent that enables high-speed charging and stably maintains a constant amount of charge may be used. Furthermore, in the case where toner particles are produced directly from a polymerizable monomer by a polymerization method, such as a suspension polymerization method, a charge control agent that exhibits a low polymerization-inhibiting property and contains substantially no soluble substance in an aqueous medium may be used.

As the charge control agent, a negatively chargeable charge control agent and a positively chargeable charge control agent may be used.

Examples of the negatively chargeable charge control agent include polymers and copolymers containing sulfonic groups, sulfonate groups, or sulfonic acid ester groups; salicylic acid derivatives and metal complexes thereof; monoazo metal compounds; metal acetylacetonate compounds; aromatic oxycarboxylic acids, aromatic mono- and poly-carboxylic acids, metal salts thereof, anhydrides thereof, and esters thereof; and phenol derivatives, such as bisphenol; urea derivatives; metal-containing naphthoic acid compounds; boron compounds; quaternary ammonium salts; calixarenes; and resin-based charge control agents.

Examples of the positively chargeable charge control agent include nigrosine and nigrosine modified with metal salts of fatty acids; guanidine compounds; imidazole compounds; salts of tributylbenzylammonium-1-hydroxy-4-naphthosulfonic acid; quaternary ammonium salts, such as tetrabutylammonium tetrafluoroborate, onium salts, such as phosphonium salts, which are analogues thereof, and lake pigments thereof; triphenylmethane dyes and lake pigments thereof (the laking agent includes phosphotungstic acid, phosphomolybdic acid, phosphotungstomolybdic acid, tannic acid, lauric acid, gallic acid, ferricyanides, and ferrocyanides); metal salts of higher fatty acids; diorganotin oxides, such as dibutyltin oxide, dioctyltin oxide, and dicyclohexyltin oxide; diorganotin borates, such as dibutyltin borate, dioctyltin borate, and dicyclohexyltin borate; and resin-based charge control agents.

These charge control agents may be used separately or in combination of two or more.

In the toner according to an embodiment of the present invention, an inorganic fine powder may be added as a fluidizing agent to the toner particles. Examples of the inorganic fine powder that may be used include fine powders composed of silica, titanium oxide, alumina, and double oxides thereof, and surface-treated powders thereof.

Method for Producing Toner Particles

Examples of a method for producing toner particles include a pulverization method, a suspension polymerization method, a suspension granulation method, and an emulsion polymerization method, all of which are commonly used. The toner particles may be produced by the suspension polymerization method or the suspension granulation method in view of the environmental load of the production and the controllability of the particle size among these production methods.

For example, toner particles produced by the suspension polymerization method are produced as described below.

A colorant containing a pigment composition according to an embodiment of the present invention, a polymerizable monomer, a wax, a polymerization initiator, and so forth are mixed together to prepare a polymerizable monomer composition. The polymerizable monomer composition is dispersed in an aqueous medium to form particles of the polymerizable monomer composition. The polymerizable monomer in the particles of the polymerizable monomer composition is polymerized in an aqueous medium to provide toner particles.

The polymerizable monomer composition may be prepared by dispersing the colorant in a first polymerizable monomer to provide a dispersion, and then by mixing the resulting dispersion with a second polymerizable monomer.

That is, the pigment composition is sufficiently dispersed in the first polymerizable monomer, and then the resulting dispersion is mixed with the second polymerizable monomer together with other toner materials. Thereby, the pigment may be present in the toner particles in a satisfactory dispersed state.

As a polymerization initiator used in the suspension polymerization method, a known polymerization initiator may be used. Examples thereof include azo compounds, organic peroxides, inorganic peroxides, organometallic compounds, and photopolymerization initiators. Specific examples thereof include azo-based polymerization initiators, such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis(isobutyrate); organic peroxide-based polymerization initiators, such as benzoyl peroxide, di-tert-butyl peroxide, tert-butylperoxyisopropyl monocarbonate, tert-hexyl peroxybenzoate, and tert-butyl peroxybenzoate; inorganic peroxide-based polymerization initiators, such as potassium persulfate and ammonium persulfate; and hydrogen peroxide-ferrous compound-based polymerization initiators, BPO-dimethylaniline-based polymerization initiators, and cerium(IV) salt-alcohol-based polymerization initiators. Examples of the photopolymerization initiators include acetophenones, benzoin ethers, and ketals. These polymerization initiators may be used separately or in combination of two or more.

The amount of the polymerization initiator added is preferably 0.1 to 20 parts by mass and more preferably 0.1 to 10 parts by mass with respect to 100 parts by mass of the polymerizable monomer.

The aqueous medium used in the suspension polymerization method may contain a dispersion stabilizer. As the dispersion stabilizer, known inorganic and organic dispersion stabilizers may be used.

Examples of the inorganic dispersion stabilizer include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina.

Examples of the organic dispersion stabilizer include polyvinyl alcohol, gelatin, methylcellulose, methylhydroxypropylcellulose, ethylcellulose, a sodium salt of carboxymethylcellulose, and starch.

Nonionic, anionic, and cationic surfactants may also be used. Examples thereof include sodium dodecyl sulfate, sodium tetradecyl sulfate, sodium pentadecyl sulfate, sodium octyl sulfate, sodium oleate, sodium laurate, potassium stearate, and calcium oleate.

Among these dispersion stabilizers, in an embodiment of the present invention, a poorly water-soluble inorganic dispersion stabilizer soluble in an acid may be used. In an embodiment of the present invention, in the case where an aqueous medium is prepared with a poorly water-soluble inorganic dispersion stabilizer, the amount of the dispersion stabilizer added may be 0.2 to 2.0 parts by mass with respect to 100 parts by mass of a polymerizable monomer. When the dispersion stabilizer is used in an amount within the range described above, the droplet stability of the polymerizable monomer composition in the aqueous medium is improved. In an embodiment of the present invention, the aqueous medium may be prepared using 300 to 3000 parts by mass of water with respect to 100 parts by mass of the polymerizable monomer composition.

In an embodiment of the present invention, in the case where an aqueous medium containing the poorly water-soluble inorganic dispersion stabilizer dispersed therein is prepared, a commercially available dispersion stabilizer may be dispersed without further treatment. Furthermore, the poorly water-soluble inorganic dispersion stabilizer may be formed in water under high-speed stirring to provide dispersion stabilizer particles having a fine, uniform particle size. For example, in the case where calcium phosphate is used as a dispersion stabilizer, an aqueous solution of sodium phosphate and an aqueous solution of calcium chloride may be mixed together under high-speed stirring to form a dispersion stabilizer.

The toner particles according to an embodiment of the present invention may also be produced by a suspension granulation method. The production process of the suspension granulation method does not include a heating step. It is thus possible to inhibit the occurrence of compatibilization of a resin and a wax when a low-melting point wax is used and to prevent a reduction in the glass transition temperature of the toner due to the compatibilization. Furthermore, in the suspension granulation method, a toner material serving as a binder resin may be selected from a wide range of resins. Thus, a polyester resin, which is generally believed to be advantageous in terms of fixability, may be easily used as a main component. The suspension granulation method is advantageous in producing toner particles having a resin composition that cannot be produced by the suspension polymerization method.

For example, toner particles produced by the suspension granulation method are provided as described below. A colorant containing a pigment composition according to an embodiment of the present invention, a binder resin, a wax, and so forth are mixed together in a solvent to prepare a solvent composition. The solvent composition is dispersed in an aqueous medium to form particles of the solvent composition, thereby providing a toner particle suspension. Removal of the solvent in the suspension by heat or under reduced pressure provides toner particles.

The solvent composition in the foregoing step may be prepared by mixing a dispersion containing the colorant dispersed in a first solvent with a second solvent. Specifically, the colorant is sufficiently dispersed in the first solvent, and then the resulting dispersion is mixed with the second solvent together with other toner materials. Thereby, the pigment may be present in the toner particles in a satisfactory dispersed state.

Examples of a solvent that may be used in the suspension granulation method include hydrocarbons, such as toluene, xylene, and hexane; halogenated hydrocarbons, such as methylene chloride, chloroform, dichloroethane, trichloroethane, and carbon tetrachloride; alcohols, such as methanol, ethanol, butanol, and isopropyl alcohol; polyhydric alcohols, such as ethylene glycol, propylene glycol, diethylene glycol, and triethylene glycol; cellosolves, such as methyl cellosolve and ethyl cellosolve; ketones, such as acetone, methyl ethyl ketone, and methyl isobutyl ketone; ethers, such as benzyl alcohol ethyl ether, benzyl alcohol isopropyl ether, and tetrahydrofuran; and esters, such as methyl acetate, ethyl acetate, and butyl acetate. These solvents may be used separately or in combination as a mixture of two or more. Among these solvents, a solvent having a low boiling point and being capable of sufficiently dissolving the binder resin may be used in order to easily remove a solvent in the toner particle suspension.

The amount of the solvent used is preferably in the range of 50 to 5000 parts by mass and more preferably 120 to 1000 parts by mass with respect to 100 parts by mass of the binder resin.

The aqueous medium used in the suspension granulation method may contain a dispersion stabilizer. As the dispersion stabilizer, known inorganic and organic dispersion stabilizers may be used. Examples of the inorganic dispersion stabilizer include calcium phosphate, calcium carbonate, aluminum hydroxide, calcium sulfate, and barium carbonate. Examples of the organic dispersion stabilizer include water-soluble polymers, such as polyvinyl alcohol, methylcellulose, hydroxyethylcellulose, ethylcellulose, a sodium salt of carboxymethylcellulose, sodium polyacrylate, and sodium polymethacrylate; anionic surfactants, such as sodium dodecylbenzenesulfonate, sodium octadecylsulfate, sodium oleate, sodium laurate, and potassium stearate; cationic surfactants, such as laurylamine acetate, stearylamine acetate, and lauryltrimethylammonium chloride; amphoteric surfactants, such as lauryldimethylamine oxide; and nonionic surfactants, such as polyoxyethylene alkyl ethers, polyoxyethylene alkyl phenyl ethers, and polyoxyethylene alkylamines.

The amount of the dispersion stabilizer used may be in the range of 0.01 to 20 parts by mass with respect to 100 parts by mass of the binder resin from the viewpoint of achieving good droplet stability of the solvent composition in the aqueous medium.

The toner preferably has a weight-average particle size (hereinafter, also referred to as "D4") of 3.0 to 15.0 µm and more preferably 4.0 to 12.0 µm. When the weight-average particle size of the toner is within the range described above, satisfactory charging stability is provided. It is thus possible to further inhibit fogging or toner scattering when developing is continuously performed on many sheets. Furthermore, the reproducibility of a halftone portion is improved, and surface irregularities of a formed image are easily reduced.

The ratio of the weight-average particle size D4 to the number-average particle size (hereinafter, also referred to as "D1") of the toner (hereinafter, also referred to as "D4/D1") is preferably 1.35 or less and more preferably 1.30 or less. When the D4/D1 ratio is within the range described above, it is possible to further inhibit the occurrence of fogging or a reduction in transfer efficiency, thereby easily providing a high-resolution image.

Note that D4 and D1 of the toner may be adjusted by a method for producing toner particles. For example, in the case of the suspension polymerization method, D4 and D1 may be adjusted by controlling the concentration of the dispersion stabilizer used in the preparation of an aqueous medium, a stirring speed and a stirring time during a reaction, or the like.

The toner according to an embodiment of the present invention may be either a magnetic toner or a nonmagnetic toner. When the toner is used as a magnetic toner, toner particles in the toner according to an embodiment of the present invention may be mixed with a magnetic material. Examples of the magnetic material include iron oxides, such as magnetite, maghemite, and ferrite; iron oxides containing other metal oxides; metals, such as Fe, Co, and Ni; alloys of these metals with metals, such as Al, Co, Cu, Pb, Mg, Ni, Sn, Zn, Sb, Be, Bi, Cd, Ca, Mn, Se, Ti, W, and V; mixtures thereof. In particular, a magnetic material that may be used in an embodiment of the present invention is a fine powder of triiron tetroxide or γ-iron sesquioxide.

The magnetic material preferably has an average particle size of 0.1 to 2 µm and more preferably 0.1 to 0.3 µm. Regarding magnetic properties of the magnetic material at an applied magnetic field strength of 795.8 kA/m, the magnetic material may have a coercive force of 1.6 to 12 kA/m, a saturation magnetization of 5 to 200 Am$^2$/kg (e.g., 50 to 100 Am$^2$/kg), and a residual magnetization of 2 to 20 Am$^2$/kg from the viewpoint of achieving good developability of the toner.

The amount of the magnetic material added is preferably in the range of 10 to 200 parts by mass and more preferably 20 to 150 parts by mass with respect to 100 parts by mass of the binder resin.

EXAMPLES

While the present invention will be described in more detail below by examples and comparative examples, the present invention is not limited to these examples. In the description below, "parts" and "%" are on a mass basis unless otherwise specified.

Measurement methods used in production examples will be described below.

(1) Measurement of Molecular Weight

The molecular weight of the compound having an azo skeleton structure is calculated by size exclusion chromatography (SEC) in terms of polystyrene. The measurement of the molecular weight by SEC was performed as described below.

A sample was added to an eluent described below in such a manner that the sample concentration was 1.0%. The resulting solution was allowed to stand at room temperature for 24 hours and then filtered with a solvent-resistant membrane filter having a pore size of 0.2 µm to prepare a sample solution. Measurement of the sample solution was performed under conditions described below.

Apparatus: High-speed gel permeation chromatography (GPC) apparatus (HLC-8220GPC, manufactured by Tosoh Corporation)

Column: Two series of LF-804

Eluent: THF

Flow rate: 1.0 mL/min

Oven temperature: 40° C.

Amount of sample injected: 0.025 mL

Regarding the calculation of the molecular weight of a sample, a molecular-weight calibration curve prepared with standard polystyrene resins (TSK standard polystyrenes manufactured by Tosoh Corporation: F-850, F-450, F-288, F-128, F-80, F-40, F-20, F-10, F-4, F-2, F-1, A-5000, A-2500, A-1000, and A-500) was used.

(2) Measurement of Acid Value

The acid value of the compound having an azo skeleton structure is determined by a method described below.

The basic operation is based on JIS K-0070.

1) First, 0.5 to 2.0 g of a sample was accurately weighed. The mass of the sample was defined as M (g).

2) The sample was charged into a 50-ml beaker, and 25 mL of a tetrahydrofuran/ethanol (2/1) mixture was added thereto to dissolve the sample.

3) Titration was performed with a 0.1 mol/L KOH solution in ethanol using a potentiometric titrator (for example, an automatic titrator COM-2500 manufactured by Hiranuma Sangyo Corporation may be used).

4) The amount of the KOH solution used at this time was defined as S (mL). A blank value was also measured, and the amount of the KOH solution used at this time was defined as B (mL).

5) The acid value was calculated from the following formula:

$$\text{Acid value [mg } KOH/\text{g]} = \frac{(S-B) \times f \acute{A} E.61}{M}$$ [Math. 1]

where f represents a factor of the KOH solution.

(3) Composition Analysis

The structure of the compound having a polymer portion and an azo skeleton structure was determined with apparatuses described below.

$^1$H NMR: ECA-400 manufactured by JEOL Ltd. (solvent: deuterochloroform)

$^{13}$C NMR: FT-NMR AVANCE-600, manufactured by Bruker BioSpin K.K. (solvent: deuterochloroform)

In the $^{13}$C NMR, compositional analysis was performed through quantification by an inverse gated decoupling method with chromium(III) acetylacetonate as a relaxation agent.

Example 1

Compounds each having an azo skeleton structure were produced by a method described below.

Production Example of Compound (C-1)

Compound (C-1) having an azo skeleton structure represented by the following structure was produced in accordance with the following scheme.

[Chem. 27]

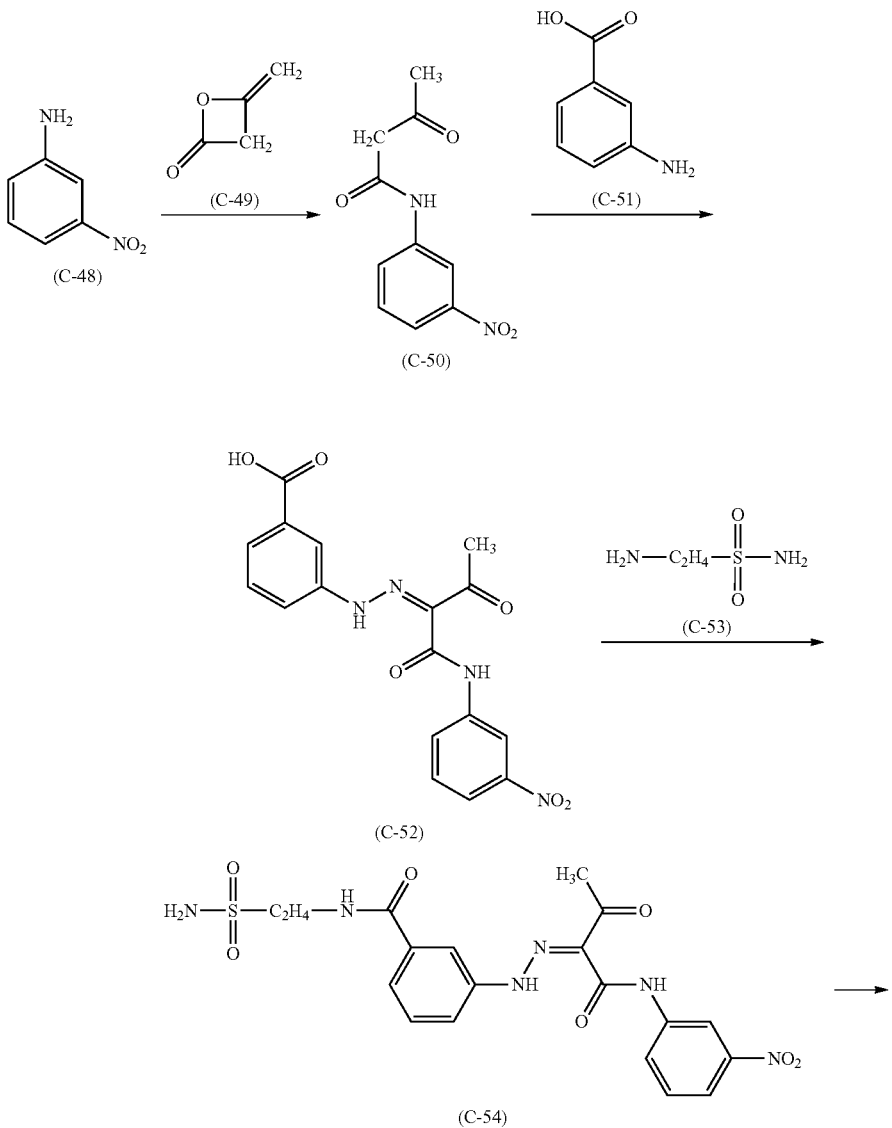

-continued

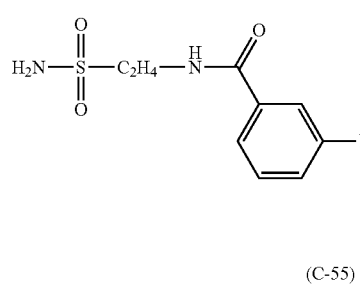
(C-55)

(C-56)

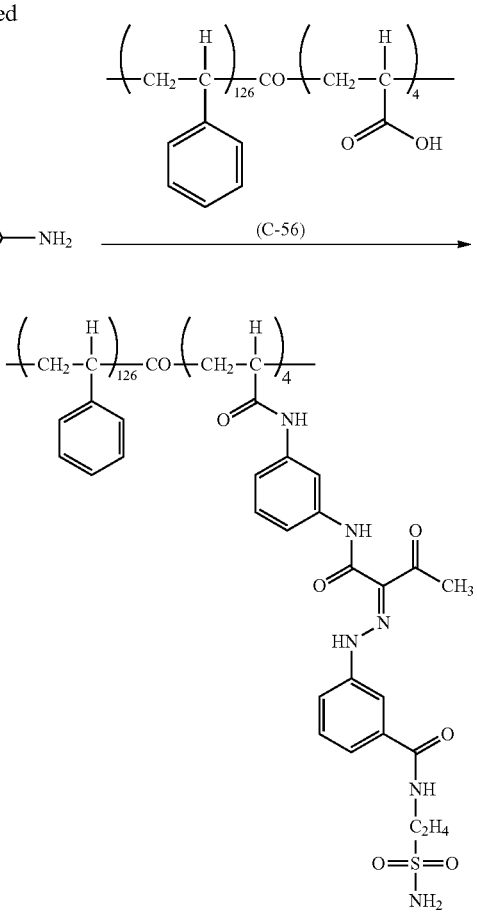
(C-1)

In the structural formulae, "co" is a symbol indicating that the arrangement of monomer units constituting the copolymer is random.

First, 25.0 parts of compound (C-48), 15.4 parts of compound (C-49), and 15.0 parts of acetone were added to 140 parts of acetic acid. The mixture was stirred at 65° C. for 3 hours. After the completion of the reaction, the mixture was poured into 1200 parts of water. The mixture was filtered to give 38.4 parts of compound (C-50) (yield: 96.0%).

Next, 160 parts of water and 11.4 parts of concentrated hydrochloric acid were added to 6.00 parts of compound (C-51). The solution was cooled to 5° C. or lower with ice. A solution of 3.08 parts of sodium nitrite dissolved in 10.0 parts of water was added to the solution. The mixture was stirred at the same temperature for 1 hour (diazonium salt solution). Then 10.0 parts of compound (C-50) was added to 400 parts of methanol. The mixture was cooled to 5° C. or lower with ice. The diazonium salt solution was added thereto. A solution of 10.6 parts of sodium acetate dissolved in 80.0 parts of water was added thereto. The mixture was reacted at 5° C. or lower for 1.5 hours. After the completion of the reaction, the reaction mixture was filtered to give 15.8 parts of compound (C-52) (yield: 97.2%).

Next, 15.8 parts of compound (C-52), 10.0 parts of compound (C-53), 5.04 parts of N,N-dimethyl-4-aminopyridine, and 23.3 parts of 1-ethyl-3-(3-dimethylaminoprolyl) carbodiimide hydrochloride (EDC.HCl) were added to 400 parts of N,N-dimethylacetamide. The mixture was stirred at room temperature for 3 days. After the completion of the reaction, the resulting solution was filtered. Hydrochloric acid was added to the filtrate to adjust the pH to 1 or less. Extraction was performed with 150 parts of ethyl acetate. The solution was concentrated and then reprecipitated from 400 parts of ethanol to give 4.00 parts of compound (C-54) (yield: 20.7%).

Next, 4.00 parts of compound (C-54) and 0.60 parts of palladium-activated carbon (palladium: 5%) were added to 100.0 parts of N,N-dimethylacetamide. The mixture was stirred at 80° C. for 6.5 hours in a hydrogen gas atmosphere (reaction pressure: 0.1 to 0.4 MPa). After the completion of the reaction, the reaction mixture was filtered through Celite to separate a component containing palladium-activated carbon. The filtrate was concentrated and then poured into 200 parts of water. The mixture was filtered to give 2.22 parts of compound (C-55) (yield: 59.2%).

Next, 100 parts of propylene glycol monomethyl ether was heated to reflux at a liquid temperature of 120° C. or higher while the atmosphere was replaced with nitrogen. A mixture of 51.5 parts of styrene, 1.48 parts of acrylic acid, and 1.00 part of tert-butyl peroxybenzoate (organic peroxide-based polymerization initiator, manufactured by NOF CORPORATION, trade name: PERBUTYL Z) was added dropwise thereto over a period of 3 hours. After the completion of the dropwise addition, the solution was stirred for 3 hours and then distilled under normal pressure while the liquid temperature was increased to 170° C. After the liquid temperature reached 170° C., distillation was performed under a reduced pressure of 1 hPa for 1 hour to remove the solvent, thereby providing a solid resin. The solid resin was dissolved in tetrahydrofuran. Purification was performed by reprecipitation from n-hexane to give 51.6 parts of compound (C-56).

Next, 6.00 parts of compound (C-56) was dissolved in 150 parts of chloroform, and then 0.59 parts of thionyl chloride was added dropwise to the solution. The mixture was stirred at room temperature for 24 hours. The reaction mixture was concentrated to remove chloroform and an excess of thionyl chloride. The resulting solid resin was recovered and dissolved again in 150 parts of N,N-dimethylacetamide. Then 1.16 parts of compound (C-55) was added thereto. The mixture was stirred at 70° C. for 6.5 hours in a nitrogen atmosphere. After the completion of the reaction, the reaction mixture was concentrated and then reprecipitated from 600 parts of methanol to give 6.52 parts of compound (C-1) having an azo skeleton structure.

The fact that the resulting compound had the structure of compound (C-1) having an azo skeleton structure was confirmed with the apparatuses described above. The analysis results are described below.

Analysis Result of Compound (C-1) Having Azo Skeleton Structure

[1] Result of Measurement of Molecular Weight (GPC)

Weight-average molecular weight (Mw)=28,575, number-average molecular weight (Mn)=15,144

[2] Result of Measurement of Acid Value 0.00 mgKOH/g

[3] Result of $^{13}$C NMR (150 MHz, CDCl$_3$, Room Temperature) (See FIG. 1)

δ [ppm]=199.30, 173.75 (1C), 166.68, 162.33, 145.10 (32C), 144.47, 143.84, 141.67, 137.52, 134.97, 126.67, 118.17, 116.38, 114.61, 112.13, 53.91, 41.90, 35.11, 25.99

The proportions of the number of carbon atoms, which were assigned to the peaks, of the monomer units constituting the copolymer were quantified from the analysis results of $^{13}$C NMR data. The number of monomer units constituting compound (C-1) having an azo skeleton structure was calculated from these measurement results and the value of the number-average molecular weight obtained by the GPC analysis. The results demonstrated that the number of styrene moieties was 126 and that the number of the azo skeleton structures was 4.

Production Example of Compound (C-15)

Compound (C-15) having an azo skeleton structure represented by the following structure was produced in accordance with the following scheme.

[Chem. 28]

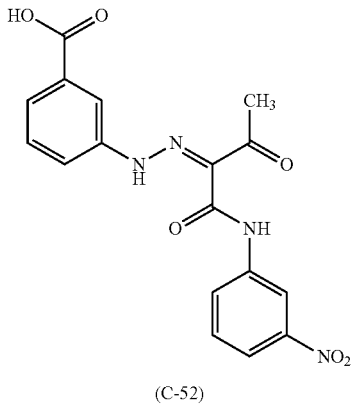

(C-52)

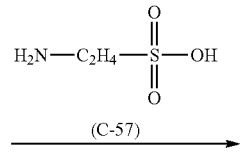

(C-57)

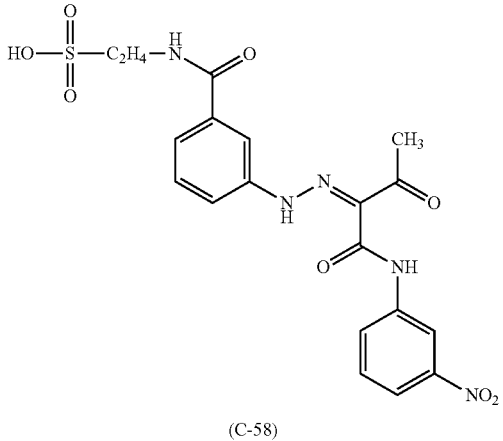

(C-58)

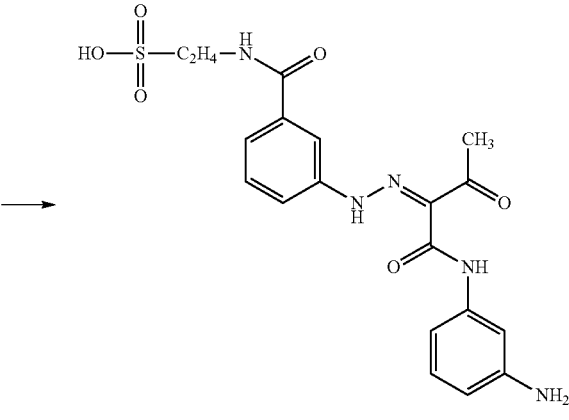

(C-59)

-continued

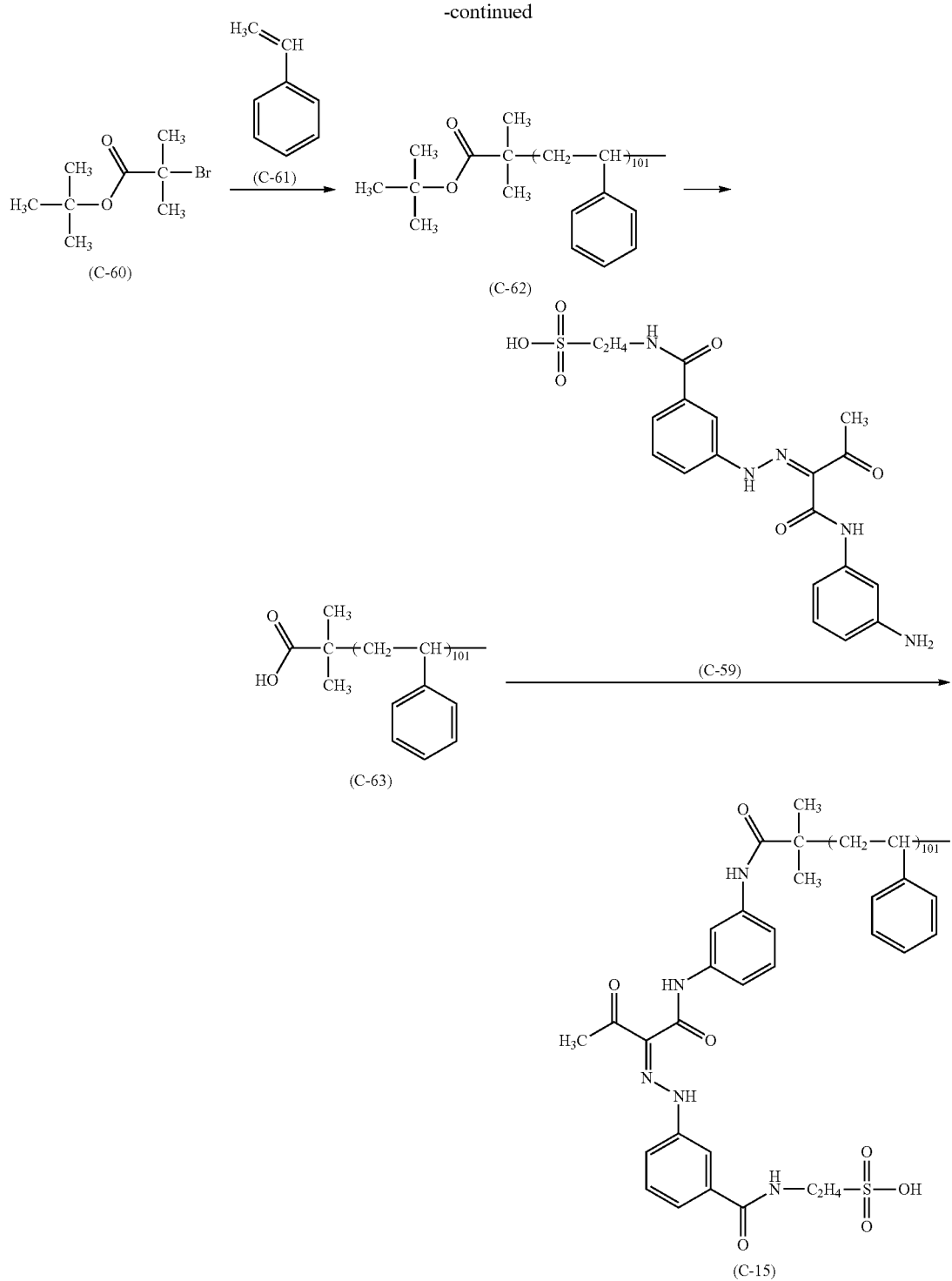

First, 15.0 parts of compound (C-52) was added to 500 parts of chloroform. Then 24.1 parts of thionyl chloride was added dropwise thereto. The mixture was stirred at room temperature for 24 hours. The reaction mixture was concentrated to remove chloroform and an excess of thionyl chloride. The resulting residue was dissolved in 250 parts of N,N-dimethylacetamide. To the solution, 5.07 parts of compound (C-57) and 6.74 parts of triethylamine were added. The mixture was stirred at room temperature for 12 hours in a nitrogen atmosphere. After the completion of the reaction, the reaction mixture was filtered. The filtrate was concentrated and then reprecipitated from methanol to give 5.08 parts of compound (C-58) (yield: 26.3%).

Next, 3.92 parts of compound (C-58) and 0.36 parts of palladium-activated carbon (palladium: 5%) were added to 80.0 parts of N,N-dimethylacetamide. The mixture was stirred at 60° C. for 5 hours in a hydrogen gas atmosphere (reaction pressure: 0.1 to 0.4 MPa). After the completion of the reaction, the reaction mixture was filtered through Celite to separate a component containing palladium-activated carbon. The filtrate was concentrated and then poured into 200 parts of ethyl acetate. The mixture was filtered to give 0.63 parts of compound (C-59) (yield: 17.2%).

Next, 1.1 parts of compound (C-60), 50 parts of styrene (C-61), and 0.83 parts of N,N,N',N'',N''-pentamethyldiethylenetriamine were added to 5.0 parts of anisole. The mixture was degassed by three freeze-pump-thaw cycles. In a nitrogen atmosphere, 0.69 parts of copper bromide was added thereto. The solution was reacted in a nitrogen atmosphere at 100° C. for 8 hours. The reaction solution was exposed to air to terminate the reaction. After the completion of the reaction, the reaction solution was concentrated. Reprecipitation was performed from methanol. The resulting precipitates were dissolved in tetrahydrofuran. The solution was passed through activated alumina to remove copper bromide. After the solvent was removed under reduced pressure, the precipitates were dried under reduced pressure to give 40 parts of polymer compound (C-62).

Next, 40 parts of polymer compound (C-62) was dissolved in 200 parts of 1,4-dioxane. To the solution, 100 parts of 12 M hydrochloric acid was added. The mixture was stirred at 120° C. for 12 hours. After the completion of the reaction, the reaction mixture was concentrated. Reprecipitation was performed from methanol. The resulting precipitates were dried under reduced pressure to give 36 parts of compound (C-63).

Next, 5.00 parts of compound (C-63) was dissolved in 74.0 parts of chloroform. To the solution, 0.337 parts of thionyl chloride was added dropwise. The mixture was stirred at room temperature for 24 hours. The reaction mixture was concentrated to remove chloroform and an excess of thionyl chloride. The resulting solid resin was recovered and dissolved again in 30.6 parts of N,N-dimethylacetamide. To the solution, 0.294 parts of compound (C-59) was added. The mixture was stirred in a nitrogen atmosphere at 65° C. for 7.5 hours. After the completion of the reaction, the reaction mixture was concentrated. Reprecipitation was performed from methanol. The resulting precipitates were dispersed and washed in methanol to give 5.19 parts of compound (C-15) having an azo skeleton structure.

The fact that the resulting compound had the structure of compound (C-15) having an azo skeleton structure was confirmed with the apparatuses described above. The analysis results are described below.

Analysis Result of Compound (C-15) Having Azo Skeleton Structure

[1] Result of Measurement of Molecular Weight (GPC)

Weight-average molecular weight (Mw)=11,847, number-average molecular weight (Mn)=9,796

[2] Result of Measurement of Acid Value 4.17 mgKOH/g

Figure 2:
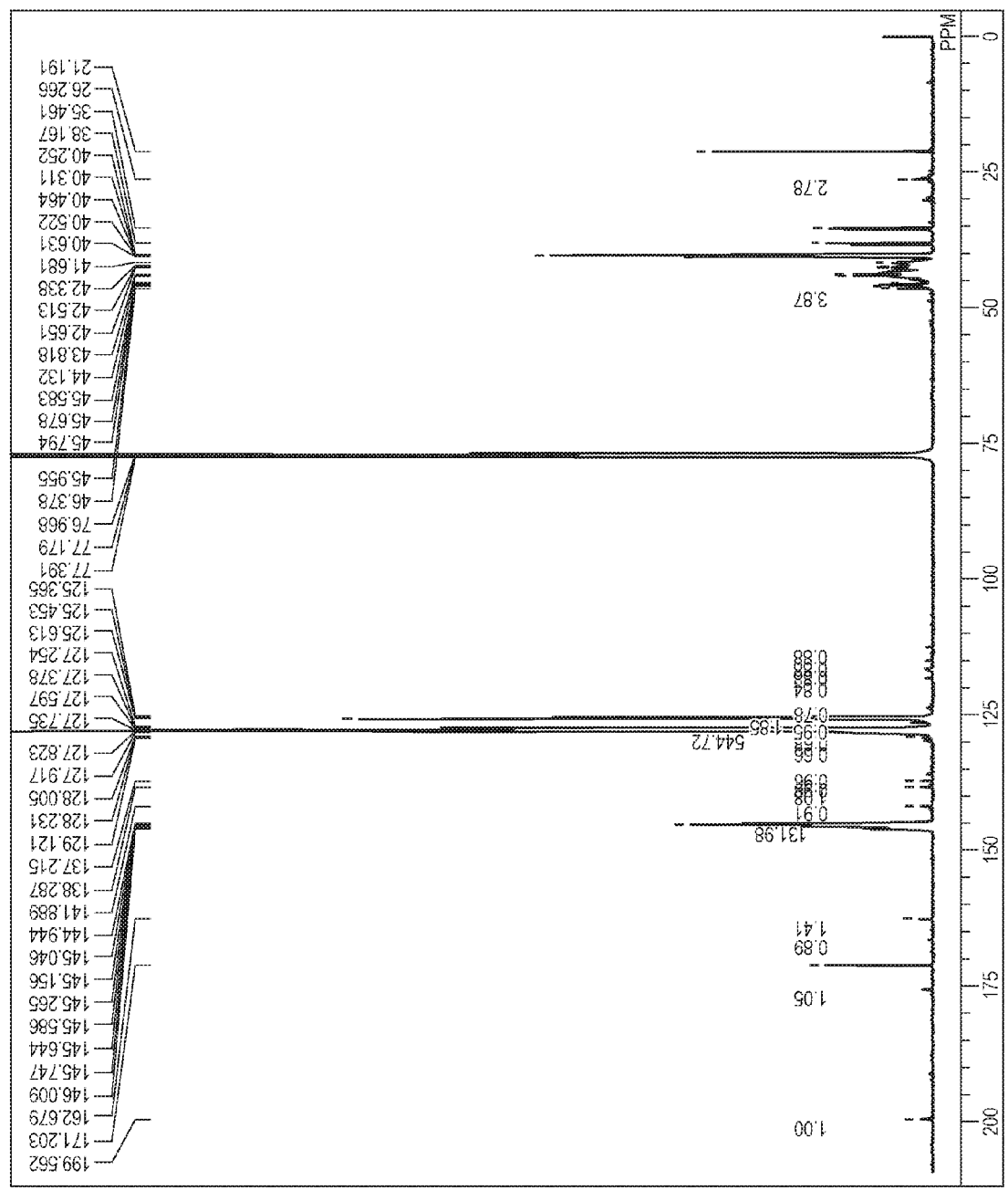
FIG. 2 is a $^{13}C$ NMR spectrum of compound (C-15) in $CDCl_3$ at 150 MHz and room temperature.

[3] Result of $^{13}$C NMR (150 MHz, CDCl$_3$, Room Temperature) (See FIG. 2)

δ [ppm]=199.6 (1C), 175.6 (1C), 166.4 (1C), 162.7 (1C), 146.0-144.9 (132C), 141.9 (1C), 138.3 (1C), 137.2 (1C), 135.9 (1C), 129.8 (1C), 129.1 (1C), 128.2-127.3, 125.6-125.4, 123.7 (1C), 118.2 (1C), 116.7-116.4 (2C), 114.9 (1C), 112.5 (1C), 46.4-41.7, 40.6-40.3, 26.3

The number of carbon atoms, which were assigned to the peaks, of the copolymer were quantified from the analysis results of $^{13}$C NMR data. The number of monomer units constituting compound (C-15) having an azo skeleton structure was calculated from these measurement results. The results demonstrated that the number of styrene moieties was 91 and that the number of the azo skeleton structures was 1.

Production Example of Compound (C-23)

Compound (C-23) having an azo skeleton structure represented by the following structure was produced in accordance with the following scheme.

[Chem. 29]

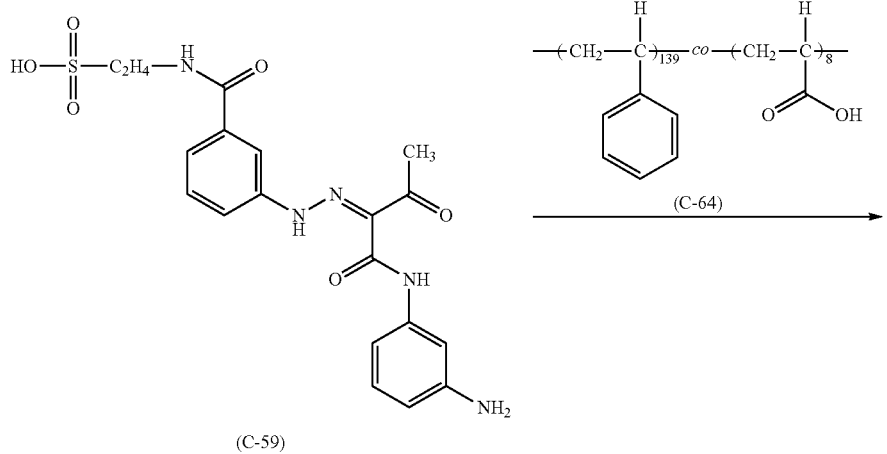

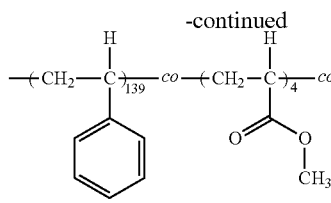
-continued

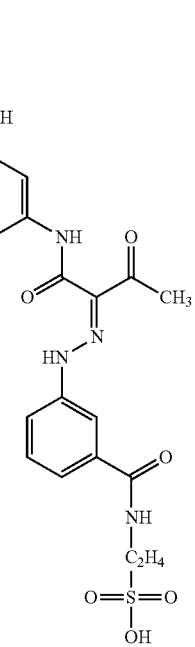

(C-23)

In the structural formulae, "co" is a symbol indicating that the arrangement of monomer units constituting the copolymer is random.

Next, 100 parts of propylene glycol monomethyl ether was heated to reflux at a liquid temperature of 120° C. or higher while the atmosphere was replaced with nitrogen. A mixture of 51.5 parts of styrene, 2.97 parts of acrylic acid, and 1.00 part of tert-butyl peroxybenzoate (organic peroxide-based polymerization initiator, manufactured by NOF CORPORATION, trade name: PERBUTYL Z) was added dropwise thereto over a period of 3 hours. After the completion of the dropwise addition, the solution was stirred for 3 hours and then distilled under normal pressure while the liquid temperature was increased to 170° C. After the liquid temperature reached 170° C., distillation was performed under a reduced pressure of 1 hPa for 1 hour to remove the solvent, thereby providing a solid resin. The solid resin was dissolved in tetrahydrofuran. Purification was performed by reprecipitation from n-hexane to give 53.2 parts of compound (C-64).

Next, 3.94 parts of compound (C-64) was dissolved in 50.0 parts of chloroform, and then 1.59 parts of thionyl chloride was added dropwise to the solution. The mixture was stirred at room temperature for 24 hours. The reaction mixture was concentrated to remove chloroform and an excess of thionyl chloride. The resulting solid resin was recovered and dissolved again in 50.0 parts of N,N-dimethylacetamide. Then 0.60 parts of compound (C-59) was added thereto. The mixture was stirred at 70° C. for 10.0 hours in a nitrogen atmosphere. Next, 5.42 parts of methanol was added dropwise with the temperature maintained. The mixture was stirred for 3.0 hours. After the completion of the reaction, the reaction mixture was concentrated and then reprecipitated from 200 parts of 2-propanol to give 3.27 parts of compound (C-23) having an azo skeleton structure.

The fact that the resulting compound had the structure of compound (C-23) having an azo skeleton structure was confirmed with the apparatuses described above. The analysis results are described below.

Analysis Result of Compound (C-23) Having Azo Skeleton Structure

[1] Result of Measurement of Molecular Weight (GPC)

Weight-average molecular weight (Mw)=27,400, number-average molecular weight (Mn)=13,166

[2] Result of Measurement of Acid Value 17.3 mgKOH/g

Figure 3:
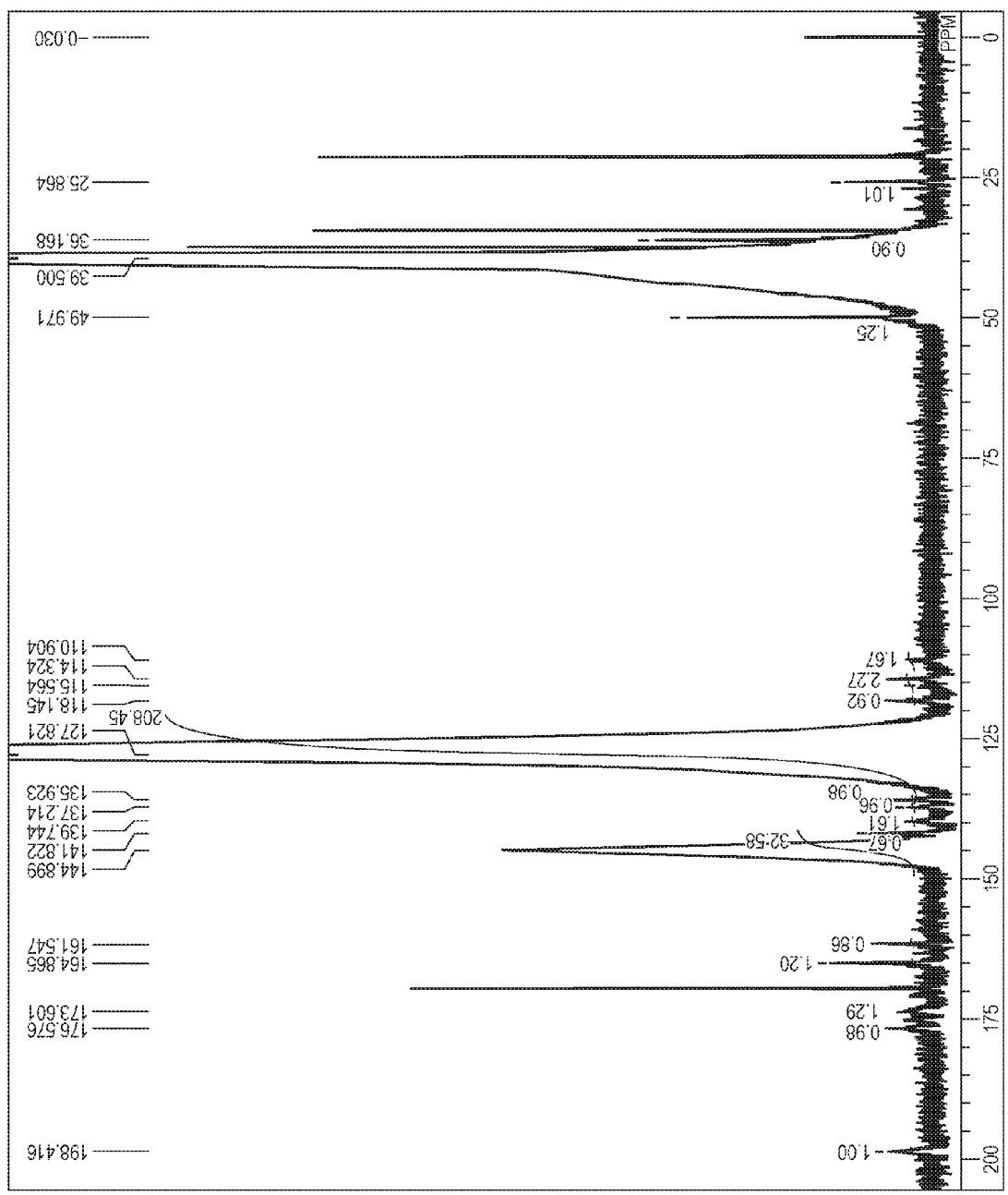
FIG. 3 is a $^{13}C$ NMR spectrum of compound (C-23) in DMSO-$d_6$ at 150 MHz and room temperature.

[3] Result of $^{13}$C NMR (150 MHz, CDCl$_3$, Room Temperature) (See FIG. 3)

δ [ppm]=198.42, 176.58 (1C), 173.60 (1C), 164.87, 161.55, 144.90 (33C), 143.36, 141.82, 139.74, 137.21, 135.92, 127.82, 118.14, 114.94, 110.90, 49.97, 36.17, 25.86

The proportions of the number of carbon atoms, which were assigned to the peaks, of the monomer units constituting the copolymer were quantified from the analysis results of $^{13}$C NMR data. The number of monomer units constituting compound (C-23) having an azo skeleton structure was calculated from these measurement results and the value of the number-average molecular weight obtained by the GPC analysis. The results demonstrated that the number of styrene moieties was 139, the number of methyl acrylate moieties was 4, and the number of the azo skeleton structure was 4.

Production Example of Compound (C-30)

Compound (C-30) having an azo skeleton structure represented by the following structure was produced in accordance with the following scheme.

[Chem. 30]
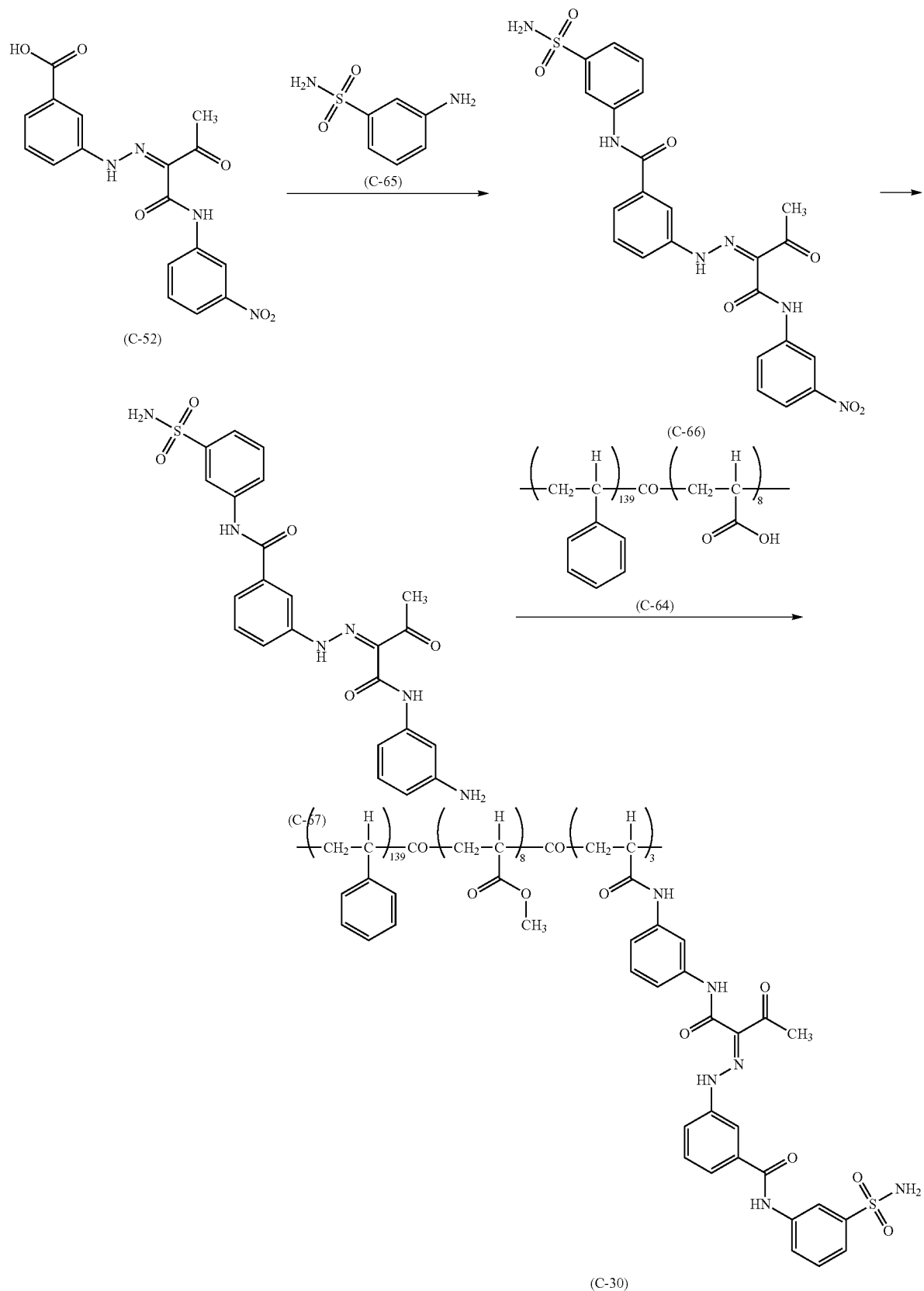

First, 7.00 parts of compound (C-52) was added to 500 parts of chloroform. Then 11.2 parts of thionyl chloride was added dropwise thereto. The mixture was stirred at room temperature for 24 hours. The reaction mixture was concentrated to remove chloroform and an excess of thionyl chloride. The resulting residue was dissolved in 500 parts of N,N-dimethylacetamide. To the solution, 4.92 parts of compound (C-65) was added. The mixture was stirred at room temperature for 24 hours in a nitrogen atmosphere. After the completion of the reaction, the reaction mixture was poured into 1500 parts of water. The precipitated solid was filtered. The resulting solid was dispersed and washed in 1000 parts of methanol. The mixture was filtered to give 9.13 parts of compound (C-66) (yield: 92.2%).

Next, 9.13 parts of compound (C-66) and 0.37 parts of palladium-activated carbon (palladium: 5%) were added to 200.0 parts of N,N-dimethylacetamide. The mixture was stirred at 70° C. for 34 hours in a hydrogen gas atmosphere (reaction pressure: 0.1 to 0.4 MPa). After the completion of the reaction, the reaction mixture was filtered through Celite to separate a component containing palladium-activated carbon. The filtrate was concentrated and then poured into 1000 parts of water. The mixture was filtered to give 7.15 parts of compound (C-67) (yield: 83.0%).

Next, 20.0 parts of compound (C-64) was dissolved in 250 parts of chloroform, and then 8.10 parts of thionyl chloride was added dropwise to the solution. The mixture was stirred at room temperature for 24 hours. The reaction mixture was concentrated to remove chloroform and an excess of thionyl chloride. The resulting solid resin was recovered and dissolved again in 250 parts of N,N-dimethylacetamide. Then 3.37 parts of compound (C-67) was added thereto. The mixture was stirred at 70° C. for 4.0 hours in a nitrogen atmosphere. Next, 30.0 parts of methanol was added dropwise with the temperature maintained. The mixture was stirred for 2.5 hours. After the completion of the reaction, the reaction mixture was concentrated and then reprecipitated from 600 parts of methanol to give 16.6 parts of compound (C-30) having an azo skeleton structure.

The fact that the resulting compound had the structure of compound (C-30) having an azo skeleton structure was confirmed with the apparatuses described above. The analysis results are described below.

Analysis Result of Compound (C-30) Having Azo Skeleton Structure

[1] Result of Measurement of Molecular Weight (GPC)
Weight-average molecular weight (Mw)=28,952, number-average molecular weight (Mn)=16,493

[2] Result of Measurement of Acid Value
0.0 mgKOH/g

Figure 4:
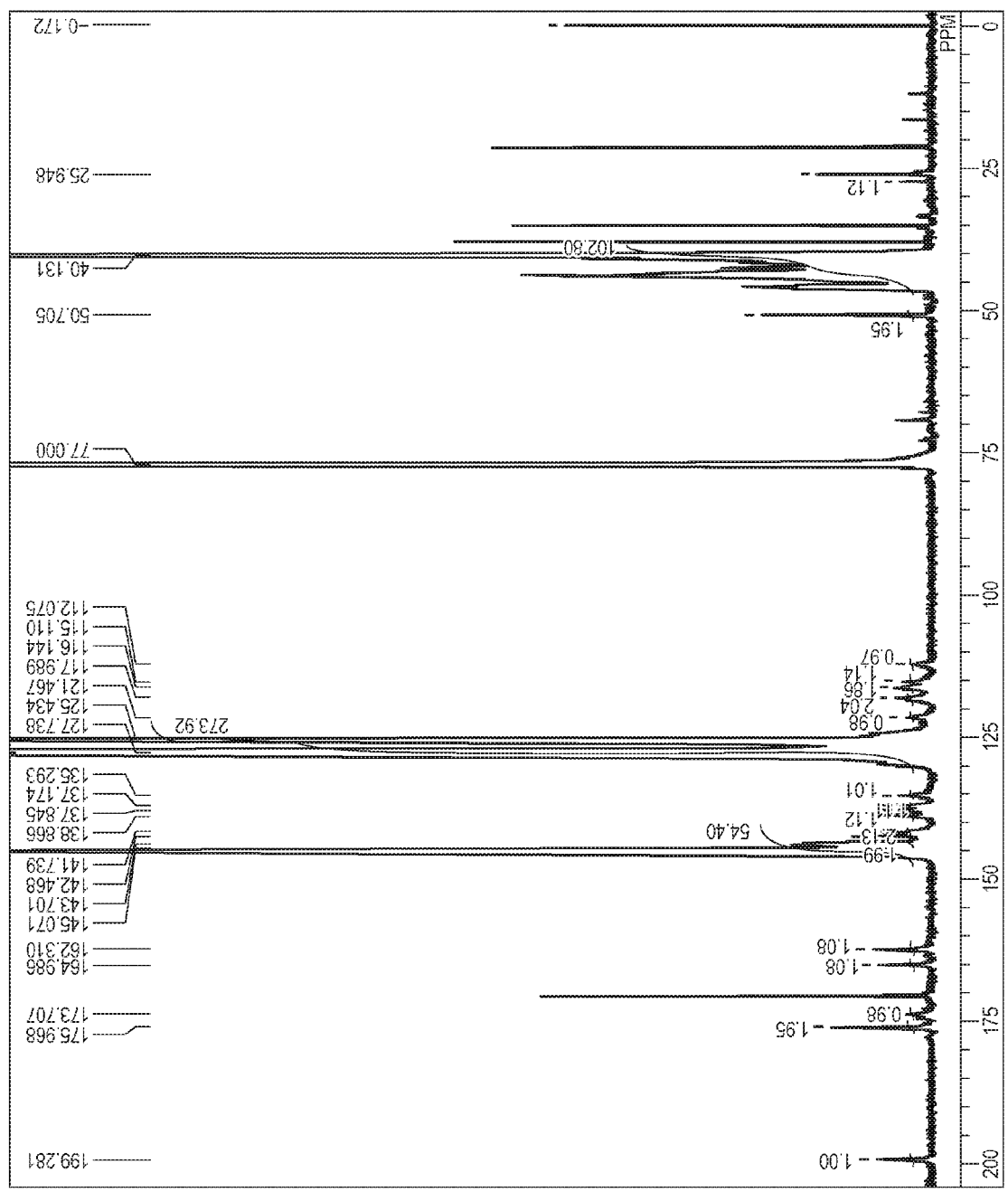
FIG. 4 is a $^{13}C$ NMR spectrum of compound (C-30) in $CDCl_3$ at 150 MHz and room temperature.

[3] Result of $^{13}$C NMR (150 MHz, CDCl$_3$, Room Temperature) (See FIG. 4)
δ [ppm]=199.28, 175.97 (2C), 173.71 (1C), 164.99, 162.31, 143.70, 145.07 (50C), 143.41, 142.10, 138.87, 137.84, 137.17, 135.29, 126.59, 121.47, 117.99, 116.14, 115.12, 112.07, 50.70, 40.13, 25.95

The proportions of the number of carbon atoms, which were assigned to the peaks, of the monomer units constituting the copolymer were quantified from the analysis results of $^{13}$C NMR data. The number of monomer units constituting compound (C-30) having an azo skeleton structure was calculated from these measurement results and the value of the number-average molecular weight obtained by the GPC analysis. The results demonstrated that the number of styrene moieties was 139, the number of methyl acrylate moieties was 4, and the number of the azo skeleton structure was 3.

Production Examples of Compounds (C-2) to (C-22), (C-24) to (C-29), and (C-31) to (C-46)

Compounds (C-2) to (C-22), (C-24) to (C-29), and (C-31) to (C-46) each having an azo skeleton structure described in Tables 2-1 and 2-2 were produced in the same operation as in the methods disclosed in the production examples of compounds (C-1), (C-15), (C-23), and (C-30), except that the raw materials were changed.

Table 1 illustrates structures of polymer portions. Tables 2-1 and 2-2 illustrate structures of compounds having azo skeleton structures.

TABLE 1

| Polymer portion | Sequential arrangement of monomer | Number of X | Number of $Y_1$ | Number of $Y_2$ | Number of Z | $R_{55}$ | $R_{56}$ | $R_{57}$ | $R_{58}$ | $R_{59}$ | $R_{60}$ |
|---|---|---|---|---|---|---|---|---|---|---|---|
| R-1 | poly(X-co-Z) | 126 | 0 | 0 | 4 | H | — | — | — | — | H |
| R-2 | poly(X-co-$Y_1$-co-Z) | 139 | 4 | 0 | 4 | H | H | COOCH$_3$ | — | — | H |
| R-3 | poly(X-co-$Y_1$-co-Z) | 139 | 5 | 0 | 3 | H | H | COOCH$_3$ | — | — | H |
| R-4 | poly($Y_1$-co-Z) | 0 | 90 | 0 | 10 | — | H | COOC$_4$H$_9$(n) | — | — | H |
| R-5 | poly(X-co-$Y_1$-co-Z) | 240 | 14 | 0 | 5 | H | H | COOCH$_3$ | — | — | H |
| R-6 | poly(X-co-$Y_1$-co-Z) | 101 | 3 | 0 | 5 | H | H | COOCH$_3$ | — | — | H |
| R-7 | poly(X-co-$Y_1$-co-Z) | 52 | 2 | 0 | 2 | H | H | COOCH$_3$ | — | — | H |
| R-8 | poly(X-co-$Y_1$-co-Z) | 101 | 4 | 0 | 4 | CH$_3$ | CH$_3$ | COOCH$_3$ | — | — | H |
| R-9 | poly(X-co-$Y_1$-co-Z) | 240 | 14 | 0 | 5 | H | H | COOC$_4$H$_9$(n) | — | — | H |
| R-10 | poly(X-co-$Y_1$-co-Z) | 88 | 8 | 0 | 4 | H | H | COOCH$_2$CH(C$_2$H$_5$)C$_4$H$_9$ | — | — | H |
| R-11 | poly(X-co-$Y_1$-co-Z) | 88 | 8 | 0 | 4 | H | H | COOC$_{18}$H$_{37}$(n) | — | — | H |
| R-12 | poly(X-co-$Y_1$-co-Z) | 92 | 4 | 0 | 4 | H | H | COOC$_{22}$H$_{45}$(n) | — | — | H |
| R-13 | poly(X-co-$Y_1$-co-$Y_2$-co-Z) | 77 | 15 | 4 | 4 | H | H | COOCH$_3$ | H | COOC$_{22}$H$_{45}$(n) | H |
| R-14 | poly(X-co-$Y_1$-co-$Y_2$-co-Z) | 60 | 30 | 6 | 4 | H | H | COOC$_4$H$_9$(n) | H | COOC$_{22}$H$_{45}$(n) | H |
| R-15 | polyX-b-polyZ | 84 | 0 | 0 | 5 | H | — | — | — | — | H |
| R-16 | Poly(X-co-$Y_1$)-b-polyZ | 74 | 14 | 0 | 2 | H | H | COOC$_4$H$_9$(n) | — | — | H |
| R-17 | α-W-polyX | 101 | 0 | 0 | 0 | H | — | — | — | — | — |
| R-18 | α-W-poly$Y_1$ | 0 | 101 | 0 | 0 | — | H | COOC$_4$H$_9$(n) | — | — | — |
| R-19 | α-W-poly(X-co-$Y_1$) | 71 | 18 | 0 | 0 | H | H | COOCH$_3$ | — | — | — |
| R-20 | α-W-poly(X-co-$Y_1$) | 71 | 18 | 0 | 0 | H | H | COOC$_4$H$_9$(n) | — | — | — |

TABLE 1-continued

| | | Polymer portion | | | | | | | | | |
|---|---|---|---|---|---|---|---|---|---|---|---|
| Polymer portion | Sequential arrangement of monomer | Number of X | Number of $Y_1$ | Number of $Y_2$ | Number of Z | $R_{55}$ | $R_{56}$ | $R_{57}$ | $R_{58}$ | $R_{59}$ | $R_{60}$ |
| R-21 | α-W-poly(X-co-$Y_1$) | 71 | 18 | 0 | 0 | H | H | $CONH_2$ | — | — | — |
| R-22 | α-W-poly(X-co-$Y_1$) | 71 | 18 | 0 | 0 | H | H | COOBn | — | — | — |

In Table 1, the prefix "α" represents a terminal group attached to the left of the structure. W represents a COOH group. X, $Y_1$, $Y_2$, and Z represent the following monomer units. "Bn" represents an unsubstituted benzyl group. (n) indicates that an alkyl group is linear. "co" is a symbol indicating that the arrangement of monomer units constituting the copolymer is random. "b" is a symbol indicating that the arrangement of monomer units constituting the copolymer is a block.

[Chem. 31]

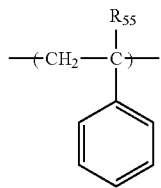

X

In the formula X, $R_{55}$ represents a hydrogen atom or an alkyl group.

[Chem. 32]

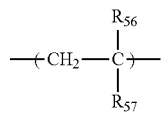

$Y_1$

In the formula $Y_1$, $R_{56}$ represents a hydrogen atom or an alkyl group, and $R_{57}$ represents a carboxylate group or a carboxamide group.

[Chem. 33]

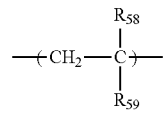

$Y_2$

In the formula $Y_2$, $R_{58}$ represents a hydrogen atom or an alkyl group, and $R_{59}$ represents a carboxylate group or a carboxamide group.

[Chem. 34]

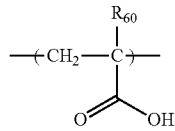

Z

In the formula Z, $R_{60}$ represents a hydrogen atom or an alkyl group.

TABLE 2-1

| | | | Compound having azo skeleton structure | | | | | | | |
|---|---|---|---|---|---|---|---|---|---|---|
| Compound | Polymer portion | Linking site to polymer portion | Number of azo skeleton structure introduced | $R_1$ | $R_2$ | $R_3$ | $R_4$ | $R_5$ | $R_6$ | $R_{21}$ |
| C-1 | R-1 | Z | 4 | $CH_3$ | H | H | H | $L_1$ | H | H |
| C-2 | R-4 | Z | 10 | $CH_3$ | H | H | H | $L_1$ | H | H |
| C-3 | R-5 | Z | 5 | $CH_3$ | H | H | H | $L_1$ | H | H |
| C-4 | R-6 | Z | 5 | $CH_3$ | H | H | H | $L_1$ | H | H |
| C-5 | R-7 | Z | 2 | $CH_3$ | H | H | H | $L_1$ | H | H |
| C-6 | R-8 | Z | 4 | $CH_3$ | H | H | H | $L_1$ | H | H |
| C-7 | R-9 | Z | 5 | $CH_3$ | H | H | H | $L_1$ | H | H |
| C-8 | R-10 | Z | 4 | $CH_3$ | H | H | H | $L_1$ | H | H |
| C-9 | R-11 | Z | 4 | $CH_3$ | H | H | H | $L_1$ | H | H |
| C-10 | R-12 | Z | 4 | $CH_3$ | H | H | H | $L_1$ | H | H |
| C-11 | R-13 | Z | 4 | $CH_3$ | H | H | H | $L_1$ | H | H |
| C-12 | R-14 | Z | 4 | $CH_3$ | H | H | H | $L_1$ | H | H |
| C-13 | R-15 | Z | 5 | $CH_3$ | H | H | H | $L_1$ | H | H |
| C-14 | R-16 | Z | 2 | $CH_3$ | H | H | H | $L_1$ | H | H |
| C-15 | R-17 | W | 1 | $CH_3$ | H | H | H | $L_2$ | H | H |
| C-16 | R-18 | W | 1 | $CH_3$ | H | H | H | $L_3$ | H | H |
| C-17 | R-19 | W | 1 | $CH_3$ | H | H | H | $L_4$ | H | H |

TABLE 2-1-continued

Compound having azo skeleton structure

| | | | | | | | | | | | |
|---|---|---|---|---|---|---|---|---|---|---|---|
| C-18 | R-20 | W | | 1 | $CH_3$ | H | H | H | $L_5$ | H | H |
| C-19 | R-21 | W | | 1 | $CH_3$ | H | H | H | $L_6$ | H | H |
| C-20 | R-22 | W | | 1 | $CH_3$ | H | H | H | $L_7$ | H | H |
| C-21 | R-1  | Z | | 4 | $CH_3$ | H | H | H | $L_1$ | H | $CONH-C_2H_4-SO_2NH_2$ |
| C-22 | R-1  | Z | | 4 | $CH_3$ | H | H | H | $L_1$ | H | H |
| C-23 | R-2  | Z | | 4 | $CH_3$ | H | H | H | $L_1$ | H | H |

| Compound | $R_{22}$ | $R_{23}$ | $R_{24}$ | $R_{25}$ |
|---|---|---|---|---|
| C-1  | $CONH-C_2H_4-SO_2NH_2$ | H | H | H |
| C-2  | $CONH-C_2H_4-SO_2NH_2$ | H | H | H |
| C-3  | $CONH-C_2H_4-SO_2NH_2$ | H | H | H |
| C-4  | $CONH-C_2H_4-SO_2NH_2$ | H | H | H |
| C-5  | $CONH-C_2H_4-SO_2NH_2$ | H | H | H |
| C-6  | $CONH-C_2H_4-SO_2NH_2$ | H | H | H |
| C-7  | $CONH-C_2H_4-SO_2NH_2$ | H | H | H |
| C-8  | $CONH-C_2H_4-SO_2NH_2$ | H | H | H |
| C-9  | $CONH-C_2H_4-SO_2NH_2$ | H | H | H |
| C-10 | $CONH-C_2H_4-SO_2NH_2$ | H | H | H |
| C-11 | $CONH-C_2H_4-SO_2NH_2$ | H | H | H |
| C-12 | $CONH-C_2H_4-SO_2NH_2$ | H | H | H |
| C-13 | $CONH-C_2H_4-SO_2NH_2$ | H | H | H |
| C-14 | $CONH-C_2H_4-SO_2NH_2$ | H | H | H |
| C-15 | $CONH-C_2H_4-SO_3H$    | H | H | H |
| C-16 | $CONH-C_2H_4-SO_2NH_2$ | H | H | H |
| C-17 | $CONH-C_2H_4-SO_2NH_2$ | H | H | H |
| C-18 | $CONH-C_2H_4-SO_2NH_2$ | H | H | H |
| C-19 | $CONH-C_2H_4-SO_2NH_2$ | H | H | H |
| C-20 | $CONH-C_2H_4-SO_2NH_2$ | H | H | H |
| C-21 | H | H | H | H |
| C-22 | H | $CONH-C_2H_4-SO_2NH_2$ | H | H |
| C-23 | $CONH-C_2H_4-SO_3H$ | H | H | H |

TABLE 2-2

Compound having azo skeleton structure

| Compound | Polymer portion | Linking site to polymer portion | Number of azo skeleton structure introduced | $R_1$ | $R_2$ | $R_3$ | $R_4$ |
|---|---|---|---|---|---|---|---|
| C-24 | R-2 | Z | 4 | $CH_3$ | H | H | H |
| C-25 | R-1 | Z | 4 | $CH_3$ | H | H | H |
| C-26 | R-1 | Z | 4 | $CH_3$ | H | H | H |
| C-27 | R-1 | Z | 4 | $CH_3$ | H | H | H |
| C-28 | R-1 | Z | 4 | $CH_3$ | H | H | H |
| C-29 | R-1 | Z | 4 | $CH_3$ | H | H | H |
| C-30 | R-3 | Z | 3 | $CH_3$ | H | H | H |
| C-31 | R-3 | Z | 3 | $CH_3$ | H | H | H |
| C-32 | R-3 | Z | 3 | $CH_3$ | H | H | H |
| C-33 | R-1 | Z | 4 | $CH_3$ | H | H | H |
| C-34 | R-1 | Z | 4 | $CH_3$ | H | H | $NHCO-C_6H_4-SO_2NH_2(\text{-}p)$ |
| C-35 | R-1 | Z | 4 | $CH_3$ | H | H | $OCO-C_6H_4-SO_2NH_2(\text{-}p)$ |
| C-36 | R-1 | Z | 4 | $CH_3$ | H | H | H |
| C-37 | R-1 | Z | 4 | $CH_3$ | H | H | H |
| C-38 | R-1 | Z | 4 | $CH_3$ | H | H | H |
| C-39 | R-1 | Z | 4 | $CH_3$ | H | H | H |
| C-40 | R-1 | Z | 4 | $CH_3$ | H | H | $NH-C_3H_6-SO_3H$ |
| C-41 | R-1 | Z | 4 | $CH_3$ | H | H | H |
| C-42 | R-1 | Z | 4 | $CH_3$ | H | H | H |
| C-43 | R-1 | Z | 4 | $CH_3$ | H | H | H |
| C-44 | R-1 | Z | 4 | $CH_3$ | H | H | H |
| C-45 | R-1 | Z | 4 | $CH_3$ | H | H | H |
| C-46 | R-1 | Z | 4 | $C_6H_5$ | $L_1$ | H | H |

| Compound | $R_5$ | $R_6$ | $R_{21}$ | $R_{22}$ | $R_{23}$ | $R_{24}$ | $R_{25}$ |
|---|---|---|---|---|---|---|---|
| C-24 | $L_1$ | H | H | $CONH-C_2H_4-SO_3Na$ | H | H | H |
| C-25 | $L_1$ | H | H | $CONH-C_2H_4-SO_2NHCH_3$ | H | H | H |
| C-26 | $L_1$ | H | H | $CONH-C_2H_4-SO_2NHC_6H_5$ | H | H | H |
| C-27 | $L_1$ | H | H | $CONH-C_2H_4-SO_2NHBn$ | H | H | H |
| C-28 | $L_1$ | H | H | $CONH-CH_2-CONH_2$ | H | H | H |
| C-29 | $L_1$ | H | H | $CONH-C_{11}H_{24}-COOH$ | H | H | H |
| C-30 | $L_1$ | H | H | $CONH-C_6H_4-SO_2NH_2(\text{-}m)$ | H | H | H |
| C-31 | $L_1$ | H | H | $CONH-C_6H_4-SO_2NH_2(\text{-}o)$ | H | H | H |

TABLE 2-2-continued

| Compound having azo skeleton structure | | | | | | | |
|---|---|---|---|---|---|---|---|
| C-32 | $L_1$ | H | H | CONH—$C_6H_4$—$SO_2NH_2$(-p) | H | H | H |
| C-33 | $L_1$ | H | H | COO—$C_6H_4$—$SO_2NH_2$(-p) | H | H | H |
| C-34 | H | H | H | $L_1$ | H | H | H |
| C-35 | H | H | H | $L_1$ | H | H | H |
| C-36 | $L_1$ | H | H | CONH—$C_6H_4$—$CONH_2$(-p) | H | H | H |
| C-37 | $L_1$ | H | H | CONH—$C_6H_4$—$COOCH_3$(-p) | H | H | H |
| C-38 | $L_1$ | H | H | CONH—$C_6H_4$—$COOC_6H_5$(-p) | H | H | H |
| C-39 | $L_1$ | H | H | CONH—$C_6H_4$—COOBn(-p) | H | H | H |
| C-40 | H | H | H | $L_1$ | H | H | H |
| C-41 | $L_1$ | H | H | CONH—$C_2H_4$—$SO_2NH_2$ | H | H | $CH_3$ |
| C-42 | $L_1$ | H | H | CONH—$C_2H_4$—$SO_2NH_2$ | H | H | Cl |
| C-43 | $L_1$ | H | H | CONH—$C_2H_4$—$SO_2NH_2$ | H | H | $OCH_3$ |
| C-44 | $L_1$ | H | H | CONH—$C_2H_4$—$SO_2NH_2$ | H | $CF_3$ | H |
| C-45 | $L_1$ | H | H | CONH—$C_2H_4$—$SO_2NH_2$ | CN | H | H |
| C-46 | H | H | H | CONH—$C_2H_4$—$SO_2NH_2$ | H | H | H |

[Chem. 35]

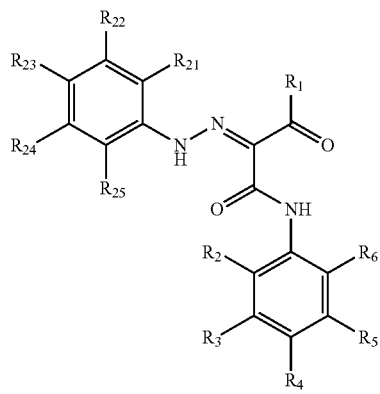

formula (5)

In Tables 2-1 and 2-2, $R_1$ to $R_6$, and $R_{21}$ to $R_{25}$ represent $R_1$ to $R_6$, and $R_{21}$ to $R_{25}$ in the formula (5). In Table 2-2, "Bn" represents an unsubstituted benzyl group. In Table 2-2, "(-o)" indicates that the phenylene group has substituents at the ortho positions. "(-m)" indicates that the phenylene group has substituents at the meta positions. "(-p)" indicates that the phenylene group has substituents at the para positions. In Tables 2-1 and 2-2, a compound in which "Linking site to polymer portion" indicates "Z" is bonded to a COOH group in the monomer unit "Z" in the polymer portion illustrated in Table 1 to form a linking group. A compound in which "Linking site to polymer portion" indicates "W" is bonded to a COOH group represented by "W" in the polymer portion illustrated in Table 1 to form a linking group. In Tables 2-1 and 2-2, $L_1$ to $L_7$ represent linking groups each having the following structures.

[Chem. 36]

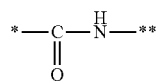

$L_1$

[Chem. 37]

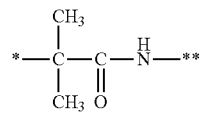

$L_2$

[Chem. 38]

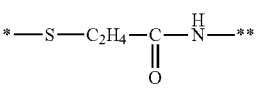

$L_3$

[Chem. 39]

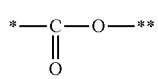

$L_4$

[Chem. 40]

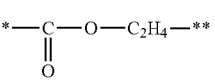

$L_5$

[Chem. 41]

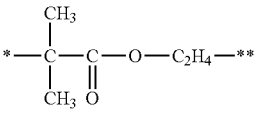

$L_6$

[Chem. 42]

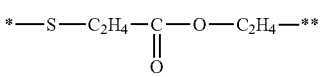

$L_7$

In each of the formulae $L_1$ to $L_9$, "*" indicates a binding site to a carbon atom in a polymer portion described in Table 1. "**" indicates a binding site in each of the azo skeleton structures described in Tables 2-1 and 2-2.

Comparative Example 1

Comparative azo compound (C-68) described below was synthesized according to Example 2 (Synthesis example 3 of dye compound) in Japanese Patent Laid-Open No. 2012-067285.

[Chem. 43]

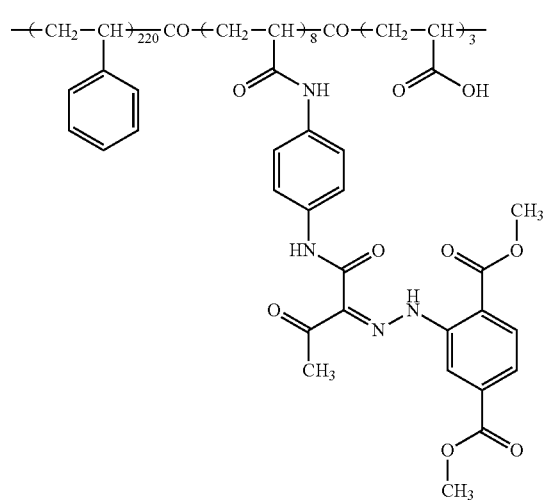

(C-68)

Example 2-1

Yellow pigment dispersions were prepared by methods described below.

Preparation Example 1 of Yellow Pigment Dispersion

First, 18.0 parts of C.I. Pigment Yellow 155 (yellow pigment a) serving as a yellow pigment represented by the following formula (Pig-A), 1.80 parts of compound (C-1) having an azo skeleton structure, 180 parts of styrene serving as a water-insoluble solvent, and 130 parts of glass beads (1 mm in diameter) were mixed together. The resulting mixture was dispersed in an attritor (manufactured by Nippon Coke & Engineering Co., Ltd.) for 3 hours and filtered through a mesh to prepare yellow pigment dispersion (Dis-Y1).

[Chem. 44]

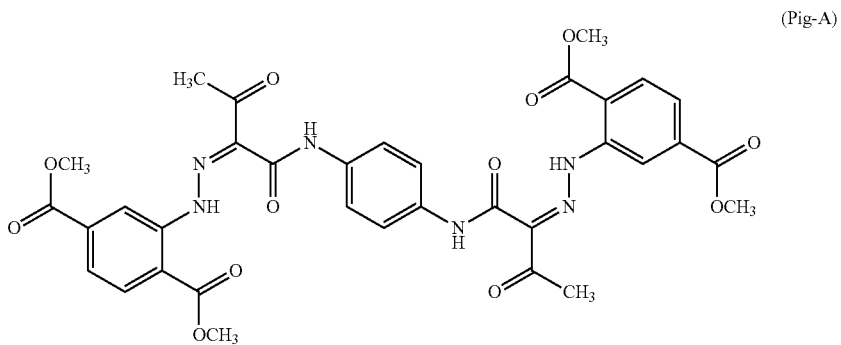

(Pig-A)

Preparation Example 2 of Yellow Pigment Dispersion

Yellow pigment dispersions (Dis-Y2) to (Dis-Y46) were prepared in the same operation as in "Preparation example 1 of yellow pigment dispersion", except that compounds (C-2) to (C-46) each having an azo skeleton structure were used in place of compound (C-1) having an azo skeleton structure.

Preparation Example 3 of Yellow Pigment Dispersion

Yellow pigment dispersions (Dis-Y47) and (Dis-Y48) were prepared in the same operation as in "Preparation example 1 of yellow pigment dispersion", except that C.I. Pigment Yellow 180 (yellow pigment b) represented by the following formula (Pig-B) and C.I. Pigment Yellow 185 (yellow pigment c) represented by the following formula (Pig-C) were used in place of C.I. Pigment Yellow 155 (yellow pigment a) represented by the formula (Pig-A).

[Chem. 45]

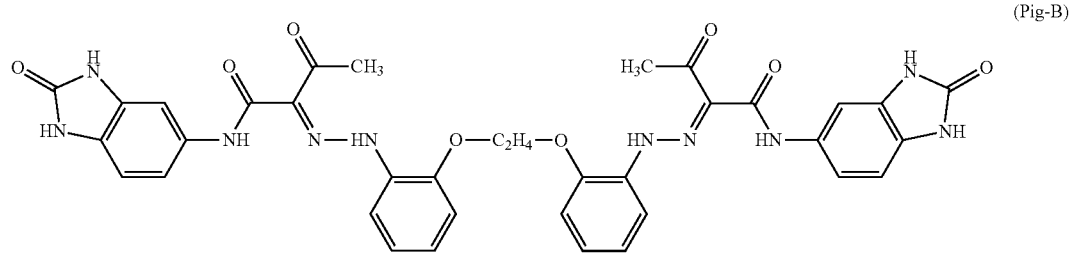

(Pig-B)

[Chem. 46]

(Pig-C)

Preparation Example 4 of Yellow Pigment Dispersion

First, 42.0 parts of C.I. Pigment Yellow 155 (yellow pigment a) serving as a yellow pigment represented by the formula (Pig-A) and 4.2 parts of compound (C-1) having an azo skeleton structure, which serves as a pigment-dispersing agent, were dry-mixed together with a hybridization system (NHS-0, manufactured by Nara Machinery Co., Ltd.) to prepare a pigment composition. Next, 19.8 parts of the resulting pigment composition was mixed with 180 parts of styrene and 130 parts of glass beads (1 mm in diameter). The mixture was dispersed with a paint shaker (manufactured by Toyo Seiki Seisaku-sho, Ltd.) for 1 hour and then filtered through a mesh to prepare yellow pigment dispersion (Dis-Y49).

Comparative Example 2-1

Reference yellow pigment dispersions serving as references for evaluation and comparative yellow pigment dispersions were prepared by methods described below.

Preparation Example 1 of Reference Yellow Pigment Dispersion

Reference yellow pigment dispersion (Dis-Y50) was prepared in the same operation as in "Preparation example 1 of yellow pigment dispersion", except that compound (C-1) having an azo skeleton structure was not added.

Preparation Example 2 of Reference Yellow Pigment Dispersion

Reference yellow pigment dispersions (Dis-Y51) and (Dis-Y52) were prepared in the same operation as in "Preparation example 3 of yellow pigment dispersion", except that compound (C-1) having an azo skeleton structure was not added.

Preparation Example 3 of Reference Yellow Pigment Dispersion

Reference yellow pigment dispersion (Dis-Y53) was prepared in the same operation as in "Preparation example 4 of yellow pigment dispersion", except that compound (C-1) having an azo skeleton structure was not added.

Preparation Example 1 of Comparative Yellow Pigment Dispersion

Comparative yellow pigment dispersions (Dis-Y54) to (Dis-Y57) were prepared in the same operation as in "Preparation example 1 of yellow pigment dispersion", except that comparative azo compound (C-68) (comparative compound 1) described above, DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio)=95/5) block copolymer (Mw=9,718) (comparative compound 4) described in PTL 4 were used in place of compound (C-1) having an azo skeleton structure.

Example 2-2

Magenta pigment dispersions were prepared by methods described below.

Preparation Example 1 of Magenta Pigment Dispersion

First, 18.0 parts of C.I. Pigment Red 122 (magenta pigment a) serving as a magenta pigment represented by the formula (Pig-D), 1.80 parts of compound (C-1) having an azo skeleton structure, 180 parts of styrene serving as a water-insoluble solvent, and 130 parts of glass beads (1 mm in diameter) were mixed together. The mixture was dispersed with an attritor (manufactured by Nippon Coke & Engineering Co., Ltd.) for 3 hours and filtered through a mesh to prepare magenta pigment dispersion (Dis-M1).

[Chem. 47]

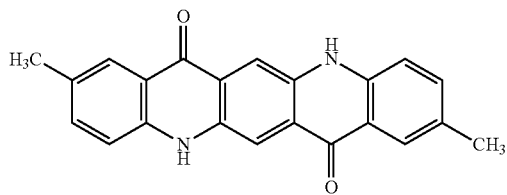

(Pig.D)

Preparation Example 2 of Magenta Pigment Dispersion

Magenta pigment dispersions (Dis-M2) to (Dis-M46) were prepared in the same operation as in "Preparation example 1 of magenta pigment dispersion, except that compounds (C-2) to (C-46) each having an azo skeleton structure were used in place of compound (C-1) having an azo skeleton structure.

Preparation Example 3 of Magenta Pigment Dispersion

Magenta pigment dispersions (Dis-M47) and (Dis-M48) were prepared in the same operation as in "Preparation example 1 of magenta pigment dispersion", except that C.I. Pigment Red 255 (magenta pigment b) represented by the formula (Pig-E) or C.I. Pigment Red 150 (magenta pigment c) represented by the formula (Pig-F) was used in place of C.I. Pigment Red 122 (magenta pigment a) represented by the formula (Pig-D).

[Chem. 48]

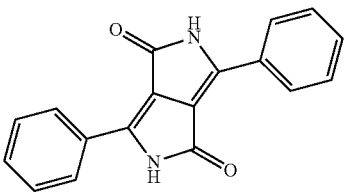

(Pig.E)

[Chem. 49]

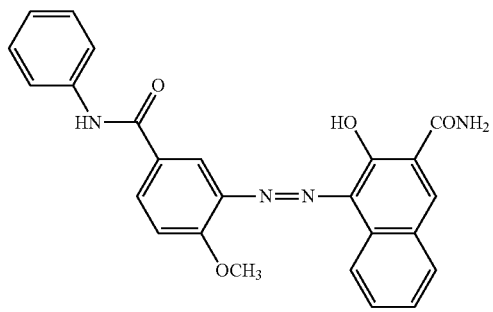

(Pig.F)

Preparation Example 4 of Magenta Pigment Dispersion

First, 42.0 parts of C.I. Pigment Red 122 (magenta pigment a) serving as a magenta pigment represented by the formula (Pig-D) and 4.2 parts of compound (C-1) having an azo skeleton structure, which serves as a pigment-dispersing agent, were dry-mixed together using a hybridization system (NHS-0, manufactured by Nara Machinery Co., Ltd.) to prepare a pigment composition. Next, 19.8 parts of the resulting pigment composition was mixed with 180 parts of styrene and 130 parts of glass beads (1 mm in diameter). The mixture was dispersed with a paint shaker (manufactured by Toyo Seiki Seisaku-sho, Ltd.) for 1 hour and then filtered through a mesh to prepare magenta pigment dispersion (Dis-M49).

Comparative Example 2-2

Reference magenta pigment dispersions serving as references for evaluation and comparative magenta pigment dispersions were prepared by methods described below.

Preparation Example 1 of Reference Magenta Pigment Dispersion

Reference magenta pigment dispersion (Dis-M50) was prepared in the same operation as in "Preparation example 1 of magenta pigment dispersion", except that compound (C-1) having an azo skeleton structure was not added.

Preparation Example 2 of Reference Magenta Pigment Dispersion

Reference magenta pigment dispersions (Dis-M51) and (Dis-M52) were prepared in the same operation as in "Preparation example 3 of magenta pigment dispersion", except that compound (C-1) having an azo skeleton structure was not added.

Preparation Example 3 of Reference Magenta Pigment Dispersion

Reference magenta pigment dispersion (Dis-M53) was prepared in the same operation as in "Preparation example 4 of magenta pigment dispersion", except that compound (C-1) having an azo skeleton structure was not added.

Preparation Example 1 of Comparative Magenta Pigment Dispersion

Comparative magenta pigment dispersions (Dis-M54) to (Dis-M57) were prepared in the same operation as in "Preparation example 1 of magenta pigment dispersion", except that comparative azo compound (C-68) (comparative compound 1), DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio)=95/5) block copolymer (Mw=9,718) (comparative compound 4) described in PTL 4 were used in place of compound (C-1) having an azo skeleton structure.

Example 2-3

Cyan pigment dispersions were prepared by methods described below.

Preparation Example 1 of Cyan Pigment Dispersion

First, 18.0 parts of C.I. Pigment Blue 15:3 (cyan pigment a) serving as a cyan pigment represented by the formula (Pig-G), 1.80 parts of compound (C-1) having an azo skeleton structure, 180 parts of styrene serving as a water-insoluble solvent, and 130 parts of glass beads (1 mm in diameter) were mixed together. The mixture was dispersed with an attritor (manufactured by Nippon Coke & Engineering Co., Ltd.) for 3 hours and filtered through a mesh to prepare cyan pigment dispersion (Dis-C1).

[Chem. 50]

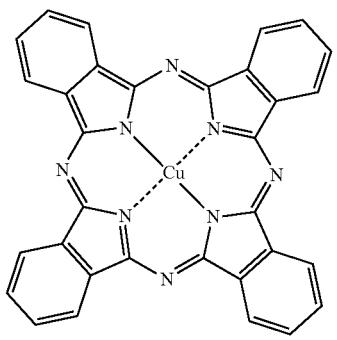

(Pig-G)

Preparation Example 2 of Cyan Pigment Dispersion

Cyan pigment dispersions (Dis-C2) to (Dis-C46) were prepared in the same operation as in "Preparation example 1 of cyan pigment dispersion", except that compounds (C-2) to (C-46) each having an azo skeleton structure were used in place of compound (C-1) having an azo skeleton structure.

Preparation Example 3 of Cyan Pigment Dispersion

Cyan pigment dispersions (Dis-C47) and (Dis-C48) were prepared in the same operation as in "Preparation example 1 of cyan pigment dispersion", except that C.I. Pigment Blue 16 (cyan pigment b) represented by the formula (Pig-H) or C.I. Pigment Blue 17:1 (cyan pigment c) represented by the formula (Pig-I) was used in place of C.I. Pigment Blue 15:3 (cyan pigment a) represented by the formula (Pig-G).

[Chem. 51]

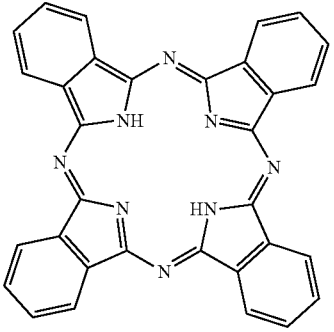

(Pig-H)

[Chem. 52]

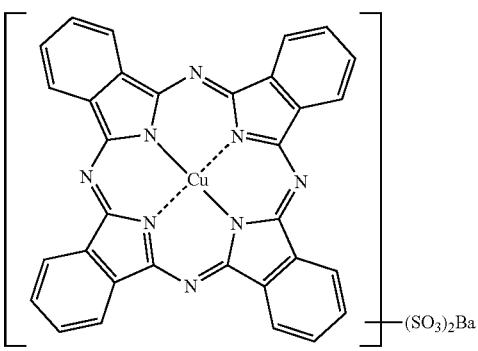

(Pig-I)

Preparation Example 4 of Cyan Pigment Dispersion

First, 42.0 parts of C.I. Pigment Blue 15:3 (cyan pigment a) serving as a cyan pigment represented by the formula (Pig-G) and 4.2 parts of compound (C-1) having an azo skeleton structure, which serves as a pigment-dispersing agent, were dry-mixed together using a hybridization system (NHS-0, manufactured by Nara Machinery Co., Ltd.) to prepare a pigment composition. Next, 19.8 parts of the resulting pigment composition was mixed with 180 parts of styrene and 130 parts of glass beads (1 mm in diameter). The mixture was dispersed with a paint shaker (manufactured by Toyo Seiki Seisaku-sho, Ltd.) for 1 hour and then filtered through a mesh to prepare cyan pigment dispersion (Dis-C49).

Comparative Example 2-3

Reference cyan pigment dispersions serving as references for evaluation and comparative cyan pigment dispersions were prepared by methods described below.

Preparation Example 1 of Reference Cyan Pigment Dispersion

Reference cyan pigment dispersion (Dis-C50) was prepared in the same operation as in "Preparation example 1 of cyan pigment dispersion", except that compound (C-1) having an azo skeleton structure was not added.

Preparation Example 2 of Reference Cyan Pigment Dispersion

Reference cyan pigment dispersions (Dis-C51) and (Dis-C52) were prepared in the same operation as in "Preparation example 3 of cyan pigment dispersion", except that compound (C-1) having an azo skeleton structure was not added.

Preparation Example 3 of Reference Cyan Pigment Dispersion

Reference cyan pigment dispersion (Dis-C53) was prepared in the same operation as in "Preparation example 4 of cyan pigment dispersion", except that compound (C-1) having an azo skeleton structure was not added.

Preparation Example 1 of Comparative Cyan Pigment Dispersion

Comparative cyan pigment dispersions (Dis-C54) to (Dis-C57) were prepared in the same operation as in "Preparation example 1 of cyan pigment dispersion", except that comparative azo compound (C-68) (comparative compound 1), DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio) =95/5) block copolymer (Mw=9,718) (comparative compound 4) described in PTL 4 were used in place of compound (C-1) having an azo skeleton structure.

Example 2-4

Black pigment dispersions were prepared by methods described below.

Preparation Example 1 of Black Pigment Dispersion

First, 30.0 parts of carbon black (specific surface area=65 $m^2/g$, average particle size=30 nm, pH=9.0) (black pigment a) serving as a black pigment, 3.0 parts of compound (C-1) having an azo skeleton structure, 150 parts of styrene serving as a water-insoluble solvent, and 130 parts of glass beads (1 mm in diameter) were mixed together. The mixture was dispersed with an attritor (manufactured by Nippon Coke & Engineering Co., Ltd.) for 3 hours and filtered through a mesh to prepare black pigment dispersion (Dis-Bk1).

Preparation Example 2 of Black Pigment Dispersion

Black pigment dispersions (Dis-Bk2) to (Dis-Bk46) were prepared in the same operation as in "Preparation example 1 of black pigment dispersion", except that compounds (C-2) to (C-46) each having an azo skeleton structure were used in place of compound (C-1) having an azo skeleton structure.

Preparation Example 3 of Black Pigment Dispersion

Black pigment dispersions (Dis-Bk47) and (Dis-Bk48) were prepared in the same operation as in "Preparation example 1 of black pigment dispersion", except that carbon black (specific surface area=77 $m^2/g$, average particle size=28 nm, pH=7.5) (black pigment b) and carbon black (specific surface area=370 $m^2/g$, average particle size=13 nm, pH=3.0) (black pigment c) were used in place of carbon black (specific surface area=65 $m^2/g$, average particle size=30 nm, pH=9.0) (black pigment a).

Preparation Example 4 of Black Pigment Dispersion

First, 42.0 parts of carbon black (specific surface area=65 $m^2/g$, average particle size=30 nm, pH=9.0) (black pigment a) serving as a black pigment and 4.2 parts of compound (C-1) having an azo skeleton structure, which serves as a pigment-dispersing agent, were dry-mixed together with a hybridization system (NHS-0, manufactured by Nara Machinery Co., Ltd.) to prepare a pigment composition. Next, 33.0 parts of the resulting pigment composition was mixed with 150 parts of styrene and 130 parts of glass beads (1 mm in diameter). The mixture was dispersed with a paint shaker (manufactured by Toyo Seiki Seisaku-sho, Ltd.) for 1 hour and then filtered through a mesh to prepare black pigment dispersion (Dis-Bk49).

Comparative Example 2-4

Reference black pigment dispersions serving as references for evaluation and comparative black pigment dispersions were prepared by methods described below.

Preparation Example 1 of Reference Black Pigment Dispersion

Reference black pigment dispersion (Dis-Bk50) was prepared in the same operation as in "Preparation example 1 of black pigment dispersion", except that compound (C-1) having an azo skeleton structure was not added.

Preparation Example 2 of Reference Black Pigment Dispersion

Reference black pigment dispersions (Dis-Bk51) and (Dis-Bk52) were prepared in the same operation as in "Preparation example 3 of black pigment dispersion", except that compound (C-1) having an azo skeleton structure was not added.

Preparation Example 3 of Reference Black Pigment Dispersion

Reference black pigment dispersion (Dis-Bk53) was prepared in the same operation as in "Preparation example 4 of black pigment dispersion", except that compound (C-1) having an azo skeleton structure was not added.

Preparation Example 1 of Comparative Black Pigment Dispersion

Comparative black pigment dispersions (Dis-Bk54) to (Dis-Bk57) were prepared in the same operation as in "Preparation example 1 of black pigment dispersion", except that comparative azo compound (C-68) (comparative compound 1), DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio)=95/5) block copolymer (Mw=9,718) (comparative compound 4) described in PTL 4 were used in place of compound (C-1) having an azo skeleton structure.

Example 3-1

The pigment dispersions of each color were evaluated by a method described below.
Evaluation of Pigment Dispersibility The effect of the compound having an azo skeleton structure according to an embodiment of the present invention on the dispersibility of pigments was evaluated by performing a gloss test of coating films formed by the use of yellow pigment dispersions (Dis-Y1) to (Dis-Y49), magenta pigment dispersions (Dis-M1) to (Dis-M49), cyan pigment dispersions (Dis-C1) to (Dis-C49), and black pigment dispersions (Dis-Bk1) to (Dis-Bk49). An evaluation method will be described in detail below.

A pigment dispersion was taken with a dropper, fed in the form of straight line on super art paper (Golden Cask Super Art, 180 kg, 80×160, manufactured by Oji Paper Co., Ltd.), and coated uniformly on the art paper with a wire bar (#10). After drying, gloss was measured (at a reflection angle of 75°) with a gloss meter (Gloss Meter VG2000, manufactured by Nippon Denshoku Industries Co., Ltd.) and evaluated according to the following criteria. Note that a more finely dispersed pigment improves the smoothness of the coating film, thereby improving the gloss value.

Improvement rates of gloss values of yellow pigment dispersions (Dis-Y1) to (Dis-Y46) were determined using the gloss value of reference yellow pigment dispersion (Dis-Y50) as a reference value. The improvement rate of the gloss value of yellow pigment dispersion (Dis-Y47) was determined using the gloss value of reference yellow pigment dispersion (Dis-Y51) as a reference value. The improvement rate of the gloss value of yellow pigment dispersion (Dis-Y48) was determined using the gloss value of reference yellow pigment dispersion (Dis-Y52) as a reference value. The improvement rate of the gloss value of yellow pigment dispersion (Dis-Y49) was determined using the gloss value of reference yellow pigment dispersion (Dis-Y53) as a reference value.

Improvement rates of gloss values of magenta pigment dispersions (Dis-M1) to (Dis-M46) were determined using the gloss value of reference magenta pigment dispersion (Dis-M50) as a reference value. The improvement rate of the gloss value of magenta pigment dispersion (Dis-M47) was determined using the gloss value of reference magenta pigment dispersion (Dis-M51) as a reference value. The improvement rate of the gloss value of magenta pigment dispersion (Dis-M48) was determined using the gloss value of reference magenta pigment dispersion (Dis-M52) as a reference value. The improvement rate of the gloss value of magenta pigment dispersion (Dis-M49) was determined using the gloss value of reference magenta pigment dispersion (Dis-M53) as a reference value.

Improvement rates of gloss values of cyan pigment dispersions (Dis-C1) to (Dis-C46) were determined using the gloss value of reference cyan pigment dispersion (Dis-C50) as a reference value. The improvement rate of the gloss value of cyan pigment dispersion (Dis-C47) was determined using the gloss value of reference cyan pigment dispersion (Dis-C51) as a reference value. The improvement rate of the gloss value of cyan pigment dispersion (Dis-C48) was determined using the gloss value of reference cyan pigment dispersion (Dis-C52) as a reference value. The improvement rate of the gloss value of cyan pigment dispersion (Dis-C49) was determined using the gloss value of reference cyan pigment dispersion (Dis-C53) as a reference value.

Evaluation criteria for the pigment dispersions of each color are described below.
Evaluation Criteria for Yellow Pigment Dispersion
 A: The improvement rate of the gloss value is 10% or more.
 B: The improvement rate of the gloss value is 5% or more and less than 10%.
 C: The improvement rate of the gloss value is 0% or more and less than 5%.
 D: The gloss value is reduced.
 When the improvement rate of the gloss value was 5% or more, the dispersibility of the pigment was determined to be satisfactory.
Evaluation Criteria for Magenta Pigment Dispersion
 A: The improvement rate of the gloss value is 35% or more.
 B: The improvement rate of the gloss value is 20% or more and less than 35%.
 C: The improvement rate of the gloss value is 5% or more and less than 20%.
 D: The improvement rate of the gloss value is less than 5%.
 When the improvement rate of the gloss value was 20% or more, the dispersibility of the pigment was determined to be satisfactory.
Evaluation Criteria for Cyan Pigment Dispersion
 A: The improvement rate of the gloss value is 25% or more.
 B: The improvement rate of the gloss value is 15% or more and less than 25%.
 C: The improvement rate of the gloss value is 5% or more and less than 15%.
 D: The improvement rate of the gloss value is less than 5%.
 When the improvement rate of the gloss value was 15% or more, the dispersibility of the pigment was determined to be satisfactory.
Evaluation Criteria for Black Pigment Dispersion
 A: The gloss value is 80 or more.
 B: The gloss value is 50 or more and less than 80.
 C: The gloss value is 20 or more and less than 50.
 D: The gloss value is less than 20.
 When the gloss value was 50 or more, the dispersibility of the pigment was determined to be satisfactory.

Comparative Example 3-1

Regarding comparative yellow pigment dispersions (Dis-Y54) to (Dis-Y57), comparative magenta pigment dispersions (Dis-M54) to (Dis-M57), comparative cyan pigment dispersions (Dis-C54) to (Dis-C57), and comparative black pigment dispersions (Dis-Bk54) to (Dis-Bk57), the gloss was evaluated in the same method as in Example 3-1.

Improvement rates of gloss values of comparative yellow pigment dispersions (Dis-Y54) to (Dis-Y57) were determined using the gloss value of reference yellow pigment dispersion (Dis-Y50) as a reference value. Improvement rates of gloss values of comparative magenta pigment dispersions (Dis-M51) to (Dis-M54) were determined using the gloss value of reference magenta pigment dispersion (Dis-M50) as a reference value. Improvement rates of gloss values of comparative cyan pigment dispersions (Dis-C54) to (Dis-C57) were determined using the gloss value of reference cyan pigment dispersion (Dis-C50) as a reference value.

Table 3 describes the evaluation results of the yellow pigment dispersions, the magenta pigment dispersions, the cyan pigment dispersions, and the black pigment dispersions.

TABLE 3

Evaluation result of pigment dispersion

| | | Yellow | | Magenta | | Cyan | | Black | |
|---|---|---|---|---|---|---|---|---|---|
| | Compound | Dispersion | Gloss (gloss value) | Dispersion | Gloss (gloss value) | Dispersion | Gloss (gloss value) | Dispersion | Gloss (gloss value) |
| Example | C-1 | Dis-Y 1 | A(70) | Dis-M 1 | A(78) | Dis-C 1 | A(68) | Dis-Bk 1 | A(106) |
| Example | C-2 | Dis-Y 2 | A(64) | Dis-M 2 | A(70) | Dis-C 2 | A(64) | Dis-Bk 2 | A(95) |
| Example | C-3 | Dis-Y 3 | A(71) | Dis-M 3 | A(77) | Dis-C 3 | A(67) | Dis-Bk 3 | A(103) |
| Example | C-4 | Dis-Y 4 | A(69) | Dis-M 4 | A(76) | Dis-C 4 | A(67) | Dis-Bk 4 | A(105) |
| Example | C-5 | Dis-Y 5 | A(67) | Dis-M 5 | A(75) | Dis-C 5 | A(65) | Dis-Bk 5 | A(105) |
| Example | C-6 | Dis-Y 6 | A(70) | Dis-M 6 | A(77) | Dis-C 6 | A(65) | Dis-Bk 6 | A(101) |
| Example | C-7 | Dis-Y 7 | A(69) | Dis-M 7 | A(74) | Dis-C 7 | A(65) | Dis-Bk 7 | A(100) |
| Example | C-8 | Dis-Y 8 | A(70) | Dis-M 8 | A(79) | Dis-C 8 | A(69) | Dis-Bk 8 | A(105) |
| Example | C-9 | Dis-Y 9 | A(75) | Dis-M 9 | A(78) | Dis-C 9 | A(69) | Dis-Bk 9 | A(108) |
| Example | C-10 | Dis-Y 10 | A(74) | Dis-M 10 | A(80) | Dis-C 10 | A(67) | Dis-Bk 10 | A(109) |
| Example | C-11 | Dis-Y 11 | A(73) | Dis-M 11 | A(77) | Dis-C 11 | A(65) | Dis-Bk 11 | A(102) |
| Example | C-12 | Dis-Y 12 | A(74) | Dis-M 12 | A(68) | Dis-C 12 | A(63) | Dis-Bk 12 | A(99) |
| Example | C-13 | Dis-Y 13 | A(70) | Dis-M 13 | A(80) | Dis-C 13 | A(69) | Dis-Bk 13 | A(107) |
| Example | C-14 | Dis-Y 14 | A(69) | Dis-M 14 | A(80) | Dis-C 14 | A(67) | Dis-Bk 14 | A(108) |
| Example | C-15 | Dis-Y 15 | A(65) | Dis-M 15 | A(81) | Dis-C 15 | A(69) | Dis-Bk 15 | A(110) |
| Example | C-16 | Dis-Y 16 | A(66) | Dis-M 16 | A(77) | Dis-C 16 | A(63) | Dis-Bk 16 | A(106) |
| Example | C-17 | Dis-Y 17 | A(73) | Dis-M 17 | A(82) | Dis-C 17 | A(69) | Dis-Bk 17 | A(101) |
| Example | C-18 | Dis-Y 18 | A(72) | Dis-M 18 | A(75) | Dis-C 18 | A(68) | Dis-Bk 18 | A(104) |
| Example | C-19 | Dis-Y 19 | A(71) | Dis-M 19 | A(80) | Dis-C 19 | A(71) | Dis-Bk 19 | A(102) |
| Example | C-20 | Dis-Y 20 | A(71) | Dis-M 20 | A(77) | Dis-C 20 | A(67) | Dis-Bk 20 | A(102) |
| Example | C-21 | Dis-Y 21 | A(65) | Dis-M 21 | A(70) | Dis-C 21 | A(65) | Dis-Bk 21 | A(93) |
| Example | C-22 | Dis-Y 22 | A(70) | Dis-M 22 | A(78) | Dis-C 22 | A(66) | Dis-Bk 22 | A(104) |
| Example | C-23 | Dis-Y 23 | A(66) | Dis-M 23 | A(75) | Dis-C 23 | A(69) | Dis-Bk 23 | A(106) |
| Example | C-24 | Dis-Y 24 | A(65) | Dis-M 24 | A(73) | Dis-C 24 | A(68) | Dis-Bk 24 | A(102) |
| Example | C-25 | Dis-Y 25 | A(63) | Dis-M 25 | A(70) | Dis-C 25 | A(60) | Dis-Bk 25 | A(93) |
| Example | C-26 | Dis-Y 26 | A(63) | Dis-M 26 | A(71) | Dis-C 26 | A(60) | Dis-Bk 26 | A(95) |
| Example | C-27 | Dis-Y 27 | A(63) | Dis-M 27 | A(69) | Dis-C 27 | A(59) | Dis-Bk 27 | A(102) |
| Example | C-28 | Dis-Y 28 | A(64) | Dis-M 28 | A(68) | Dis-C 28 | A(68) | Dis-Bk 28 | A(98) |
| Example | C-29 | Dis-Y 29 | A(63) | Dis-M 29 | A(66) | Dis-C 29 | A(58) | Dis-Bk 29 | A(99) |
| Example | C-30 | Dis-Y 30 | A(70) | Dis-M 30 | A(75) | Dis-C 30 | A(62) | Dis-Bk 30 | A(105) |
| Example | C-31 | Dis-Y 31 | A(63) | Dis-M 31 | A(71) | Dis-C 31 | A(59) | Dis-Bk 31 | A(97) |
| Example | C-32 | Dis-Y 32 | A(71) | Dis-M 32 | A(74) | Dis-C 32 | A(63) | Dis-Bk 32 | A(108) |
| Example | C-33 | Dis-Y 33 | A(70) | Dis-M 33 | A(72) | Dis-C 33 | A(58) | Dis-Bk 33 | A(107) |
| Example | C-34 | Dis-Y 34 | A(63) | Dis-M 34 | A(68) | Dis-C 34 | A(59) | Dis-Bk 34 | A(95) |
| Example | C-35 | Dis-Y 35 | A(63) | Dis-M 35 | A(67) | Dis-C 35 | A(59) | Dis-Bk 35 | A(96) |
| Example | C-36 | Dis-Y 36 | A(65) | Dis-M 36 | A(68) | Dis-C 36 | A(60) | Dis-Bk 36 | A(97) |
| Example | C-37 | Dis-Y 37 | A(64) | Dis-M 37 | A(69) | Dis-C 37 | A(58) | Dis-Bk 37 | A(96) |
| Example | C-38 | Dis-Y 38 | A(63) | Dis-M 38 | A(65) | Dis-C 38 | A(58) | Dis-Bk 38 | A(90) |
| Example | C-39 | Dis-Y 39 | A(63) | Dis-M 39 | A(64) | Dis-C 39 | A(58) | Dis-Bk 39 | A(92) |
| Example | C-40 | Dis-Y 40 | A(64) | Dis-M 40 | A(71) | Dis-C 40 | A(68) | Dis-Bk 40 | A(98) |
| Example | C-41 | Dis-Y 41 | A(70) | Dis-M 41 | A(73) | Dis-C 41 | A(66) | Dis-Bk 41 | A(102) |
| Example | C-42 | Dis-Y 42 | A(69) | Dis-M 42 | A(74) | Dis-C 42 | A(63) | Dis-Bk 42 | A(104) |
| Example | C-43 | Dis-Y 43 | A(71) | Dis-M 43 | A(73) | Dis-C 43 | A(60) | Dis-Bk 43 | A(103) |
| Example | C-44 | Dis-Y 44 | A(72) | Dis-M 44 | A(72) | Dis-C 44 | A(64) | Dis-Bk 44 | A(102) |
| Example | C-45 | Dis-Y 45 | A(71) | Dis-M 45 | A(74) | Dis-C 45 | A(64) | Dis-Bk 45 | A(105) |
| Example | C-46 | Dis-Y 46 | A(65) | Dis-M 46 | A(70) | Dis-C 46 | A(60) | Dis-Bk 46 | A(91) |
| Example | C-1 | Dis-Y 47 | A(70) | Dis-M 47 | A(82) | Dis-C 47 | A(66) | Dis-Bk 47 | A(105) |
| Example | C-1 | Dis-Y 48 | A(76) | Dis-M 48 | A(90) | Dis-C 48 | A(65) | Dis-Bk 48 | A(104) |
| Example | C-1 | Dis-Y 49 | A(67) | Dis-M 49 | A(65) | Dis-C 49 | A(60) | Dis-Bk 49 | A(102) |
| Reference | not contained | Dis-Y 50 | (57) | Dis-M 50 | (47) | Dis-C 50 | (46) | Dis-Bk 50 | (7) |
| Reference | not contained | Dis-Y 51 | (60) | Dis-M 51 | (30) | Dis-C 51 | (63) | Dis-Bk 51 | (42) |
| Reference | not contained | Dis-Y 52 | (53) | Dis-M 52 | (56) | Dis-C 52 | (63) | Dis-Bk 52 | (2) |
| Reference | not contained | Dis-Y 53 | (55) | Dis-M 53 | (48) | Dis-C 53 | (44) | Dis-Bk 53 | (5) |
| Comp. Ex. | comparative compound 1 | Dis-Y 54 | B(61) | Dis-M 54 | A(66) | Dis-C 54 | C(49) | Dis-Bk 54 | A(105) |
| Comp. Ex. | comparative compound 2 | Dis-Y 55 | B(60) | Dis-M 55 | B(62) | Dis-C 55 | B(55) | Dis-Bk 55 | B(77) |
| Comp. Ex. | comparative compound 3 | Dis-Y 56 | B(60) | Dis-M 56 | B(63) | Dis-C 56 | B(55) | Dis-Bk 56 | B(64) |
| Comp. Ex. | comparative compound 4 | Dis-Y 57 | C(59) | Dis-M 57 | C(56) | Dis-C 57 | D(47) | Dis-Bk 57 | D(6) |

Example 4-1

Yellow toners were produced by the following methods using suspension polymerization.

Production Example 1 of Yellow Toner

Preparation of Aqueous Medium

Into a 2-L four-neck flask equipped with a high-speed stirrer (T.K. Homomixer, manufactured by PRIMIX Corporation), 710 parts of ion exchanged water and 450 parts of an aqueous solution of 0.1 mol/L $Na_3PO_4$ were charged. The number of rotation was adjusted to 12,000 rpm. The solution was heated to 60° C. To the solution, 68 parts of an aqueous solution of 1.0 mol/L $CaCl_2$ was slowly added, thereby preparing an aqueous medium containing a fine, poorly water-soluble dispersion stabilizer composed of $Ca_3(PO_4)_2$.

Suspension Polymerization Step

The following composition was heated to 60° C. The components were uniformly dissolved or dispersed with a high-speed stirrer (T.K. Homomixer, manufactured by PRIMIX Corporation) at 5000 rpm.

Yellow pigment dispersion (Dis-Y1): 132 parts

Styrene monomer: 46 parts n-Butyl acrylate monomer: 34 parts
Polar resin (saturated polyester resin (terephthalic acid-propylene oxide-modified bisphenol A, acid value: 15, peak molecular weight: 6000): 10 parts
Ester wax (maximum endothermic peak observed by DSC measurement: 70° C., Mn: 704): 25 parts
Aluminum salicylate compound (trade name: BONTRON E-108, manufactured by Orient Chemical Industries Co., Ltd.): 2 parts
Divinylbenzene monomer: 0.1 parts To this composition, 10 parts of 2,2'-azobis(2,4-dimethylvaleronitrile) serving as a polymerization initiator was added. The mixture was added to the aqueous medium. Granulation was performed for 15 minutes while the number of rotation was maintained at 12,000 rpm. Then the high-speed stirrer was changed to a stirrer with a propeller-type impeller. Polymerization was continued at a liquid temperature of 60° C. for 5 hours. The liquid temperature was increased to 80° C. The polymerization was continued for 8 hours. After the completion of the polymerization reaction, the remaining monomers were distilled off at 80° C. under reduced pressure. The reaction product was cooled to 30° C., thereby providing a polymer fine-particle dispersion.

Washing and Dehydration

The resulting polymer fine-particle dispersion was transferred to a washing vessel. Dilute hydrochloric acid was added thereto under stirring. The mixture was stirred for 2 hours at a pH of 1.5 to dissolve a compound of phosphoric acid and calcium, the compound containing $Ca_3(PO_4)_2$. The mixture was subjected to solid-liquid separation with a filter to give fine polymer particles. The fine polymer particles were added to water. The mixture was stirred to prepare a dispersion again. The dispersion was subjected to solid-liquid separation with a filter. The redispersion of the fine polymer particles in water and the solid-liquid separation were repeated until the compound of phosphoric acid and calcium, the compound containing $Ca_3(PO_4)_2$, was sufficiently removed. The fine polymer particles obtained by final solid-liquid separation were fully dried in a dryer to provide toner particles.

In a Henschel mixer (produced by Nippon Coke & Engineering Co., Ltd.), 100 parts of the resulting toner particles, 1.0 part of a hydrophobic fine silica powder (number-average particle size of primary particles: 7 nm) surface-treated with hexamethyldisilazane, 0.15 parts of rutile-type titanium oxide fine powder (number-average particle size of primary particles: 45 nm), 0.5 parts of rutile-type titanium oxide fine powder (number-average particle size of primary particles: 200 nm) were dry-mixed for 5 minutes to provide yellow toner (Tnr-Y1).

Production Example 2 of Yellow Toner

Yellow toners (Tnr-Y2) to (Tnr-Y46) of this example were produced in the same operation as in "Production example 1 of yellow toner", except that yellow pigment dispersions (Dis-Y2) to (Dis-Y46) were used in place of yellow pigment dispersion (Dis-Y1).

Production Example 3 of Yellow Toner

Yellow toners (Tnr-Y47) and (Tnr-Y48) were produced in the same operation as in "Production example 1 of yellow toner", except that yellow pigment dispersions (Dis-Y47) and (Dis-Y48) were used in place of yellow pigment dispersion (Dis-Y1).

Comparative Example 4-1

Reference yellow toners serving as references for evaluation and comparative yellow toners were produced by methods described below.

Production Example 1 of Reference Yellow Toner

Reference yellow toners (Tnr-Y49) to (Tnr-Y51) were produced in the same operation as in "Production example 1 of yellow toner", except that yellow pigment dispersions (Dis-Y49) to (Dis-Y51) were used in place of yellow pigment dispersion (Dis-Y1).

Production Example 1 of Comparative Yellow Toner

Comparative yellow toners (Tnr-Y52) to (Tnr-Y55) were produced in the same operation as in "Production example 1 of yellow toner", except that yellow pigment dispersions (Dis-Y52) to (Dis-Y55) were used in place of yellow pigment dispersion (Dis-Y1).

Example 4-2

Magenta toners were produced by the following methods using suspension polymerization.

Production Example 1 of Magenta Toner

Magenta toner (Tnr-M1) was produced in the same operation as in "Production example 1 of yellow toner", except that magenta pigment dispersion (Dis-M1) was used in place of yellow pigment dispersion (Dis-Y1).

Production Example 2 of Magenta Toner

Magenta toners (Tnr-M2) to (Tnr-M46) of this example were produced in the same operation as in "Production example 1 of magenta toner", except that magenta pigment dispersions (Dis-M2) to (Dis-M46) were used in place of magenta pigment dispersion (Dis-M1).

Production Example 3 of Magenta Toner

Magenta toners (Tnr-M47) and (Tnr-M48) were produced in the same operation as in "Production example 1 of magenta toner", except that magenta pigment dispersions (Dis-M47) and (Dis-M48) were used in place of magenta pigment dispersion (Dis-M1).

Comparative Example 4-2

Reference magenta toners serving as references for evaluation and comparative magenta toners were produced by methods described below.

Production Example 1 of Reference Magenta Toner

Reference magenta toners (Tnr-M49) to (Tnr-M51) were produced in the same operation as in "Production example 1 of magenta toner", except that magenta pigment dispersions (Dis-M49) to (Dis-M51) were used in place of magenta pigment dispersion (Dis-M1).

Production Example 1 of Comparative Magenta Toner

Comparative magenta toners (Tnr-M52) to (Tnr-M55) were produced in the same operation as in "Production example 1 of magenta toner", except that magenta pigment dispersions (Dis-M52) to (Dis-M55) were used in place of magenta pigment dispersion (Dis-M1).

Example 4-3

Cyan toners were produced by the following methods using suspension polymerization.

Production Example 1 of Cyan Toner

Cyan toner (Tnr-C1) was produced in the same operation as in "Production example 1 of yellow toner", except that cyan pigment dispersion (Dis-C1) was used in place of yellow pigment dispersion (Dis-Y1).

Production Example 2 of Cyan Toner

Cyan toners (Tnr-C2) to (Tnr-C46) of this example were produced in the same operation as in "Production example 1 of cyan toner", except that cyan pigment dispersions (Dis-C2) to (Dis-C46) were used in place of cyan pigment dispersion (Dis-C1).

Production Example 3 of Cyan Toner

Cyan toners (Tnr-C47) and (Tnr-C48) were produced in the same operation as in "Production example 1 of cyan toner", except that cyan pigment dispersions (Dis-C47) and (Dis-C48) were used in place of cyan pigment dispersion (Dis-C1).

Comparative Example 4-3

Reference cyan toners serving as references for evaluation and comparative cyan toners were produced by methods described below.

Production Example 1 of Reference Cyan Toner

Reference cyan toners (Tnr-C49) to (Tnr-C51) were produced in the same operation as in "Production example 1 of cyan toner", except that cyan pigment dispersions (Dis-C49) to (Dis-C51) were used in place of cyan pigment dispersion (Dis-C1).

Production Example 1 of Comparative Cyan Toner

Reference cyan toners (Tnr-C52) to (Tnr-C55) were produced in the same operation as in "Production example 1 of cyan toner", except that cyan pigment dispersions (Dis-C52) to (Dis-C55) were used in place of cyan pigment dispersion (Dis-C1).

Example 4-4

Black toners were produced by the following methods using suspension polymerization.

Production Example 1 of Black Toner

Black toner (Tnr-Bk1) was produced in the same operation as in "Production example 1 of yellow toner", except that black pigment dispersion (Dis-Bk1) was used in place of yellow pigment dispersion (Dis-Y1).

Production Example 2 of Black Toner

Black toners (Tnr-Bk2) to (Tnr-Bk46) of this example were produced in the same operation as in "Production example 1 of black toner", except that black pigment dispersions (Dis-Bk2) to (Dis-Bk46) were used in place of black pigment dispersion (Dis-Bk1).

Production Example 3 of Black Toner

Black toners (Tnr-Bk47) and (Tnr-Bk48) were produced in the same operation as in "Production example 1 of black toner", except that black pigment dispersions (Dis-Bk47) and (Dis-Bk48) were used in place of black pigment dispersion (Dis-Bk1).

Comparative Example 4-4

Reference black toners serving as references for evaluation and comparative black toners were produced by methods described below.

Production Example 1 of Reference Black Toner

Reference black toners (Tnr-C49) to (Tnr-Bk51) were produced in the same operation as in "Production example 1 of black toner", except that black pigment dispersions (Dis-Bk49) to (Dis-Bk51) were used in place of black pigment dispersion (Dis-Bk1).

Production Example 1 of Comparative Black Toner

Comparative black toners (Tnr-Bk52) to (Tnr-Bk55) were produced in the same operation as in "Production example 1 of black toner", except that black pigment dispersions (Dis-Bk52) to (Dis-Bk55) were used in place of black pigment dispersion (Dis-Bk1).

Example 5-1

Yellow toners were produced by the following methods using suspension granulation.

Production Example 4 of Yellow Toner

Preparation of Yellow Pigment Dispersion

First, 180 parts of ethyl acetate, 12 parts of C.I. Pigment Yellow 155 (yellow pigment a), 1.2 parts of compound (C-1) having an azo skeleton structure, and 130 parts of glass beads (1 mm in diameter) were mixed together. The resulting mixture was dispersed in an attritor (manufactured by Nippon Coke & Engineering Co., Ltd.) for 3 hours and filtered through a mesh to prepare yellow pigment dispersion.

Mixing Step

The following composition was dispersed for 24 hours with a ball mill to provide 200 parts of a toner composition mixture.

Yellow pigment dispersion described above: 96.0 parts

Polar resin (saturated polyester resin (polycondensate of propylene oxide-modified bisphenol A and phthalic acid, Tg: 75.9° C., Mw: 11000, Mn: 4200, acid value: 11)): 85.0 parts Hydrocarbon wax (Fischer-Tropsch wax, maximum endothermic peak observed by DSC measurement: 80° C., Mw: 750): 9.0 parts Aluminum salicylate compound (trade name: BONTRON E-108, manufactured by Orient Chemical Industries Co., Ltd.): 2 parts Ethyl acetate (solvent): 10.0 parts
Dispersion Suspension Step The following composition was dispersed for 24 hours with a ball mill to dissolve carboxymethylcellulose, thereby providing an aqueous medium.
Calcium carbonate (coated with an acrylic-based copolymer): 20.0 parts
Carboxymethylcellulose (Cellogen BS-H, manufactured by Daiichi Kogyo Seiyaku Co., Ltd.): 0.5 parts
Ion exchanged water: 99.5 parts Into a high-speed stirrer (T.K. Homomixer, manufactured by PRIMIX Corporation), 1200 parts of the aqueous medium was charged. Then 1000 parts of the toner composition mixture was added thereto under stirring with a rotary impeller at a circumferential velocity of 20 m/sec. The mixture was stirred for 1 minute with the temperature kept constant at 25° C., thereby providing a suspension.
Solvent Removal Step While 2200 parts of the suspension was stirred with a Fullzone impeller (manufactured by Kobelco Eco-Solutions Co., Ltd.) at a circumferential velocity of 45 m/min with the liquid temperature kept constant at 40° C., a gas phase above the suspension surface was forcibly aspirated with a blower to start removing the solvent. Fifteen minutes after the start of the solvent removal, 75 parts of aqueous ammonia diluted to 1% was added thereto as an ionic substance. One hour after the start of the solvent removal, 25 parts of the aqueous ammonia was added thereto. Two hours after the start of the solvent removal, 25 parts of the aqueous ammonia was added thereto. Three hours after the start of the solvent removal, 25 parts of the aqueous ammonia was added thereto, so that the total amount added was 150 parts. The operation was maintained for 17 hours after the start of the solvent removal with the liquid temperature maintained at 40° C., thereby providing a toner dispersion in which the solvent (ethyl acetate) was removed from the suspended particles.
Washing and Dehydration Step Next, 80 parts of 10 mol/L hydrochloric acid was added to 300 parts of the toner dispersion prepared in the solvent removal step. Furthermore, the mixture was neutralized with an aqueous solution of 0.1 mol/L sodium hydroxide. Then the neutralized mixture was washed four times with ion exchanged water by suction filtration, thereby providing a toner cake. The toner cake was dried in a vacuum dryer and screened by a sieve having an opening of 45 μm, thereby providing toner particles. The subsequent steps were performed in the same operation as in "Production example 1 of yellow toner" in Example 4-1, thereby a yellow toner (Tnr-Y56) of this example.

Production Example 5 of Yellow Toner

Yellow toners (Tnr-Y57) to (Tnr-Y101) of this example were produced in the same operation as in "Production example 4 of yellow toner", except that compounds (C-2) to (C-46) were used in place of compound (C-1) having an azo skeleton structure.

Production Example 6 of Yellow Toner

Yellow toners (Tnr-Y102) and (Tnr-Y103) of this example were produced in the same operation as in "Production example 4 of yellow toner", except that C.I. Pigment Yellow 180 (yellow pigment b) represented by the formula (Pig-B) and C.I. Pigment Yellow 185 (yellow pigment c) represented by the formula (Pig-C) were used in place of C.I. Pigment Yellow 155 (yellow pigment a) represented by the formula (Pig-A).

Comparative Example 5-1

Reference yellow toners serving as references for evaluation and comparative yellow toners were prepared by methods described below.

Production Example 2 of Reference Yellow Toner

Reference yellow toner (Tnr-Y104) was produced in the same operation as in "Production example 4 of yellow toner", except that compound (C-1) having an azo skeleton structure was not added.

Production Example 3 of Reference Yellow Toner

Reference yellow toners (Tnr-Y105) and (Tnr-Y106) were produced in the same operation as in "Production example 6 of yellow toner", except that compound (C-1) having an azo skeleton structure was not added.

Production Example 2 of Comparative Yellow Toner

Comparative yellow toners (Tnr-Y107) to (Tnr-Y110) were produced in the same operation as in "Production example 4 of yellow toner", except that comparative compound (C-48) (comparative compound 1) described above, DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio)=95/5) block copolymer (Mw=9,718) (comparative compound 4) described in PTL 4 were used in place of compound (C-1) having an azo skeleton structure.

Example 5-2

Magenta toners were produced by the following methods using suspension granulation.

Production Example 4 of Magenta Toner

Magenta toner (Tnr-M56) of this example was produced in the same operation as in "Production example 4 of yellow toner", except that C.I. Pigment Red 122 (magenta pigment a) represented by the formula (Pig-D) was used in place of C.I. Pigment Yellow 155 (yellow pigment a) represented by the formula (Pig-A).

Production Example 5 of Magenta Toner

Magenta toners (Tnr-M57) to (Tnr-M101) of this example were produced in the same operation as in "Production example 4 of magenta toner", except that compounds (C-2) to (C-46) were used in place of compound (C-1) having an azo skeleton structure.

Production Example 6 of Magenta Toner

Magenta toners (Tnr-M102) and (Tnr-M103) of this example were produced in the same operation as in "Production example 4 of magenta toner", except that C.I. Pigment Red 255 (magenta pigment b) represented by the formula (Pig-E) and C.I. Pigment Red 150 (magenta pigment c) represented by the formula (Pig-F) were used in place of C.I. Pigment Red 122 (magenta pigment a) represented by the formula (Pig-D).

Comparative Example 5-2

Reference magenta toners serving as references for evaluation and comparative magenta toners were produced by methods described below.

Production Example 2 of Reference Magenta Toner

Reference magenta toner (Tnr-M104) was produced in the same operation as in "Production example 4 of magenta toner", except that compound (C-1) having an azo skeleton structure was not added.

Production Example 3 of Reference Magenta Toner

Reference magenta toners (Tnr-M105) and (Tnr-M106) were produced in the same operation as in "Production example 6 of magenta toner", except that compound (C-1) having an azo skeleton structure was not added.

Production Example 2 of Comparative Magenta Toner

Comparative magenta toners (Tnr-M107) to (Tnr-M110) were produced in the same operation as in "Production example 4 of magenta toner", except that comparative compound (C-44) (comparative compound 1) described above, DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio)=95/5) block copolymer (Mw=9,718) (comparative compound 4) described in PTL 4 were used in place of compound (C-1) having an azo skeleton structure.

Example 5-3

Cyan toners were produced by the following methods using suspension granulation.

Production Example 4 of Cyan Toner

Cyan toner (Tnr-C56) of this example was produced in the same operation as in "Production example 4 of yellow toner", except that C.I. Pigment Blue 15:3 (cyan pigment a) represented by the formula (Pig-G) was used in place of C.I. Pigment Yellow 155 (yellow pigment a) represented by the formula (Pig-A).

Production Example 5 of Cyan Toner

Cyan toners (Tnr-C57) to (Tnr-C101) of this example were produced in the same operation as in "Production example 4 of cyan toner", except that compounds (C-2) to (C-46) were used in place of compound (C-1) having an azo skeleton structure.

Production Example 6 of Cyan Toner

Cyan toners (Tnr-C102) and (Tnr-C103) of this example were produced in the same operation as in "Production example 4 of cyan toner", except that C.I. Pigment Blue 16 (cyan pigment b) represented by the formula (Pig-H) and C.I. Pigment Blue 17:1 (cyan pigment c) represented by the formula (Pig-I) were used in place of C.I. Pigment Blue 15:3 (cyan pigment a) represented by the formula (Pig-G).

Comparative Example 5-3

Reference cyan toners serving as references for evaluation and comparative cyan toners were produced by methods described below.

Production Example 2 of Reference Cyan Toner

Reference cyan toner (Tnr-C104) was produced in the same operation as in "Production example 4 of cyan toner", except that compound (C-1) having an azo skeleton structure was not added.

Production Example 3 of Reference Cyan Toner

Reference cyan toners (Tnr-C105) and (Tnr-C106) were produced in the same operation as in "Production example 6 of cyan toner", except that compound (C-1) having an azo skeleton structure was not added.

Production Example 2 of Comparative Cyan Toner

Comparative cyan toners (Tnr-C107) to (Tnr-C110) were produced in the same operation as in "Production example 4 of cyan toner", except that comparative compound (C-44) (comparative compound 1) described above, DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio)=95/5) block copolymer (Mw=9,718) (comparative compound 4) described in PTL 4 were used in place of compound (C-1) having an azo skeleton structure.

Example 5-4

Black toners were produced by the following methods using suspension granulation.

Production Example 4 of Black Toner

Black toner (Tnr-Bk56) of this example was produced in the same operation as in "Production example 4 of yellow toner", except that 30 parts of carbon black (specific surface area: 65 m$^2$/g, average particle size: 30 nm, pH: 9.0) (black pigment a) and 3.0 parts of compound (C-1) having an azo skeleton structure were used in place of 12 parts of C.I. Pigment Yellow 155 (yellow pigment a) represented by the formula (Pig-A) and 1.2 parts of compound (C-1) having an azo skeleton structure.

Production Example 5 of Black Toner

Black toners (Tnr-Bk57) to (Tnr-Bk101) of this example were produced in the same operation as in "Production example 4 of black toner", except that compounds (C-2) to (C-46) were used in place of compound (C-1) having an azo skeleton structure.

Production Example 6 of Black Toner

Black toners (Tnr-Bk102) and (Tnr-Bk103) of this example were produced in the same operation as in Production example 4 of black toner, except that carbon black (specific surface area: 77 m$^2$/g, average particle size: 28 nm, pH: 7.5) (black pigment b) and carbon black (specific surface area: 370 m$^2$/g, average particle size: 13 nm, pH: 3.0) (black pigment c) were used in place of carbon black (specific surface area: 65 m$^2$/g, average particle size: 30 nm, pH: 9.0) (black pigment a).

Comparative Example 5-4

Reference black toners serving as references for evaluation and comparative black toners were produced by methods described below.

Production Example 2 of Reference Black Toner

Reference black toner (Tnr-Bk104) was produced in the same operation as in "Production example 4 of black toner", except that compound (C-1) having an azo skeleton structure was not added.

Production Example 3 of Reference Black Toner

Reference black toners (Tnr-Bk105) and (Tnr-Bk106) were produced in the same operation as in Production example 6 of black toner, except that compound (C-1) having an azo skeleton structure was not added.

Production Example 2 of Comparative Black Toner

Comparative black toners (Tnr-Bk107) to (Tnr-Bk110) were produced in the same operation as in "Production example 4 of black toner", except that comparative compound (C-44) (comparative compound 1) described above, DISPARLON DA-703-50 (manufactured by Kusumoto Chemicals, Ltd., acid value: 15 mgKOH/g, amine value: 40 mgKOH/g) (comparative compound 2) described in PTL 2, a methyl methacrylate/sodium styrenesulfonate copolymer (comparative compound 3) described in PTL 3, and a styrene/butyl acrylate (copolymerization ratio (mass ratio) =95/5) block copolymer (Mw=9,718) (comparative compound 4) described in PTL 4 were used in place of compound (C-1) having an azo skeleton structure.

Example 6

The yellow toners, the magenta toners, the cyan toners, and the black toners produced in Examples 4-1 to 4-4 and Examples 5-1 to 5-4 were evaluated by a method described below.
Evaluation of Tinting Strength of Toner Yellow toners (Tnr-Y1) to (Tnr-Y51) and yellow toners (Tnr-Y56) to (Tnr-Y106), magenta toners (Tnr-M1) to (Tnr-M51) and magenta toners (Tnr-M56) to (Tnr-M106), cyan toners (Tnr-C1) to (Tnr-C51) and cyan toners (Tnr-C56) to (Tnr-C106), black toners (Tnr-Bk1) to (Tnr-Bk51) and black toners (Tnr-Bk56) to (Tnr-Bk106) were used to output image samples. The image properties described below were compared and evaluated. Upon comparing the image properties, a paper feed durability test was performed with a modified model of LBP-5300 (manufactured by CANON KABUSHIKI KAISHA) was used as an image-forming apparatus (hereinafter, also abbreviate as "LBP"). Details of the modifications were as follows: a developing blade in a process cartridge (hereinafter, also abbreviated as "CRG") was replaced with a blade composed of stainless steel, the blade having a thickness of 8 μm. The apparatus was configured so as to be able to apply a blade bias of –200 (V) with respect to a developing bias to be applied to a developing roller serving as a toner carrying member.

A solid image having a toner laid-on level of 0.5 mg/cm$^2$ was produced on transfer paper (75 g/m$^2$ paper) under a normal temperature, normal humidity (N/N (23.5° C., 60% RH) environment. The density of the solid image was measured with a reflection densitometer (Spectrolino, manufactured by GretagMacbeth). The tinting strength of each toner was evaluated on the basis of the improvement rate of the solid image density.

Improvement rates of solid image densities of yellow toners (Tnr-Y1) to (Tnr-Y46) were determined using the solid image density of the reference yellow toner (Tnr-Y49) as a reference value. The improvement rate of the solid image density of yellow toner (Tnr-Y47) was determined using the solid image density of the reference yellow toner (Tnr-Y50) as a reference value. The improvement rate of the solid image density of yellow toner (Tnr-Y48) was determined using the solid image density of the reference yellow toner (Tnr-Y51) as a reference value.

Improvement rates of solid image densities of yellow toners (Tnr-Y56) to (Tnr-Y101) were determined using the solid image density of the reference yellow toner (Tnr-Y104) as a reference value. The improvement rate of the solid image density of yellow toner (Tnr-Y102) was determined using the solid image density of the reference yellow toner (Tnr-Y105) as a reference value. The improvement rate of the solid image density of yellow toner (Tnr-Y103) was determined using the solid image density of the reference yellow toner (Tnr-Y106) as a reference value.

Improvement rates of solid image densities of magenta toners (Tnr-M1) to (Tnr-M46) were determined using the solid image density of the reference magenta toner (Tnr-M49) as a reference value. The improvement rate of the solid image density of magenta toner (Tnr-M47) was determined using the solid image density of the reference magenta toner (Tnr-M50) as a reference value. The improvement rate of the solid image density of magenta toner (Tnr-M48) was determined using the solid image density of the reference magenta toner (Tnr-M51) as a reference value.

Improvement rates of solid image densities of magenta toners (Tnr-M56) to (Tnr-M101) were determined using the solid image density of the reference magenta toner (Tnr-M104) as a reference value. The improvement rate of the solid image density of magenta toner (Tnr-M102) was determined using the solid image density of the reference magenta toner (Tnr-M105) as a reference value. The improvement rate of the solid image density of magenta toner (Tnr-M103) was determined using the solid image density of the reference magenta toner (Tnr-M106) as a reference value.

Improvement rates of solid image densities of cyan toners (Tnr-C1) to (Tnr-C46) were determined using the solid image density of the reference cyan toner (Tnr-C49) as a reference value. The improvement rate of the solid image density of cyan toner (Tnr-C47) was determined using the solid image density of the reference cyan toner (Tnr-C50) as a reference value. The improvement rate of the solid image density of cyan toner (Tnr-C48) was determined using the solid image density of the reference cyan toner (Tnr-C51) as a reference value.

Improvement rates of solid image densities of cyan toners (Tnr-C56) to (Tnr-C101) were determined using the solid image density of the reference cyan toner (Tnr-C104) as a reference value. The improvement rate of the solid image density of cyan toner (Tnr-C102) was determined using the solid image density of the reference cyan toner (Tnr-C105) as a reference value. The improvement rate of the solid image density of cyan toner (Tnr-C103) was determined using the solid image density of the reference cyan toner (Tnr-C106) as a reference value.

Improvement rates of solid image densities of black toners (Tnr-Bk1) to (Tnr-Bk46) were determined using the solid image density of the reference black toner (Tnr-Bk49) as a reference value. The improvement rate of the solid image density of black toner (Tnr-Bk47) was determined using the solid image density of the reference black toner (Tnr-Bk50) as a reference value. The improvement rate of the solid image density of black toner (Tnr-Bk48) was determined using the solid image density of the reference black toner (Tnr-Bk51) as a reference value.

Improvement rates of solid image densities of black toners (Tnr-Bk56) to (Tnr-Bk101) were determined using the solid image density of the reference black toner (Tnr-Bk104) as a reference value. The improvement rate of the solid image density of black toner (Tnr-Bk102) was determined using the solid image density of the reference black toner (Tnr-Bk105) as a reference value. The improvement rate of the solid image density of black toner (Tnr-Bk103) was determined using the solid image density of the reference black toner (Tnr-Bk106) as a reference value.

Evaluation criteria for the improvement rate of the solid image density of each color are described below.

Evaluation Criteria for Improvement Rate of Solid Image Density of Yellow Toner

A: The improvement rate of the solid image density is 5% or more.

B: The improvement rate of the solid image density is 1% or more and less than 5%.

C: The improvement rate of the solid image density is 0% or more and less than 1%.

D: The solid image density is reduced.

When the improvement rate of the solid image density was 1% or more, the color tone was determined to be satisfactory.

Evaluation Criteria for Improvement Rate of Solid Image Density of Magenta Toner A: The improvement rate of the solid image density is 20% or more.

B: The improvement rate of the solid image density is 10% or more and less than 20%.

C: The improvement rate of the solid image density is 5% or more and less than 10%.

D: The improvement rate of the solid image density is less than 5%.

When the improvement rate of the solid image density was 10% or more, the color tone was determined to be satisfactory.

Evaluation Criteria for Improvement Rate of Solid Image Density of Cyan Toner

A: The improvement rate of the solid image density is 30% or more.

B: The improvement rate of the solid image density is 20% or more and less than 30%.

C: The improvement rate of the solid image density is 10% or more and less than 20%.

D: The improvement rate of the solid image density is less than 10%.

When the improvement rate of the solid image density was 20% or more, the color tone was determined to be satisfactory.

Evaluation Criteria for Improvement Rate of Solid Image Density of Black Toner

A: The improvement rate of the solid image density is 60% or more.

B: The improvement rate of the solid image density is 40% or more and less than 60%.

C: The improvement rate of the solid image density is 20% or more and less than 40%.

D: The improvement rate of the solid image density is less than 20%.

When the improvement rate of the solid image density was 40% or more, the color tone was determined to be satisfactory.

Comparative Example 6

Regarding comparative yellow toners (Tnr-Y52) to (Tnr-Y55), comparative yellow toners (Tnr-Y107) to (Tnr-Y110), comparative magenta toners (Tnr-M52) to (Tnr-M55), comparative magenta toners (Tnr-M107) to (Tnr-M110), comparative cyan toners (Tnr-C52) to (Tnr-C55), comparative cyan toners (Tnr-C107) to (Tnr-C110), comparative black toners (Tnr-Bk52) to (Tnr-B55), and comparative black toners (Tnr-B107) to (Tnr-B110), the tinting strength was evaluated in the same way as in Example 6.

Improvement rates of solid image densities of comparative yellow toners (Tnr-Y52) to (Tnr-Y55) were determined using the solid image density of the reference yellow toner (Tnr-Y49) as a reference value.

Improvement rates of solid image densities of comparative yellow toners (Tnr-Y107) to (Tnr-Y110) were determined using the solid image density of the reference yellow toner (Tnr-Y104) as a reference value.

Improvement rates of solid image densities of comparative magenta toners (Tnr-M52) to (Tnr-M55) were determined using the solid image density of the reference magenta toner (Tnr-M49) as a reference value.

Improvement rates of solid image densities of comparative magenta toners (Tnr-M107) to (Tnr-M110) were determined using the solid image density of the reference magenta toner (Tnr-M104) as a reference value.

Improvement rates of solid image densities of comparative cyan toners (Tnr-C52) to (Tnr-C55) were determined using the solid image density of the reference cyan toner (Tnr-C49) as a reference value.

Improvement rates of solid image densities of comparative cyan toners (Tnr-C107) to (Tnr-C110) were determined using the solid image density of the reference cyan toner (Tnr-C104) as a reference value.

Improvement rates of solid image densities of comparative black toners (Tnr-Bk52) to (Tnr-Bk55) were determined using the solid image density of the reference black toner (Tnr-Bk49) as a reference value.

Improvement rates of solid image densities of comparative black toners (Tnr-Bk107) to (Tnr-Bk110) were determined using the solid image density of the reference black toner (Tnr-Bk104) as a reference value.

Table 4 describes the evaluation results of the tinting strength of the toners of each color produced by the suspension polymerization method. Table 5 describes the evaluation results of the tinting strength of the toners of each color produced by the suspension granulation method.

TABLE 4

Evaluation result of toner produced by suspension polymerization

| | | Yellow | | Magenta | | Cyan | | Black | |
|---|---|---|---|---|---|---|---|---|---|
| | Compound | Toner | Tinting strength | Toner | Tinting strength | Toner | Tinting strength | Toner | Tinting strength |
| Example | C-1 | Tnr-Y 1 | A | Tnr-M 1 | A | Tnr-C 1 | A | Tnr-Bk 1 | A |
| Example | C-2 | Tnr-Y 2 | A | Tnr-M 2 | A | Tnr-C 2 | A | Tnr-Bk 2 | A |
| Example | C-3 | Tnr-Y 3 | A | Tnr-M 3 | A | Tnr-C 3 | A | Tnr-Bk 3 | A |
| Example | C-4 | Tnr-Y 4 | A | Tnr-M 4 | A | Tnr-C 4 | A | Tnr-Bk 4 | A |
| Example | C-5 | Tnr-Y 5 | A | Tnr-M 5 | A | Tnr-C 5 | A | Tnr-Bk 5 | A |
| Example | C-6 | Tnr-Y 6 | A | Tnr-M 6 | A | Tnr-C 6 | A | Tnr-Bk 6 | A |
| Example | C-7 | Tnr-Y 7 | A | Tnr-M 7 | A | Tnr-C 7 | A | Tnr-Bk 7 | A |
| Example | C-8 | Tnr-Y 8 | A | Tnr-M 8 | A | Tnr-C 8 | A | Tnr-Bk 8 | A |
| Example | C-9 | Tnr-Y 9 | A | Tnr-M 9 | A | Tnr-C 9 | A | Tnr-Bk 9 | A |
| Example | C-10 | Tnr-Y 10 | A | Tnr-M 10 | A | Tnr-C 10 | A | Tnr-Bk 10 | A |
| Example | C-11 | Tnr-Y 11 | A | Tnr-M 11 | A | Tnr-C 11 | A | Tnr-Bk 11 | A |
| Example | C-12 | Tnr-Y 12 | A | Tnr-M 12 | A | Tnr-C 12 | A | Tnr-Bk 12 | A |
| Example | C-13 | Tnr-Y 13 | A | Tnr-M 13 | A | Tnr-C 13 | A | Tnr-Bk 13 | A |
| Example | C-14 | Tnr-Y 14 | A | Tnr-M 14 | A | Tnr-C 14 | A | Tnr-Bk 14 | A |
| Example | C-15 | Tnr-Y 15 | A | Tnr-M 15 | A | Tnr-C 15 | A | Tnr-Bk 15 | A |
| Example | C-16 | Tnr-Y 16 | A | Tnr-M 16 | A | Tnr-C 16 | A | Tnr-Bk 16 | A |
| Example | C-17 | Tnr-Y 17 | A | Tnr-M 17 | A | Tnr-C 17 | A | Tnr-Bk 17 | A |
| Example | C-18 | Tnr-Y 18 | A | Tnr-M 18 | A | Tnr-C 18 | A | Tnr-Bk 18 | A |
| Example | C-19 | Tnr-Y 19 | A | Tnr-M 19 | A | Tnr-C 19 | A | Tnr-Bk 19 | A |
| Example | C-20 | Tnr-Y 20 | A | Tnr-M 20 | A | Tnr-C 20 | A | Tnr-Bk 20 | A |
| Example | C-21 | Tnr-Y 21 | A | Tnr-M 21 | A | Tnr-C 21 | A | Tnr-Bk 21 | A |
| Example | C-22 | Tnr-Y 22 | A | Tnr-M 22 | A | Tnr-C 22 | A | Tnr-Bk 22 | A |
| Example | C-23 | Tnr-Y 23 | A | Tnr-M 23 | A | Tnr-C 23 | A | Tnr-Bk 23 | A |
| Example | C-24 | Tnr-Y 24 | A | Tnr-M 24 | A | Tnr-C 24 | A | Tnr-Bk 24 | A |
| Example | C-25 | Tnr-Y 25 | A | Tnr-M 25 | A | Tnr-C 25 | A | Tnr-Bk 25 | A |
| Example | C-26 | Tnr-Y 26 | A | Tnr-M 26 | A | Tnr-C 26 | A | Tnr-Bk 26 | A |
| Example | C-27 | Tnr-Y 27 | A | Tnr-M 27 | A | Tnr-C 27 | A | Tnr-Bk 27 | A |
| Example | C-28 | Tnr-Y 28 | A | Tnr-M 28 | A | Tnr-C 28 | A | Tnr-Bk 28 | A |
| Example | C-29 | Tnr-Y 29 | A | Tnr-M 29 | A | Tnr-C 29 | A | Tnr-Bk 29 | A |
| Example | C-30 | Tnr-Y 30 | A | Tnr-M 30 | A | Tnr-C 30 | A | Tnr-Bk 30 | A |
| Example | C-31 | Tnr-Y 31 | A | Tnr-M 31 | A | Tnr-C 31 | A | Tnr-Bk 31 | A |
| Example | C-32 | Tnr-Y 32 | A | Tnr-M 32 | A | Tnr-C 32 | A | Tnr-Bk 32 | A |
| Example | C-33 | Tnr-Y 33 | A | Tnr-M 33 | A | Tnr-C 33 | A | Tnr-Bk 33 | A |
| Example | C-34 | Tnr-Y 34 | A | Tnr-M 34 | A | Tnr-C 34 | A | Tnr-Bk 34 | A |
| Example | C-35 | Tnr-Y 35 | A | Tnr-M 35 | A | Tnr-C 35 | A | Tnr-Bk 35 | A |
| Example | C-36 | Tnr-Y 36 | A | Tnr-M 36 | A | Tnr-C 36 | A | Tnr-Bk 36 | A |
| Example | C-37 | Tnr-Y 37 | A | Tnr-M 37 | A | Tnr-C 37 | A | Tnr-Bk 37 | A |
| Example | C-38 | Tnr-Y 38 | A | Tnr-M 38 | A | Tnr-C 38 | A | Tnr-Bk 38 | A |
| Example | C-39 | Tnr-Y 39 | A | Tnr-M 39 | A | Tnr-C 39 | A | Tnr-Bk 39 | A |
| Example | C-40 | Tnr-Y 40 | A | Tnr-M 40 | A | Tnr-C 40 | A | Tnr-Bk 40 | A |
| Example | C-41 | Tnr-Y 41 | A | Tnr-M 41 | A | Tnr-C 41 | A | Tnr-Bk 41 | A |
| Example | C-42 | Tnr-Y 42 | A | Tnr-M 42 | A | Tnr-C 42 | A | Tnr-Bk 42 | A |
| Example | C-43 | Tnr-Y 43 | A | Tnr-M 43 | A | Tnr-C 43 | A | Tnr-Bk 43 | A |
| Example | C-44 | Tnr-Y 44 | A | Tnr-M 44 | A | Tnr-C 44 | A | Tnr-Bk 44 | A |
| Example | C-45 | Tnr-Y 45 | A | Tnr-M 45 | A | Tnr-C 45 | A | Tnr-Bk 45 | A |
| Example | C-46 | Tnr-Y 46 | A | Tnr-M 46 | A | Tnr-C 46 | A | Tnr-Bk 46 | A |
| Example | C-1 | Tnr-Y 47 | A | Tnr-M 47 | A | Tnr-C 47 | A | Tnr-Bk 47 | A |
| Example | C-1 | Tnr-Y 48 | A | Tnr-M 48 | A | Tnr-C 48 | A | Tnr-Bk 48 | A |
| Reference | not contained | Tnr-Y 49 | — | Tnr-M 49 | — | Tnr-C 49 | — | Tnr-Bk 49 | — |
| Reference | not contained | Tnr-Y 50 | — | Tnr-M 50 | — | Tnr-C 50 | — | Tnr-Bk 50 | — |
| Reference | not contained | Tnr-Y 51 | — | Tnr-M 51 | — | Tnr-C 51 | — | Tnr-Bk 51 | — |
| Comp. Ex. | comparative compound 1 | Tnr-Y 52 | B | Tnr-M 52 | A | Tnr-C 52 | B | Tnr-Bk 52 | A |
| Comp. Ex. | comparative compound 2 | Tnr-Y 53 | D | Tnr-M 53 | B | Tnr-C 53 | D | Tnr-Bk 53 | D |
| Comp. Ex. | comparative compound 3 | Tnr-Y 54 | D | Tnr-M 54 | D | Tnr-C 54 | C | Tnr-Bk 54 | D |
| Comp. Ex. | comparative compound 4 | Tnr-Y 55 | C | Tnr-M 55 | C | Tnr-C 55 | C | Tnr-Bk 55 | C |

TABLE 5

Evaluation result of toner produced by suspension granulation

| | | Yellow | | Magenta | | Cyan | | Black | |
|---|---|---|---|---|---|---|---|---|---|
| | Compound | Toner | Tinting strength | Toner | Tinting strength | Toner | Tinting strength | Toner | Tinting strength |
| Example | C-1 | Tnr-Y 56 | A | Tnr-M 56 | A | Tnr-C 56 | A | Tnr-Bk 56 | A |
| Example | C-2 | Tnr-Y 57 | A | Tnr-M 57 | A | Tnr-C 57 | A | Tnr-Bk 57 | A |

TABLE 5-continued

Evaluation result of toner produced by suspension granulation

| | | Yellow | | Magenta | | Cyan | | Black | |
|---|---|---|---|---|---|---|---|---|---|
| | Compound | Toner | Tinting strength | Toner | Tinting strength | Toner | Tinting strength | Toner | Tinting strength |
| Example | C-3 | Tnr-Y 58 | A | Tnr-M 58 | A | Tnr-C 58 | A | Tnr-Bk 58 | A |
| Example | C-4 | Tnr-Y 59 | A | Tnr-M 59 | A | Tnr-C 59 | A | Tnr-Bk 59 | A |
| Example | C-5 | Tnr-Y 60 | A | Tnr-M 60 | A | Tnr-C 60 | A | Tnr-Bk 60 | A |
| Example | C-6 | Tnr-Y 61 | A | Tnr-M 61 | A | Tnr-C 61 | A | Tnr-Bk 61 | A |
| Example | C-7 | Tnr-Y 62 | A | Tnr-M 62 | A | Tnr-C 62 | A | Tnr-Bk 62 | A |
| Example | C-8 | Tnr-Y 63 | A | Tnr-M 63 | A | Tnr-C 63 | A | Tnr-Bk 63 | A |
| Example | C-9 | Tnr-Y 64 | A | Tnr-M 64 | A | Tnr-C 64 | A | Tnr-Bk 64 | A |
| Example | C-10 | Tnr-Y 65 | A | Tnr-M 65 | A | Tnr-C 65 | A | Tnr-Bk 65 | A |
| Example | C-11 | Tnr-Y 66 | A | Tnr-M 66 | A | Tnr-C 66 | A | Tnr-Bk 66 | A |
| Example | C-12 | Tnr-Y 67 | A | Tnr-M 67 | A | Tnr-C 67 | A | Tnr-Bk 67 | A |
| Example | C-13 | Tnr-Y 68 | A | Tnr-M 68 | A | Tnr-C 68 | A | Tnr-Bk 68 | A |
| Example | C-14 | Tnr-Y 69 | A | Tnr-M 69 | A | Tnr-C 69 | A | Tnr-Bk 69 | A |
| Example | C-15 | Tnr-Y 70 | A | Tnr-M 70 | A | Tnr-C 70 | A | Tnr-Bk 70 | A |
| Example | C-16 | Tnr-Y 71 | A | Tnr-M 71 | A | Tnr-C 71 | A | Tnr-Bk 71 | A |
| Example | C-17 | Tnr-Y 72 | A | Tnr-M 72 | A | Tnr-C 72 | A | Tnr-Bk 72 | A |
| Example | C-18 | Tnr-Y 73 | A | Tnr-M 73 | A | Tnr-C 73 | A | Tnr-Bk 73 | A |
| Example | C-19 | Tnr-Y 74 | A | Tnr-M 74 | A | Tnr-C 74 | A | Tnr-Bk 74 | A |
| Example | C-20 | Tnr-Y 75 | A | Tnr-M 75 | A | Tnr-C 75 | A | Tnr-Bk 75 | A |
| Example | C-21 | Tnr-Y 76 | A | Tnr-M 76 | A | Tnr-C 76 | A | Tnr-Bk 76 | A |
| Example | C-22 | Tnr-Y 77 | A | Tnr-M 77 | A | Tnr-C 77 | A | Tnr-Bk 77 | A |
| Example | C-23 | Tnr-Y 78 | A | Tnr-M 78 | A | Tnr-C 78 | A | Tnr-Bk 78 | A |
| Example | C-24 | Tnr-Y 79 | A | Tnr-M 79 | A | Tnr-C 79 | A | Tnr-Bk 79 | A |
| Example | C-25 | Tnr-Y 80 | A | Tnr-M 80 | A | Tnr-C 80 | A | Tnr-Bk 80 | A |
| Example | C-26 | Tnr-Y 81 | A | Tnr-M 81 | A | Tnr-C 81 | A | Tnr-Bk 81 | A |
| Example | C-27 | Tnr-Y 82 | A | Tnr-M 82 | A | Tnr-C 82 | A | Tnr-Bk 82 | A |
| Example | C-28 | Tnr-Y 83 | A | Tnr-M 83 | A | Tnr-C 83 | A | Tnr-Bk 83 | A |
| Example | C-29 | Tnr-Y 84 | A | Tnr-M 84 | A | Tnr-C 84 | A | Tnr-Bk 84 | A |
| Example | C-30 | Tnr-Y 85 | A | Tnr-M 85 | A | Tnr-C 85 | A | Tnr-Bk 85 | A |
| Example | C-31 | Tnr-Y 86 | A | Tnr-M 86 | A | Tnr-C 86 | A | Tnr-Bk 86 | A |
| Example | C-32 | Tnr-Y 87 | A | Tnr-M 87 | A | Tnr-C 87 | A | Tnr-Bk 87 | A |
| Example | C-33 | Tnr-Y 88 | A | Tnr-M 88 | A | Tnr-C 88 | A | Tnr-Bk 88 | A |
| Example | C-34 | Tnr-Y 89 | A | Tnr-M 89 | A | Tnr-C 89 | A | Tnr-Bk 89 | A |
| Example | C-35 | Tnr-Y 90 | A | Tnr-M 90 | A | Tnr-C 90 | A | Tnr-Bk 90 | A |
| Example | C-36 | Tnr-Y 91 | A | Tnr-M 91 | A | Tnr-C 91 | A | Tnr-Bk 91 | A |
| Example | C-37 | Tnr-Y 92 | A | Tnr-M 92 | A | Tnr-C 92 | A | Tnr-Bk 92 | A |
| Example | C-38 | Tnr-Y 93 | A | Tnr-M 93 | A | Tnr-C 93 | A | Tnr-Bk 93 | A |
| Example | C-39 | Tnr-Y 94 | A | Tnr-M 94 | A | Tnr-C 94 | A | Tnr-Bk 94 | A |
| Example | C-40 | Tnr-Y 95 | A | Tnr-M 95 | A | Tnr-C 95 | A | Tnr-Bk 95 | A |
| Example | C-41 | Tnr-Y 96 | A | Tnr-M 96 | A | Tnr-C 96 | A | Tnr-Bk 96 | A |
| Example | C-42 | Tnr-Y 97 | A | Tnr-M 97 | A | Tnr-C 97 | A | Tnr-Bk 97 | A |
| Example | C-43 | Tnr-Y 98 | A | Tnr-M 98 | A | Tnr-C 98 | A | Tnr-Bk 98 | A |
| Example | C-44 | Tnr-Y 99 | A | Tnr-M 99 | A | Tnr-C 99 | A | Tnr-Bk 99 | A |
| Example | C-45 | Tnr-Y 100 | A | Tnr-M 100 | A | Tnr-C 100 | A | Tnr-Bk 100 | A |
| Example | C-46 | Tnr-Y 101 | A | Tnr-M 101 | A | Tnr-C 101 | A | Tnr-Bk 101 | A |
| Example | C-1 | Tnr-Y 102 | A | Tnr-M 102 | A | Tnr-C 102 | A | Tnr-Bk 102 | A |
| Example | C-1 | Tnr-Y 103 | A | Tnr-M 103 | A | Tnr-C 103 | A | Tnr-Bk 103 | A |
| Reference | not contained | Tnr-Y 104 | — | Tnr-M 104 | — | Tnr-C 104 | — | Tnr-Bk 104 | — |
| Reference | not contained | Tnr-Y 105 | — | Tnr-M 105 | — | Tnr-C 105 | — | Tnr-Bk 105 | — |
| Reference | not contained | Tnr-Y 106 | — | Tnr-M 106 | — | Tnr-C 106 | — | Tnr-Bk 106 | — |
| Comp. Ex. | comparative compound 1 | Tnr-Y 107 | B | Tnr-M 107 | A | Tnr-C 107 | B | Tnr-Bk 107 | A |
| Comp. Ex. | comparative compound 2 | Tnr-Y 108 | D | Tnr-M 108 | B | Tnr-C 108 | D | Tnr-Bk 108 | D |
| Comp. Ex. | comparative compound 3 | Tnr-Y 109 | D | Tnr-M 109 | D | Tnr-C 109 | B | Tnr-Bk 109 | D |
| Comp. Ex. | comparative compound 4 | Tnr-Y 110 | C | Tnr-M 110 | C | Tnr-C 110 | C | Tnr-Bk 110 | C |

The results described in Table 3 demonstrated that the use of the compounds each having an azo skeleton structure according to an embodiment of the present invention results in the pigment compositions and the pigment dispersions having satisfactory pigment dispersibility.

The results described in Tables 4 and 5 demonstrated that the use of the compounds each having an azo skeleton structure according to an embodiment of the present invention improves the dispersibility of the pigments in the binder resins, thereby providing the yellow toners, the magenta toners, the cyan toners, and the black toners having high tinting strength.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-178553, filed Aug. 29, 2013, which is hereby incorporated by reference herein in its entirety.

The invention claimed is:

1. A compound containing a polymer having a monomer unit represented by the following formula (4), and having a moiety represented by the following formula (1),

[Chem. 1]

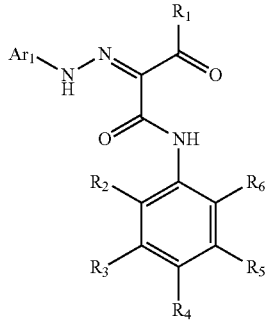

formula (1)

wherein in the formula (1),
  $R_1$ represents an alkyl group or a phenyl group,
  $Ar_1$ represents an aryl group,
  $Ar_1$ and $R_2$ to $R_6$ satisfy at least one of requirements (i) and (ii) described below,
    (i) $Ar_1$ has a linking group which is bound to a carbon atom in the aryl group, and constitutes a bonding moiety with the polymer,
    (ii) at least one of $R_2$ to $R_6$ has a linking group constituting a bonding moiety with the polymer,
  when none of $R_2$ to $R_6$ has a linking group, $R_2$ to $R_6$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group,
  $R_7$ to $R_{11}$ each independently represent a group represented by the following formula (2) or (3), and
  wherein $Ar_1$ and $R_2$ to $R_6$ satisfy at least one of requirements (iii) and (iv) described below,
    (iii) $Ar_1$ has a substituent selected from a $CONHR_7$ group, a $COOR_8$ group, a $NHCOR_9$ group, an $OCOR_{10}$ group, and an $NHR_{11}$ group,
    (iv) at least one of $R_2$ to $R_6$ represents a $CONHR_7$ group, a $COOR_8$ group, an $NHCOR_9$ group, an $OCOR_{10}$ group, and an $NHR_{11}$ group,

[Chem. 2]

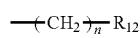

formula (2)

wherein in the formula (2),
  $R_{12}$ represents a $COR_{14}$ group or an $SO_2R_{15}$ group,
  $R_{14}$ and $R_{15}$ each independently represent an $OR_{16}$ group or an $NR_{17}R_{18}$ group,
  $R_{16}$ represents a hydrogen atom, an alkyl group, a phenyl group, an aralkyl group, or a cation that forms a salt with a carboxylate anion or a sulfonate anion,
  $R_{17}$ and $R_{18}$ each independently represent a hydrogen atom, an alkyl group, a phenyl group, or an aralkyl group, and
  n represents an integer of 1 to 11,

[Chem. 3]

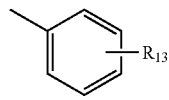

formula (3)

wherein in the formula (3),
  $R_{13}$ represents a $COR_{14}$ group or an $SO_2R_{15}$ group,
  $R_{14}$ and $R_{15}$ each independently represent an $OR_{16}$ group or an $NR_{17}R_{18}$ group,
  $R_{16}$ represents a hydrogen atom, an alkyl group, a phenyl group, an aralkyl group, or a cation that forms a salt with a carboxylate anion or a sulfonate anion, and
  $R_{17}$ and $R_{18}$ each independently represent a hydrogen atom, an alkyl group, a phenyl group, or an aralkyl group,

[Chem. 4]

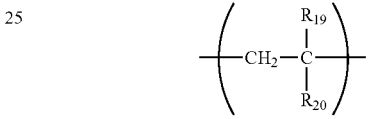

formula (4)

wherein in the formula (4),
  $R_{19}$ represents a hydrogen atom or an alkyl group, and
  $R_{20}$ represents a phenyl group, a carboxy group, a carboxylate group, or a carboxamide group.

2. The compound according to claim 1, wherein the moiety represented by the formula (1) has a structure represented by the following formula (5):

[Chem. 9]

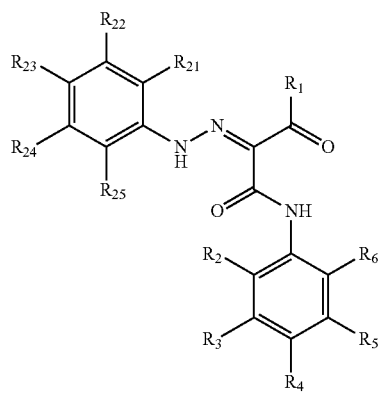

formula (5)

wherein in the formula (5),
  $R_1$ represents an alkyl group or a phenyl group,
  $R_{21}$ to $R_{25}$ and $R_2$ to $R_6$ satisfy at least one of requirements (v) and (vi) described below,
    (v) at least one of $R_{21}$ to $R_{25}$ has a linking group constituting a bonding moiety with the polymer,
    (vi) at least one of $R_2$ to $R_6$ has a linking group constituting a bonding moiety with the polymer,
  when none of $R_{21}$ to $R_{25}$ and $R_2$ to $R_6$ has a linking group, $R_{21}$ to $R_{25}$ and $R_2$ to $R_6$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group, and $R_7$ to $R_{11}$ each represent a group represented by the formula (2) or (3), and wherein $R_{21}$ to $R_{25}$ and $R_2$ to $R_6$ satisfy at least one of requirements (vii) and (viii) described below, (vii) at least one of $R_{21}$ to $R_{25}$ represents one of a $CONHR_7$ group, a $COOR_8$ group, an $NHCOR_9$ group, an $OCOR_{10}$ group, and an $NHR_{11}$ group, and (viii) at least one of $R_2$ to $R_6$ represents one of a $CONHR_7$ group, a $COOR_8$ group, an $NHCOR_9$ group, an $OCOR_{10}$ group, and an $NHR_{11}$ group.

3. The compound according to claim 1, wherein the linking group has a carboxylate linkage or a carboxamide linkage.

4. The compound according to claim 1, wherein $Ar_1$ and $R_2$ to $R_6$ in the formula (1) satisfy at least one of requirements (ix) and (x) described below, (ix) $Ar_1$ has, as a substituent, one of a $CONHR_7$ group and a $COOR_8$ group, and (x) at least one of $R_2$ to $R_6$ represents one of a $CONHR_7$ group and a $COOR_8$ group.

5. The compound according to claim 1, wherein $Ar_1$ in the formula (1) satisfies requirement (iii).

6. The compound according to claim 1, wherein $R_2$ to $R_6$ in the formula (1) satisfy requirement (ii).

7. The compound according to claim 1, wherein $R_{14}$ and $R_{15}$ in the formula (2) or (3) each represents an $NH_2$ group.

8. The compound according to claim 1, wherein $R_{12}$ and $R_{13}$ in the formula (2) or (3) represents an $SO_2R_{15}$ group.

9. A pigment-dispersing agent comprising:
the compound according to claim 1.

10. A pigment composition comprising:
the compound according to claim 1; and
a pigment.

11. A pigment dispersion comprising:
the pigment composition according to claim 10; and
a water-insoluble solvent.

12. The pigment dispersion according to claim 11, wherein the water-insoluble solvent is styrene.

13. A toner comprising:
toner particles each containing
a binder resin; and
a colorant,
wherein the colorant is the pigment composition according to claim 10.

14. The toner according to claim 13, wherein the toner particles are produced by a suspension polymerization method or a suspension granulation method.

15. The compound according to claim 1, wherein the moiety represented by the formula (1) has a structure represented by the following formula (5):

[Chem. 9]

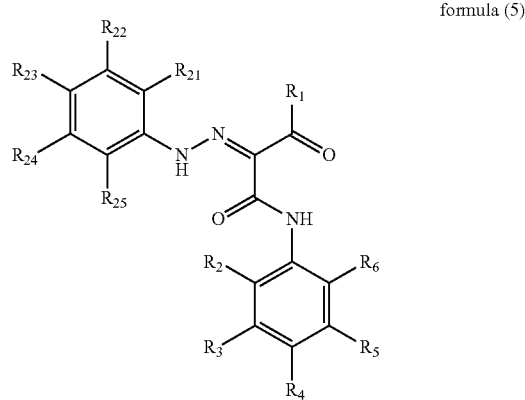

formula (5)

wherein in the formula (5), $R_1$ represents an alkyl group or a phenyl group, only one of $R_2$ to $R_6$ has a linking group constituting a bonding moiety with the polymer, when none of $R_2$ to $R_6$ has a linking group, $R_2$ to $R_6$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group, $R_{21}$ to $R_{25}$ each independently represent a hydrogen atom, a halogen atom, an alkyl group, an alkoxy group, a hydroxy group, a cyano group, a trifluoromethyl group, a carboxy group, a $CONHR_7$ group, a $COOR_8$ group, an $NHCOR_9$ group, an $OCOR_{10}$ group, or an $NHR_{11}$ group, and $R_7$ to $R_{11}$ each represent a group represented by the formula (2) or (3), and at least one of $R_{21}$ to $R_{25}$ represents one of a $CONHR_7$ group, a $COOR_8$ group, an $NHCOR_9$ group, an $OCOR_{10}$ group, and an $NHR_{11}$ group.

16. The compound according to claim 15, wherein the linking group has a carboxylate linkage or a carboxamide linkage.

* * * * *